US012796701B2

(12) United States Patent
Hebb et al.

(10) Patent No.: US 12,796,701 B2
(45) Date of Patent: Nov. 17, 2026

(54) METHOD AND APPARATUS FOR INTRODUCING PRE-HEATED WORKING FLUID WITHIN A HIGH PRESSURE VESSEL

(71) Applicant: Farther Farms, Inc., Rochester, NY (US)

(72) Inventors: Richard L. Hebb, Irondequoit, NY (US); Vipul Prakash Saran, Rochester, NY (US)

(73) Assignee: Farther Farms, Inc., Rochester, NY (US)

( * ) Notice: Subject to any disclaimer, the term of this patent is extended or adjusted under 35 U.S.C. 154(b) by 571 days.

(21) Appl. No.: 18/265,639

(22) PCT Filed: Dec. 20, 2021

(86) PCT No.: PCT/US2021/064430

§ 371 (c)(1),
(2) Date: Jun. 6, 2023

(87) PCT Pub. No.: WO2022/140295

PCT Pub. Date: Jun. 30, 2022

(65) Prior Publication Data

US 2024/0023567 A1 Jan. 25, 2024

Related U.S. Application Data

(60) Provisional application No. 63/128,455, filed on Dec. 21, 2020.

(51) Int. Cl.
*A23B 7/005* (2006.01)
*F26B 3/04* (2006.01)

(52) U.S. Cl.
CPC .............. *A23B 7/0056* (2013.01); *F26B 3/04* (2013.01)

(58) Field of Classification Search
CPC ....... A23B 7/005; A23B 7/157; A23B 7/0056; A23B 2/30; A23B 2/788; A23B 2/18;
(Continued)

(56) References Cited

U.S. PATENT DOCUMENTS 3,108,446 A 10/1963 Sohda et al.
3,454,406 A 7/1969 Alderton
(Continued)

FOREIGN PATENT DOCUMENTS

CA 2087287 C 11/1996
CN 102113699 A 7/2011
(Continued)

OTHER PUBLICATIONS

USPTO; Non-Final Office Action dated Jul. 3, 2023 for U.S. Appl. No. 17/282,755.
(Continued)

*Primary Examiner* — Harry E Arant
(74) *Attorney, Agent, or Firm* — Morrison & Foerster LLP

(57) ABSTRACT

The disclosure is embodied by a high efficiency injection manifold, injector, or nozzle assembly for enhancing the introduction of heat into a closed volume or vessel while simultaneously pressurizing the vessel with a working fluid to facilitate thermal processing of food, medical, or other products therein. An associated apparatus includes a compressor, a heat exchanger, a piping assembly, and a vessel; wherein the piping assembly includes an injection pipeline terminating at a nozzle assembly with at least two injection orifices located inside the vessel. These at least two injection orifices have an inside diameter that is less than, equal to, or greater than that of the injection pipeline and are facing towards each other at an angle of °0 or greater than °0 from the horizontal. Injection orifice inside diameters that are
(Continued)

smaller than that of the injection pipeline may be less desirable for one or more applications.

5 Claims, 43 Drawing Sheets

(58) Field of Classification Search
CPC ......... A23B 2/26; A16L 2202/24; A16L 2/18; A16L 2/26; B05B 1/26; F26B 3/04
See application file for complete search history.

(56) References Cited

U.S. PATENT DOCUMENTS

| | | | |
|---|---|---|---|
| 3,630,759 | A | 12/1971 | Rumberger |
| 3,773,527 | A | 11/1973 | Ruggerone |
| 3,843,806 | A | 10/1974 | Kishpaugh |
| 3,895,122 | A | 7/1975 | Shatila |
| 3,959,501 | A | 5/1976 | Shatila |
| 4,228,196 | A | 10/1980 | Weaver et al. |
| 4,317,842 | A | 3/1982 | El-Hag et al. |
| 4,336,273 | A | 6/1982 | Lee |
| 4,369,197 | A | 1/1983 | Basel et al. |
| 4,389,424 | A | 6/1983 | Hasegawa |
| 4,515,266 | A | 5/1985 | Myers |
| 4,579,743 | A | 4/1986 | Hullah |
| 4,670,275 | A | 6/1987 | Orr et al. |
| 4,741,911 | A | 5/1988 | Mcintyre et al. |
| 4,764,385 | A | 8/1988 | Butland |
| 4,842,875 | A | 6/1989 | Anderson |
| 4,931,297 | A | 6/1990 | Malyniak et al. |
| 4,933,411 | A | 6/1990 | Gifford |
| 4,988,523 | A | 1/1991 | Gardner et al. |
| 5,057,330 | A | 10/1991 | Lee et al. |
| 5,151,286 | A | 9/1992 | Adams et al. |
| 5,192,565 | A | 3/1993 | Buhler et al. |
| 5,204,133 | A | 4/1993 | Hibbs et al. |
| 5,393,547 | A | 2/1995 | Balaban et al. |
| 5,397,393 | A | 3/1995 | Tsujino et al. |
| 5,447,734 | A | 9/1995 | Street |
| 5,486,369 | A | 1/1996 | Mason et al. |
| 5,518,747 | A | 5/1996 | Pike |
| 5,520,942 | A | 5/1996 | Sauer et al. |
| 5,527,516 | A * | 6/1996 | Yamamoto ................ A61L 2/22 422/26 |
| 5,562,938 | A | 10/1996 | Lee et al. |
| 5,597,599 | A | 1/1997 | Smith et al. |
| 5,723,184 | A | 3/1998 | Yamamoto |
| 5,794,435 | A | 8/1998 | Jones |
| 5,911,827 | A | 6/1999 | Heller |
| 5,912,034 | A | 6/1999 | Martin et al. |
| 5,922,374 | A | 7/1999 | Daury et al. |
| 5,968,573 | A | 10/1999 | Kaufman |
| 5,997,938 | A | 12/1999 | Taylor et al. |
| 6,022,569 | A | 2/2000 | Rogols et al. |
| 6,656,426 | B1 | 12/2003 | Wang et al. |
| 6,952,714 | B2 | 10/2005 | Peart |
| 7,108,832 | B2 | 9/2006 | Christensen et al. |
| 8,187,655 | B2 | 5/2012 | Agterof et al. |
| 8,940,245 | B2 | 1/2015 | Reddy et al. |
| 9,271,511 | B2 | 3/2016 | Davis et al. |
| 10,492,507 | B2 | 12/2019 | Rizvi et al. |
| 11,779,028 | B2 | 10/2023 | Rizvi et al. |
| 11,930,833 | B2 | 3/2024 | Bandoh et al. |
| 2002/0127315 | A1 | 9/2002 | Doan et al. |
| 2004/0022900 | A1 | 2/2004 | Thorpe |
| 2004/0191382 | A1 | 9/2004 | Cooper et al. |
| 2005/0186311 | A1 | 8/2005 | Loh et al. |
| 2006/0040022 | A1 | 2/2006 | Bouraoui |
| 2006/0292274 | A1 | 12/2006 | Garwood |
| 2008/0050485 | A1 | 2/2008 | Meyer |
| 2008/0057163 | A1 | 3/2008 | Kegler et al. |
| 2008/0171116 | A1 | 7/2008 | Rasanayagam et al. |
| 2008/0254170 | A1 | 10/2008 | Darin |
| 2008/0279736 | A1 | 11/2008 | Frinke et al. |
| 2009/0068325 | A1 | 3/2009 | Depicciotto |
| 2010/0150775 | A1* | 6/2010 | Reddy ....................... A61L 2/04 422/310 |
| 2010/0260891 | A1 | 10/2010 | Agterof et al. |
| 2011/0091618 | A1 | 4/2011 | Wang |
| 2012/0070548 | A1 | 3/2012 | Bilet et al. |
| 2012/0100268 | A1 | 4/2012 | Higley et al. |
| 2012/0276258 | A1 | 11/2012 | Nafisi-Movaghar et al. |
| 2012/0288614 | A1 | 11/2012 | Favreau et al. |
| 2013/0052318 | A1 | 2/2013 | Davis et al. |
| 2013/0071546 | A1 | 3/2013 | Tomoda et al. |
| 2013/0078339 | A1 | 3/2013 | Trahan et al. |
| 2013/0287909 | A1 | 10/2013 | Lewis et al. |
| 2013/0329514 | A1 | 12/2013 | Farrar et al. |
| 2015/0010691 | A1 | 1/2015 | Siddoway et al. |
| 2015/0037389 | A1 | 2/2015 | Ragot et al. |
| 2016/0286829 | A1 | 10/2016 | Parker |
| 2017/0035070 | A1 | 2/2017 | Hastings |
| 2018/0064157 | A1 | 3/2018 | Whitehead et al. |
| 2018/0206537 | A1 | 7/2018 | Van Doorn |
| 2018/0229915 | A1 | 8/2018 | Brown et al. |
| 2018/0325134 | A1 | 11/2018 | Rizvi et al. |
| 2019/0166859 | A1 | 6/2019 | Rizvi et al. |
| 2021/0386081 | A1 | 12/2021 | Rizvi et al. |
| 2022/0000129 | A1 | 1/2022 | Rizvi et al. |

FOREIGN PATENT DOCUMENTS

| | | | |
|---|---|---|---|
| EP | 1140220 | B1 | 9/2006 |
| EP | 1946075 | B1 | 3/2013 |
| ES | 2302569 | A1 | 7/2008 |
| JP | H05221461 | A | 8/1993 |
| JP | H1017030 | A | 1/1998 |
| JP | 2006136217 | A | 6/2006 |
| WO | 1990002799 | A1 | 3/1990 |
| WO | 9746110 | A1 | 12/1997 |
| WO | 2006111425 | A1 | 10/2006 |
| WO | 2007068345 | A1 | 6/2007 |
| WO | 2007097626 | A1 | 8/2007 |
| WO | 2008061137 | A2 | 5/2008 |
| WO | 2014189376 | A1 | 11/2014 |
| WO | 2015160269 | A1 | 10/2015 |
| WO | 2016169815 | A1 | 10/2016 |
| WO | 2018209297 | A1 | 11/2018 |

OTHER PUBLICATIONS

USPTO; Final Office Action dated Nov. 30, 2023 for U.S. Appl. No. 17/282,755.

CIPO; Requisition by the Examiner in Accordance with Subsection 86(2) of the Patent Rules dated Feb. 15, 2024 for Application No. 3,063,137.

CIPO; Requisition by the Examiner in Accordance with Subsection 86(2) of the Patent Rules dated Feb. 19, 2024 for Application No. 3,115,215.

Pedreschi et al., "Modeling Water Loss During Frying of Potato Slices", International Journal of Food Properties, vol. 8 No. 2, pp. 289-299, Feb. 6, 2007 (Jun. 2, 2007).

INPI; Notice of Allowance dated Jul. 4, 2023 for Application No. 1120190236945.

INPI; Preliminary Office Action dated Sep. 15, 2022 for Application No. 1120190236945.

USPTO; Final Office Action dated Apr. 28, 2021 for U.S. Appl. No. 16/271,761.

USPTO; Non-Final Office Action dated Sep. 17, 2020 for U.S. Appl. No. 16/271,761.

IMPI; Notice of Allowance dated Jul. 7, 2023 for Application No. MX/a/2019/013439.

IMPI; First Substantive Examination Report dated Feb. 24, 2023 for Application No. MX/a/2019/013439.

JPO; Notice of Allowance dated Dec. 20, 2022 for Application No. 2019-561731.

JPO; Office Action dated Mar. 17, 2022 for Application No. 2019-561731.

EPO; Extended European Search Report dated Feb. 18, 2021 for Application No. 18798912.4.

(56) References Cited

OTHER PUBLICATIONS

INAPI; Written Opinion dated Aug. 9, 2023 for Application No. 202100830.
INAPI; Search Report and Expert Examiner Report for Invention Patent Application dated Nov. 14, 2022 for Application No. 202100830.
INPI; Preliminary Office Action dated Sep. 5, 2023 for Application No. 1120210064630.
JPO; Notice of Reasons for Rejection dated Oct. 13, 2023 for Application No. 2021-518453.
EPO; Extended European Search Report dated Jun. 15, 2022 for Application No. 19869543.9.
PCT; International Preliminary Report of Patentability dated Jun. 29, 2023 for Application No. PCT/US2021/064430.
PCT; International Search Report and Written Opinion of the International Searching Authority dated Feb. 22, 2022 for Application No. PCT/US2021/064430.
PCT; International Search Report and Written Opinion issued in Application No. PCT/US2018/032416 dated Jul. 31, 2018.
USPTO; Non-Final Office Action dated Jun. 27, 2019 for U.S. Appl. No. 15/977,849.
USPTO; Non-Final Office Action dated Aug. 31, 2018 for U.S. Appl. No. 15/977,849.
Nanatei shokuhin seibunhyo (food ingredient table, 7th edition) 2016, supervised by Yoshiko Kagawa, Apr. 1, 2016, p. 22.
EPO; European Search Report dated Nov. 19, 2024 in Application No. EP4262411.

* cited by examiner

FIG.2D1

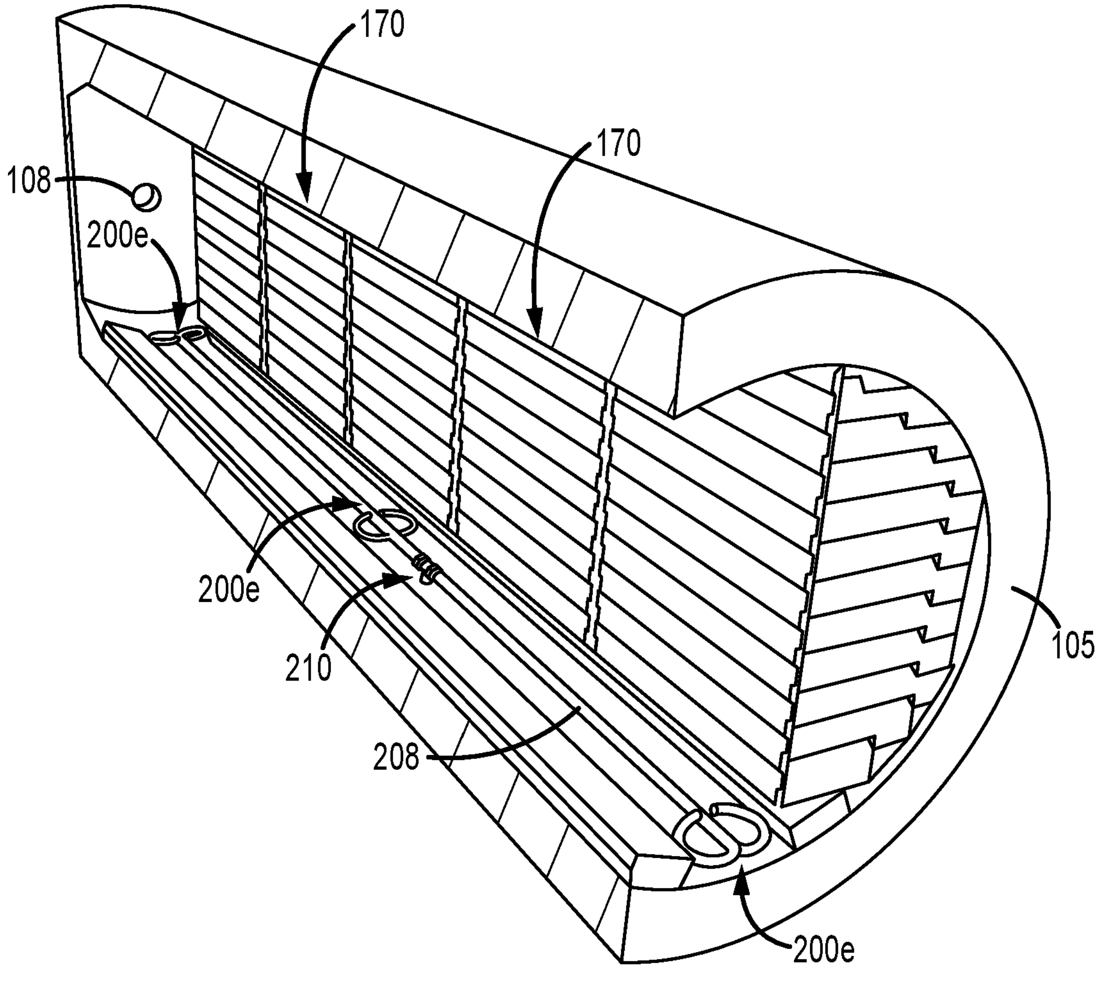
FIG.3F1

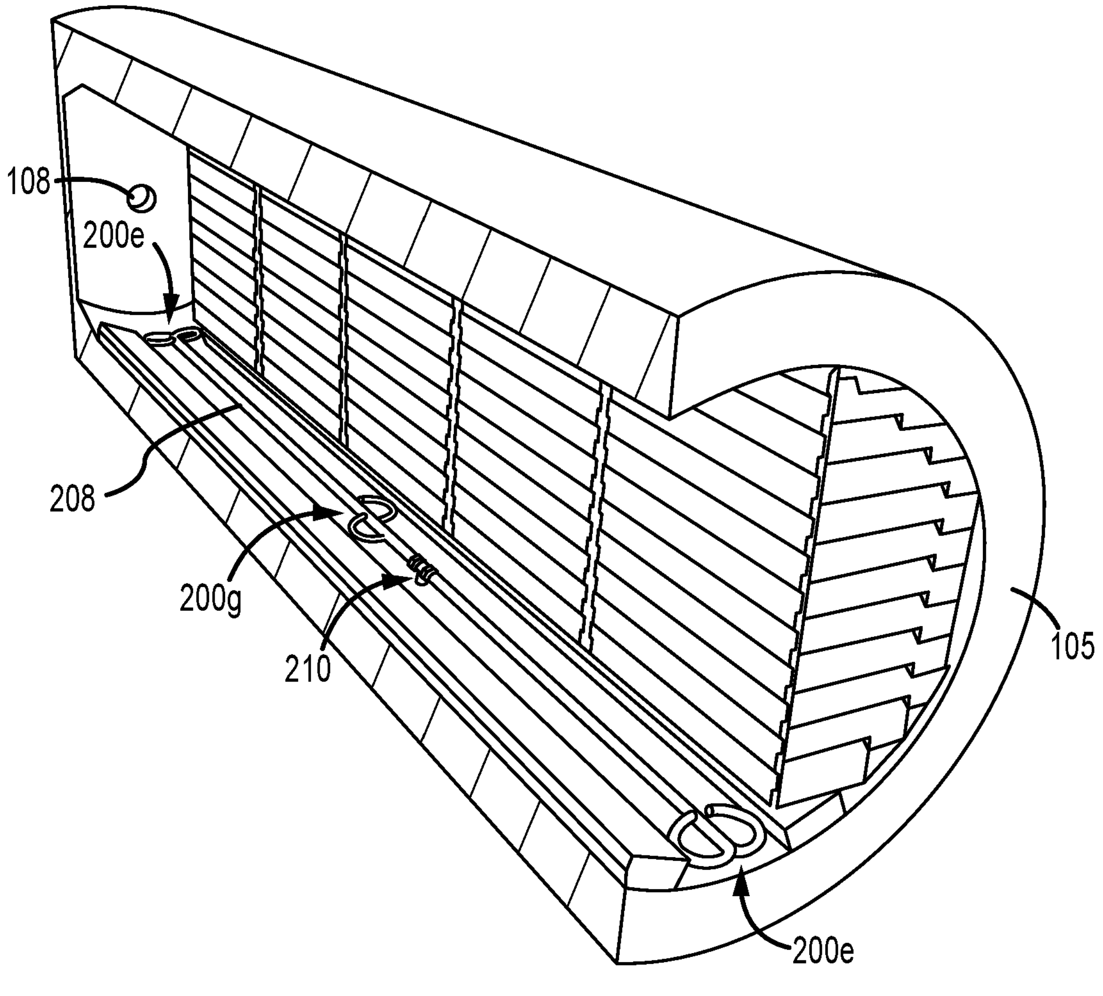
FIG.3F2

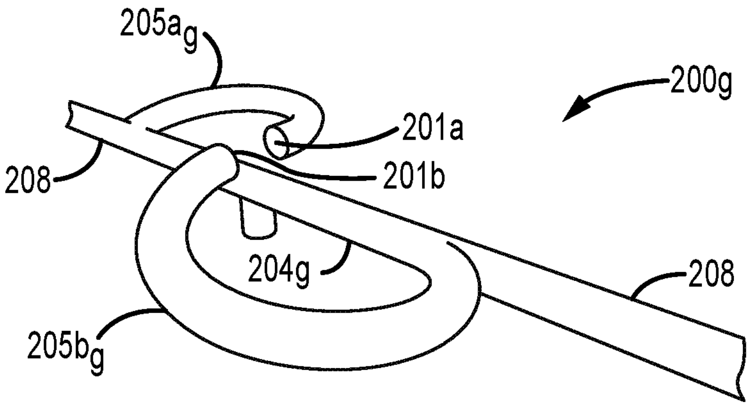
FIG.5G1
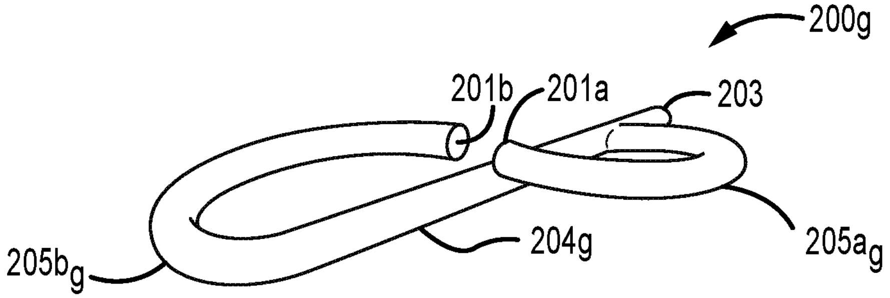
FIG.5G2
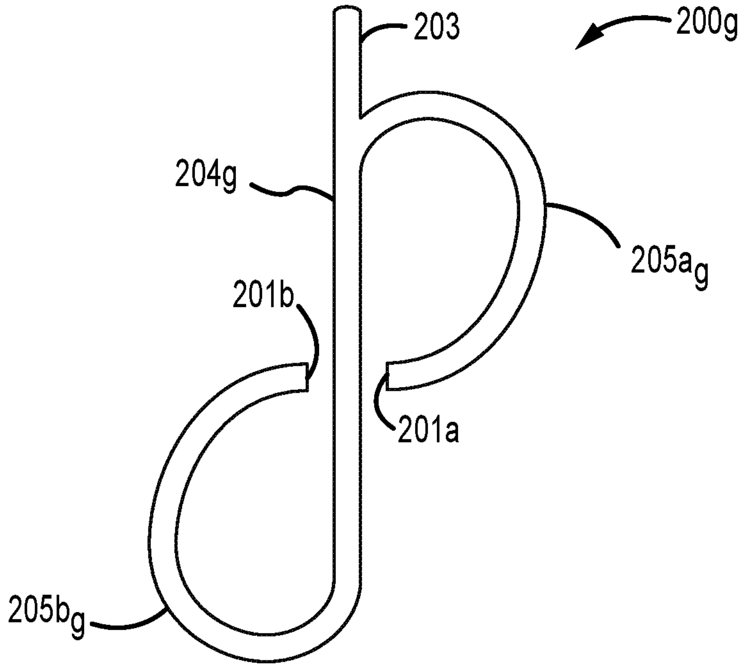
FIG.5G3

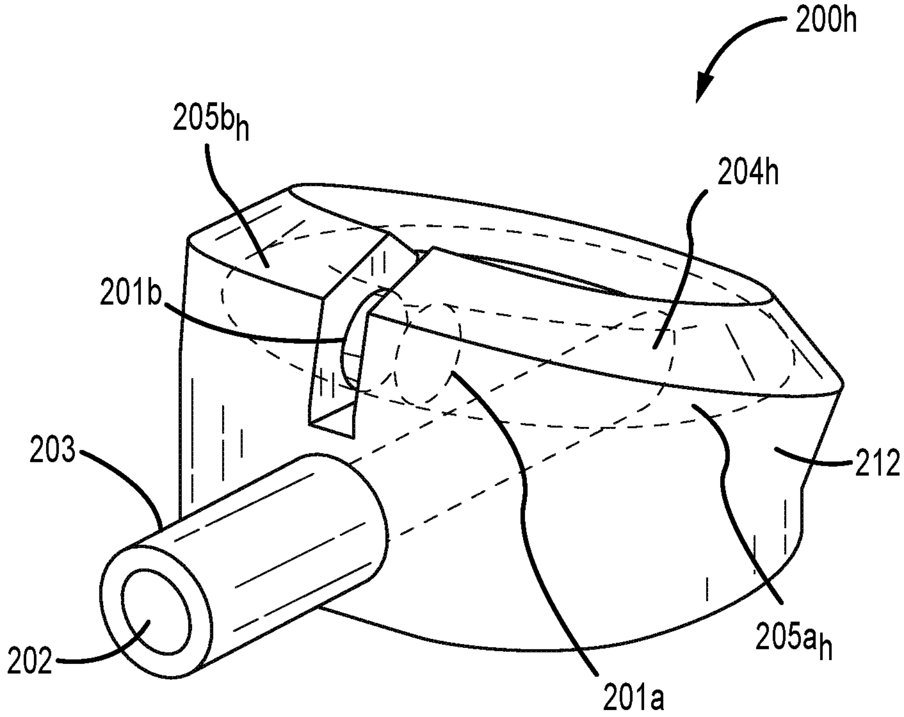
FIG.5H1
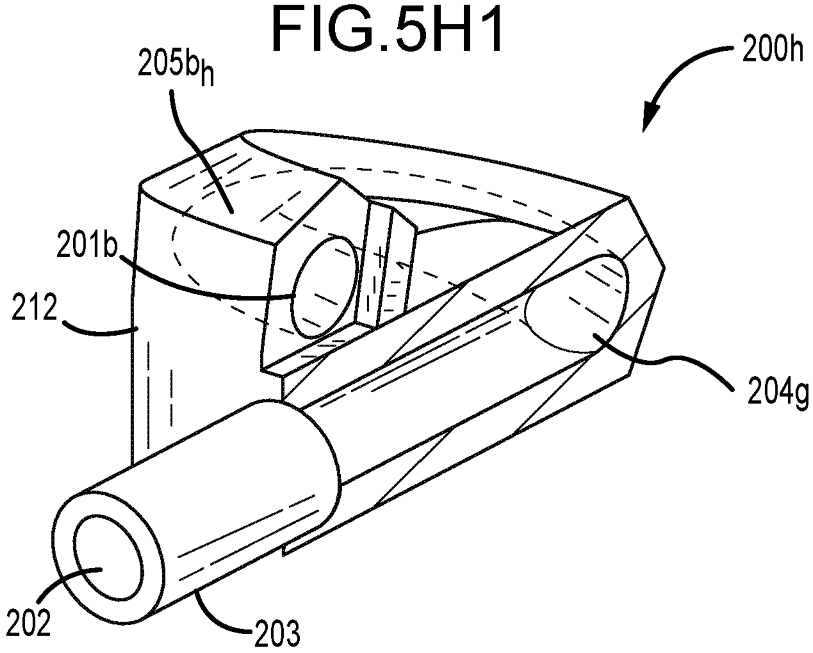
FIG.5H2

METHOD AND APPARATUS FOR INTRODUCING PRE-HEATED WORKING FLUID WITHIN A HIGH PRESSURE VESSEL

CROSS-REFERENCE TO RELATED APPLICATIONS

This patent application is a non-provisional patent application of, and claims the benefit of, U.S. Provisional Patent Application No. 63/128,455, that was filed on 21 Dec. 2020, and the entire disclosure of which is hereby incorporated by reference herein.

BACKGROUND

Traditional methodology for preheating a working fluid prior to its introduction into a greater volume high pressure vessel uses a typical injection pipeline terminating at one or multiple un-constricted nozzles within the vessel. With this methodology, the total orifice area of the un-constricted nozzle or nozzles is equal to or greater than the injection pipeline's cross-sectional area of flow and thus little or no backpressure is held by the nozzle(s) and therefore no mechanism is present to attain, enhance, and/or retain heat while passing through the heat exchanger and piping system. Some heat is transferred to the working fluid from the heat exchanger present in the piping system, but no mechanism is provided to enhance this heat transfer.

Another methodology for preheating the working fluid employs a constricted nozzle, or multiple constricted nozzles, to build backpressure through the pipe system. With this methodology, the total orifice area of the nozzle or nozzles is less than the injection pipeline's cross-sectional area of flow; therefore, the constricted nozzle(s) hold backpressure everywhere in the pipe system upstream of the nozzle including within the heat exchanger. Higher pressure in the heat exchanger increases thermal conductivity and density therein while simultaneously reducing velocity through the heat exchanger thus resulting in enhanced heating of the working fluid as it passes through the heat exchanger. However, the constricted nozzle(s) presents several challenges both with functionality and maintenance. Primarily, nozzle constriction increases the injection velocity of the working fluid from the injection orifice. This tight constriction converts internal pressure energy within the working fluid into kinetic energy in the form of velocity. Many working fluids, especially compressible gases such as Carbon Dioxide, will also undergo significant adiabatic cooling as pressure energy is converted to velocity due to Joule-Thompson Cooling and other decompression effects. This adiabatic cooling detracts from the working fluid's heating potential and should ideally be minimized. In a larger volume high pressure vessel where the buoyancy effects are significant, the high exit velocity results in heat-shorts and phase fractioning. This is especially true for compressible working fluids such as carbon dioxide or nitrogen. Most of the working fluid injected at these greater velocities through a constricted nozzle(s) moves quickly past the payload without transferring much heat and reaches the top of the vessel where, given that the hottest fluid at a given pressure has the lowest density, it achieves equilibrium buoyancy. Due to reduced interaction time between the working fluid and payload, the heat transferred is minimal. Buoyancy effects prevent the hot working fluid from falling back down to interact with the payload until after the hot working fluid has cooled. But not all the injected high velocity working fluid ends up floating at the top of the vessel. Decompression effects cool the working fluid as it accelerates and emerges from the injection orifice. Some of this cooled fluid condenses as dense liquid, which gravitationally settles at the bottom of the vessel; especially for compressible fluids such as Carbon Dioxide or Nitrogen. Dense liquid is not desirable in a thermal process which requires reasonably uniform and high temperatures. Heating the condensed liquid with hot gas inside the vessel is extremely difficult because of intense buoyancy effects which motivate the hot gas out of contact with the dense liquid before much heat can be transferred. Additionally, high injection velocities work together with tight nozzle constrictions to increase the rate of mechanical wear on the nozzles and thereby increase maintenance requirements. The working fluid does a great deal of heating work on the body of a tightly constricted nozzle or any other object which resists the working fluid's flow due to backpressure effects and frictional/viscous effects. Both sensible heat energy and internal pressure energy are transferred to the constricted nozzle body as heat in typical arrangements.

The present disclosure overcomes these above highlighted challenges.

SUMMARY

In one aspect, the present disclosure relates to a method of attaining heat within the working fluid while passing through the heat exchanger and also retaining the heat while passing through the remainder nozzle assembly.

In another aspect, the present disclosure relates to a method of further attaining heat within the working fluid in addition to what is gained from the heat exchanger while passing through the remainder nozzle assembly, both before and after the heat exchanger due to the higher degree of friction achieved as a result of the back pressure built by the working fluid at and immediately after the injection orifice. In essence, internal pressure energy in the working fluid is converted to velocity as the working fluid accelerates by flowing through any constriction or angular change and some of this velocity is converted to heat by viscous dissipation and frictional effects which heats both the working fluid and the pipe system where the working fluid accelerates. If constriction and backpressure is applied far upstream of the vessel, some of the viscous and frictional heat will be lost to the environment, despite any insulation. Thus this invention, instead directs the working fluid in opposition against itself, not far upstream of the vessel, to apply backpressure without any significant constriction and without any significant increase in velocity resulting in an opposition-backpressure which is equal to, greater than, or less than the backpressure applied by the rest of the upstream pipe assembly. This opposition backpressure is achieved by dividing the working fluid into multiple, discrete streams and then directing these streams of working fluid into a collision course with each other via a nozzle manifold. In this arrangement, the working fluid is the object which primarily resists the working fluid's flow; thus, some internal pressure energy within the working fluid is converted to heat within the working fluid (due to backpressure, collision, and frictional/viscous effects) after the working fluid has left the opposing nozzles/orifices but before the working fluid contacts any other objects/material (e.g., the payload being processed) within the vessel. Providing backpressure without nozzle constriction precludes any increase in working fluid velocity which minimizes adiabatic decompressive cooling effects. A tightly constricted nozzle with a small inner diameter would cause very significant acceleration of the working fluid, as described by the Venturi effect. As used herein "working fluid" may refer to Carbon Dioxide in either liquid, gas or supercritical phase and/or a combination thereof. As used herein "backpressure" refers to a resistance or force opposing the desired flow of working fluid through pipes, leading to frictional loss and pressure drop. Any acceleration of the working fluid, even a change of direction, requires the piping system to apply a non-zero net force to the fluid. This non-zero net force occurs because the accelerating working fluid does work against the pipe system and forces occur in equal but opposite pairs; thus the kinetic energy required for the acceleration comes from internal pressure energy within the working fluid; internal pressure energy is transformed into kinetic energy.

The above-noted backpressure again may be provided by having the flows of the working fluid exit from two or more orifices of an injection manifold or nozzle assembly in such a manner that these flows intersect or collide (e.g., within the interior of the pressure vessel). A pair of orifices may be disposed in directly opposing relation to one another, such that the flows exiting the two orifices are disposed along a common axis (e.g., a first flow of the working fluid from a first orifice is directed toward a second orifice, a second flow of the working fluid from a second orifice is directed toward the first orifice, and the first and second flows of working fluid are disposed along a common axis). Multiple orifices may be oriented such that their respective flows intersect without the flows actually being directed/disposed along a common axis. Whether this provides sufficient backpressure for a particular application may be dependent upon a variety of factors, such as the spacing between the orifices, the velocity of the working fluid exiting the orifices, the type of working fluid, and the like. Multiple injection manifolds disposed at different locations within the interior of the pressure vessel may be utilized as well, where each injection manifold includes two or more orifices whose flows of working fluid intersect/collide with one another. In the case where multiple injection manifolds are utilized, each injection manifold may be of a common configuration or at least two different configurations of injection manifolds may be utilized.

In another aspect, the present disclosure relates to an apparatus termed as nozzle assembly to practice the ascribed methodology. As used herein "nozzle assembly" includes an injection pipe, injection manifold or points and at least two injection orifices with diameters smaller, equal, or larger than that of the injection pipe, facing towards each other at an angle of greater than, less than, or equal to 0° from the horizontal.

In another aspect, the nozzle assembly is a relatively simple design which provides flexibility with orientation in different manners to address any changes in feed loads, high pressure vessel volume and/or within operating parameters such as pressure, temp, flow rates etc.

In another aspect the nozzle assembly is a relatively simple design which lends itself to economical manufacturing.

In another aspect the nozzle assembly is a relatively simple design which lends itself to be easily cleaned and maintained.

Representative working fluids in accordance with this Summary include carbon dioxide, water, dry steam, nitrogen, oxygen, helium, argon, ethanol, ozone, air, exhaust (as from combustion), nitrous oxide, carbon monoxide, ethylene oxide, vaporized hydro peroxide and/or any other compressible or incompressible fluid. A working fluid in accordance with this Summary may be in a supercritical state when introduced into the vessel. A working fluid in accordance with this Summary may be used to thermally process a payload disposed within the pressure vessel. Thermal processing may include reducing the moisture content of the payload, depositing a material on the payload, depositing a material within the payload, sterilizing the payload, or any combination thereof. The payload may be of any appropriate type, including a food product, one or more medical devices, medical equipment, and personal protective equipment.

Various aspects of the present disclosure are also addressed by the following examples and in the noted combinations:

1. An apparatus comprising:
   - at least one compressor, at least one heat exchanger, and
   - at least one piping assembly comprising
     - at least one injection pipeline and
     - at least one nozzle assembly comprising of:
       - passthrough pipe;
       - at least one injection manifold;
       - at least two connection ducts; and
       - at least two injection orifices facing towards each other.

2. The apparatus of example 1, wherein the nozzle assembly forms a back pressure equal to or greater than the loss of pressure in the apparatus.

3. The apparatus of any preceding example, wherein the injection pipe has an ID that is small with respect to that of the high pressure vessel.

4. The apparatus of any preceding example, wherein the distribution pipe has an ID that is small with respect to that of the high pressure vessel.

5. The apparatus of any preceding example, wherein the injection orifice pipe has an ID that is small with respect to that of the high pressure vessel.

6. The apparatus of any preceding example, wherein the injection orifice is unconstructed which means it has an inside diameter of no less than that of the injection pipe or the distribution pipe.

7. The apparatus of any preceding example, wherein the injection orifices are designed to be separated by a distance of 0 to 4 times the injection orifice inside diameter at the bottom and at a distance of 0 to 4 times the injection orifice inside diameter at the top.

8. The apparatus of any preceding example, wherein the injection manifold has either a geometry of a "Tee shape" or "Y shaped involute" or "Tee shaped Involute".

9. The apparatus of any preceding example, wherein the connection ducts is a means of redirecting the path of the working fluid using at least one 90-degree turn such as an elbow fitting.

10. The apparatus of any preceding example, wherein the connection ducts is a means of redirecting the path of the working fluid using an involute curvature.

11. The apparatus of any preceding example, wherein the connection ducts is a means of redirecting the path of the working fluid using a hyperbolic curvature.

12. The apparatus of any preceding example, wherein the connection ducts is a means of redirecting the path of the working fluid using a spiral curvature.

13. The apparatus of any preceding example, wherein the connection ducts is a means of redirecting the path of the working fluid using a circular curvature.

14. The apparatus of any preceding example, wherein the connection ducts is a means of redirecting the path of the working fluid using a tilt or pivot at an angle of 0 to 90 degrees from the horizontal.

15. A methodology, comprising:

feeding the apparatus starting with the compressor with the working fluid;

compressing the working fluid through the heat exchanger;

feeding the pre-heated working fluid into the pass through fitting connecting to the pipe assembly;

feeding the nozzle assembly with the pre-heated working fluid;

feeding the larger volume high pressure vessel with the pre-heated working fluid until the desired operating temperature is attained;

recirculating the heated working fluid through the apparatus to maintain the operating temperature within the larger volume high pressure vessel while minimizing the formation of temperature gradient;

depressurizing the working fluid in the larger volume high pressure vessel into the receiver, at first (first depressurization); and depressurizing the remainder working fluid in the larger volume high pressure vessel into the atmosphere (second depressurization).

16. The method of example 15, further comprising storing the working fluid in the receiver prior to feeding the apparatus with the said working fluid.

17. The method of example 16, the storing the working fluid in the receiver including storing the working fluid at pressures at about 50 psi to 80 psi at temperature 0 to 80 C.

18. The method of example 15, the compressing of the working fluid through the heat exchanger including compressing the fluid to about 72 bar to 350 bar.

19. The method of example 18, wherein the compressing the working fluid occurs within more than one compressor.

20. The method of example 18, wherein the compressing the working fluid occurs for 1 minute to 60 minutes.

21. The method of example 15, further comprising heating the working fluid within the heat exchanger.

22. The method of example 21, the heating the working fluid within the heat exchanger including heating the fluid at about 31.1 C to 300 C.

23. The method of example 21, wherein the heating the working fluid within the heat exchanger occurs within more than one heat exchanger.

24. The method of example 15, further comprising feeding the injection pipe of the nozzle assembly with the pre heated working fluid.

25. The method of example 15, further comprising feeding the injection manifold of the nozzle assembly with the pre heated working fluid.

26. The method of example 15, further comprising feeding the connection ducts of the nozzle assembly with the pre heated working fluid.

27. The method of example 15, further comprising feeding the injection orifices of the nozzle assembly with the pre heated working fluid.

28. The method of example 15, wherein the recirculation of the working fluid occurs for 1 minute to 60 minutes.

29. The method of example 15, wherein the first depressurization of the working fluid occurs for 1 minute to 12 minutes.

30. The method of example 29, wherein the first depressurization of the working fluid occurs at about 2 bar/min to 12 bar/min.

31. The method of example 15, wherein the second depressurization of the working fluid occurs for 1 minute to 12 minutes.

32. The method of example 31, wherein the first depressurization of the working fluid occurs at about 1 bar/min to 11 bar/min.

33. The method of example 15, wherein the one or more working fluids includes carbon dioxide, water, dry steam, nitrogen, oxygen, helium, argon, ethanol, ozone, air, exhaust (as from combustion), nitrous oxide, carbon monoxide, ethylene oxide, vaporized hydro peroxide and/or any other compressible or incompressible fluid.

34. A method of processing a payload, comprising:

disposing a first payload in a vessel;

heating a working fluid;

directing said working fluid into said pressure vessel after said heating step, wherein said directing step comprises directing a first flow of said working fluid out of a first orifice, directing a second flow of said working fluid out of a second orifice, and intersecting said first flow with said second flow after exiting said first orifice and said second orifice, respectively; and processing said first payload within said vessel using said working fluid.

35. The method of example 34, wherein said first payload is selected from the group consisting of a food product, one or more medical devices, medical equipment, and personal protective equipment.

36. The method of any of examples 34-35, wherein said processing step is selected from the group consisting of reducing the moisture content of said first payload, depositing a material on said first payload, depositing a material within said first payload, sterilizing said first payload, or any combination thereof.

37. The method of any of examples 34-36, further comprising sealing said pressure vessel after said disposing step and prior to initiating said directing step.

38. The method of any of examples 34-37, wherein said directing step further comprises directing said first flow out of said first orifice and said directing said second flow out of said second orifice along a common axial path and with said first flow being directed toward said second orifice and with said second flow being directed toward said first orifice.

39. The method of any of examples 34-38, wherein a first conduit section terminates in said first orifice, wherein a second conduit section terminates in said second orifice, and wherein said first conduit section and said second conduit section are aligned along an axis and with said first orifice being spaced from said second orifice along said axis.

40. The method of any of examples 34-37, wherein a first conduit section terminates in said first orifice, wherein a second conduit section terminates in said second orifice, and wherein said first conduit section and said second conduit section are disposed in different orientations.

41. The method of example 40, wherein an orientation of said first conduit section is a mirror image of an orientation of said second conduit section.

42. The method of any of examples 40-41, wherein said first flow and said second flow are directed out of said first orifice and said second orifice, respectively, at least generally along a first axis and a second axis, respectively, wherein said first axis is other than colinear with said second axis.

43. The method of any of examples 34-37, wherein said directing step further comprises:

directing said working fluid into an injection manifold;

directing said first flow through at least one turn from where said working fluid enters said injection manifold compared to where said first flow exits said first orifice; and directing said second flow through at least one turn from where said working fluid enters said injection manifold compared to where said second flow exits said second orifice.

44. The method of any of examples 34-37, wherein said directing step further comprises:

directing said working fluid into an injection manifold;

directing said first flow through a first conduit section and thereafter through a second conduit section;

directing said second flow through a third conduit section and thereafter through a fourth conduit section;

wherein said first flow through said first conduit section and said second flow through said third conduit section proceed away from a reference plane in opposite directions, and wherein said first flow through said second conduit section and said second flow through said fourth conduit section proceed back toward said reference plane;

wherein a free end of said second conduit section comprises said first orifice, a free end of said fourth conduit section comprises said second orifice, and said first orifice and said second orifice are disposed on opposite sides of said reference plane and in spaced relation to one another.

45. The method of any of examples 34-42, wherein said directing step further comprises:

directing said working fluid into an injection manifold comprising a reference plane;

directing said first flow in a first direction away from a first side of said reference plane and thereafter directing said first flow in a second direction back toward said first side of said reference plane; and directing said second flow in a third direction away from a second side of said reference plane and thereafter directing said second flow in a fourth direction back toward said second side of said reference plane.

46. The method of any of examples 34-45, further comprising:

splitting said working fluid into said first flow and said second flow;

turning said first flow through an angle of at least 180° between a flow direction of said first flow after said splitting step and a flow direction of said first flow when exiting said first orifice;

turning said second flow through an angle of at least 180° between a flow direction of said second flow after said splitting step and a flow direction of said second flow when exiting said second orifice.

47. The method of any of examples 34-46, wherein an injector comprises said first orifice and said second orifice, wherein a plurality of said injectors are disposed within said vessel and are fluidly connected with one another.

48. The method of any of examples 34-47, further comprising:

providing a flow of said working fluid from a working fluid supply to a compressor;

providing a flow of said working fluid from said compressor to a heat exchanger; and providing a flow of said working fluid from said heat exchanger to said pressure vessel, wherein at least part of said flow from said heat exchanger to said pressure vessel is output through said first orifice and said second orifice.

49. The method of any of examples 34-48, wherein said working fluid comprises carbon dioxide.

50. The method of any of examples 34-49, wherein said working fluid within said vessel is in a supercritical state.

51. A processing system, comprising:

a working fluid supply;

a compressor comprising a compressor inlet and a compressor outlet, wherein said compressor inlet is fluidly connected with said working fluid supply;

a heat exchanger comprising a heat exchanger inlet and a heat exchanger outlet, wherein said heat exchanger inlet is fluidly connected with said compressor outlet;

a pressure vessel; and an injection manifold disposed in said pressure vessel and fluidly connected with said heat exchanger outlet, wherein said injection manifold comprises a first orifice and a second orifice that are oriented such that a first flow of working fluid out of said first orifice intersects with a second flow of said working fluid out of said second orifice.

52. The processing system of example 51, further comprising a payload in said pressure vessel.

53. The processing system of any of examples 51-52, wherein said payload is selected from the group consisting of a food product, one or more medical devices, medical equipment, and personal protective equipment.

54. The processing system of any of examples 51-53, wherein said working fluid supply comprises carbon dioxide.

55. The processing system of any of examples 51-54, wherein a centerline of said first orifice and a centerline of said second orifice are disposed along a common axial path and with said first orifice projecting toward said second orifice and vice versa.

56. The processing system of any of examples 51-55, wherein said injection manifold comprises a first conduit section that terminates in said first orifice, wherein said injection manifold comprises a second conduit section that terminates in said second orifice, and wherein said first conduit section and said second conduit section are aligned along an axis and with said first orifice being spaced from said second orifice along said axis.

57. The processing system of any of examples 51-54, wherein said injection manifold comprises a first conduit section that terminates in said first orifice, wherein said injection manifold comprises a second conduit section that terminates in said second orifice, and wherein said first conduit section and said second conduit section are disposed in different orientations.

58. The processing system of example 57, wherein an orientation of said first conduit section is a mirror image of an orientation of said second conduit section.

59. The processing system of any of examples 57-58, wherein said first orifice and second orifices are oriented such that a first flow out of said first orifice is at least generally along a first axis and a second flow out of said second orifice is at last generally along a second axis, wherein said first axis is other than colinear with said second axis.

60. The processing system of any of examples 51-54, wherein said injection manifold comprises a first flowpath extending from a first location to said first orifice and a second flowpath extending from said first location to said second orifice;

wherein said first flowpath comprises at least one turn from between said first location and said first orifice; and wherein said second flowpath comprises at least one turn between said first location and said second orifice.

61. The processing system of any of examples 51-54:
wherein said injection manifold comprises a first flowpath extending from a first location to said first orifice and a second flowpath extending from said first location to said second orifice;
wherein said first flowpath comprises a first conduit section a second conduit section, wherein said second conduit section is disposed between said first orifice and said first conduit section;
wherein said second flowpath comprises a third conduit section a fourth conduit section, wherein said fourth conduit section is disposed between said second orifice and said third conduit section;
wherein said first conduit section and said third conduit section are oriented so that a flow through said first conduit section and a flow through said third conduit section proceed away from a reference plane in opposite directions, and wherein a flow through said second conduit section and a flow through said fourth conduit section proceed back toward said reference plane;
wherein a free end of said second conduit section comprises said first orifice, a free end of said fourth conduit section comprises said second orifice, and said first orifice and said second orifice are disposed on opposite sides of said reference plane and in spaced relation to one another.

62. The processing system of example 61, wherein said injection manifold comprises an inlet conduit that extends to said first location.

63. The processing system of example 62, wherein said first flowpath and said second flowpath are symmetrically disposed relative to said inlet conduit.

64. The processing system of any of examples 51-54:
wherein said injection manifold comprises a first flowpath extending from a first location to said first orifice and a second flowpath extending from said first location to said second orifice;
wherein said first flowpath turns through an angle of at least 180° proceeding from said first location to said first orifice;
wherein said second flowpath turns through an angle of at least 180° proceeding from said first location and said second orifice.

65. The processing system of example 64, wherein said injection manifold comprises an inlet conduit that extends to said first location.

66. The processing system of example 65, wherein said first flowpath and said second flowpath are symmetrically disposed relative to said inlet conduit.

67. The processing system of any of examples 51-66, further comprising a plurality of said injection manifolds disposed within said pressure vessel and disposed along a common flowpath.

BRIEF DESCRIPTION OF THE DRAWINGS

The subject matter of the present disclosure is particularly pointed out and distinctly claimed in the concluding portion of the specification. An understanding of the present disclosure may be further facilitated by referring to the following detailed description and claims in connection with the following drawings. While the drawings illustrate various embodiments employing the principles described herein, the drawings do not limit the scope of the claims. Reference to "in accordance with various embodiments" in this Brief Description of the Drawings also applies to the corresponding discussion in the Detailed Description.

FIGS. 2D and 2D1 are representations of a Y involute shaped nozzle assembly and a nozzle assembly arrangement with 3 pairs of injection orifices connected to the pass through fitting and are placed on and either side of the pass through fitting within the larger volume high pressure vessel.

FIGS. 3F1 and 3F2 are representations of the arrangement of a Y involute shaped nozzle assembly (e.g., FIGS. 2D1 and 2D) and a nozzle assembly arrangement with 3 pair of injection orifices in relation to the rails on which the stack of baskets rests.

FIGS. 5G1 and 5G2 are perspective views of another nozzle assembly with a pair of injection orifices.

FIG. 5G3 is a top view of the nozzle assembly shown in FIG. 5G2.

FIG. 5H1 is a perspective view of an enclosed tee involute shaped nozzle assembly with a pair of ½" injection orifices with a 17° tilt from the horizontal connected to the pass through fitting.

FIG. 5H2 is a cross-sectional view of the nozzle assembly of FIG. 5H1.

DETAILED DESCRIPTION

Figure 1:
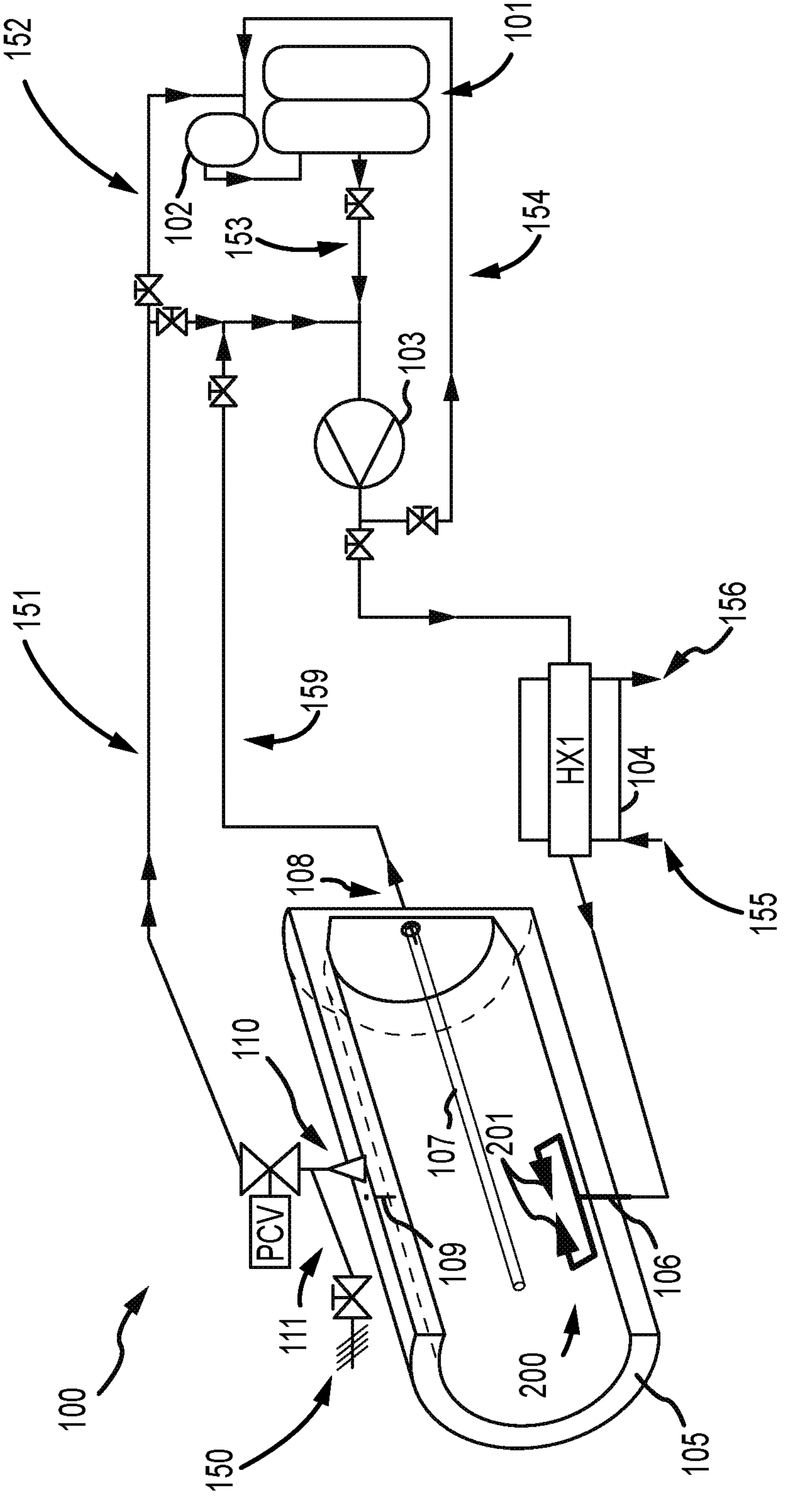
FIG. 1 represents an illustrative process and corresponding component arrangement to provide intersecting flows/streams of a working fluid out of multiple orifices within a pressure vessel.

Before explaining the disclosed embodiments of the present disclosure in detail, it is to be understood that the disclosed subject matter is not limited in its application to the details of the particular arrangements shown and/or described herein, since the disclosed subject matter is capable of other embodiments. Also, the terminology used herein is for the purpose of the description and not of limitation. In the following description, reference is made to the accompanying drawings that form a part hereof, and in which is shown by way of illustration specific embodiments which may be practiced.

Embodiments described herein enhance heat uptake through the nozzle assembly during compression and recirculation of the working fluid by creating a backpressure on the heat exchanger present in the piping system to attain and/or retain heat within the working fluid thus resulting in a more efficient and effective apparatus. Embodiments described herein also avoid the use of nozzles with significant constriction at the injection orifice thus reducing velocity effects which would detract heat from the working fluid prior to its contacting the payload.

Aspects of this disclosure pertain to a methodology and an apparatus that includes a nozzle assembly with, at minimum, one pair of injection orifices designed to face each other (at least so that their respective fluid streams intersect or collide) with minimal or no constriction to achieve various advantageous attributes including: reduction of significant decompression-driven acceleration, and thereof cooling, within the working fluid as it enters the larger volume high pressure system, reduction of heat shorting by reducing the velocity of the working fluid as it enters the larger volume high pressure system and thereby increasing of the interaction time between the working fluid and the payload within the larger volume high pressure system.

Aspects of this disclosure pertain to a system and a methodology for holding/building backpressure behind a nozzle without any tight nozzle constriction. Building and maintaining backpressure advantageously improves heat transfer upstream of the nozzle where a heater or heat exchanger is employed. Improving the upstream heat transfer supplies more heat to the working fluid and therefore to the vessel volume which the working fluid enters. Additional backpressure effects advantageously improve heat transfer from the working fluid to the thermally processed products.

A working fluid in accordance with the various embodiments addressed below include carbon dioxide, water, dry steam, nitrogen, oxygen, helium, argon, ethanol, ozone, air, exhaust (as from combustion), nitrous oxide, carbon monoxide, ethylene oxide, vaporized hydro peroxide and/or any other compressible or incompressible fluid. A working fluid in accordance with the various embodiments addressed below may be in a supercritical state when introduced into the vessel. A working fluid in accordance with the various embodiments addressed below may be used to thermally process a payload disposed within the pressure vessel. Thermal processing may include reducing the moisture content of the payload, depositing a material on the payload, depositing a material within the payload, sterilizing the payload, or any combination thereof. The payload may be of any appropriate type, including a food product, one or more medical devices, medical equipment, and personal protective equipment In one aspect, referring to FIG. 1, embodiments of the present disclosure are embodied by a processing system 100 that is configured for the achieving the necessary back pressure to attain the desirable heating within the working fluid.

According to the processing system 100 of FIG. 1, the working fluid, which may optionally be Carbon Dioxide (CO2), is stored in a receiver 101 (e.g., a working fluid supply) which is optionally held at 60-bar, and feeds fluid into an optional compressor 103, which pumps the CO2 into the heat exchanger 104, wherein the working fluid is heated to optionally above its critical temperature which is 31.1° C. for CO2 (e.g., hot water supply for the heat exchanger 104 being represented by reference numeral 155; hot water return for the heat exchanger 104 being represented by reference numeral 156).

After heating, the CO2 is fed into the larger volume high pressure vessel 105 through the injection orifices 201 of the nozzle assembly 200, wherein the working fluid is optionally maintained above its critical pressure which is 72 bar for CO2. For the purposes of this disclosure, high pressure is termed as anything above 5 bar. The above-noted delivery of CO2 from the receiver 101 to the high pressure vessel 105 is identified by reference numeral 153 in FIG. 1.

The working fluid is introduced into the high pressure vessel 105 (e.g., 1650L) from the inlet at the bottom of the vessel 105 with a leak-proof ½" pass through fitting 106. This pass through fitting 106 connects to the injection orifices 201 of the nozzle assembly 200. The high pressure vessel 105 includes an optional center tube 107 connected to the port 108 which serves as an outlet port from the vessel 105 along with another outlet port 109 from the vessel 105, located at the top of the vessel 105. The outlet port 108 optionally sends the working fluid back to the compressor 103 during the recirculation of the fluid for either increasing or maintaining the existing operating temperature within the high pressure vessel 105 during the operation (e.g., reference numeral 159 in FIG. 1). Injecting the working fluid at the bottom of the vessel 105 reduces the formation of temperature gradient within the high pressure vessel 105 during the operation. The other outlet port 109 optionally serves a portal to vent out the working fluid to the atmosphere (e.g., reference numeral 150 in FIG. 1) and/or to the receiver 101 at the end of the operation cycle (e.g., reference numerals 151 and 152 in FIG. 1; a "pumpdown" back to the receiver 101 (151); a "blowdown" back to the receiver 101 (152)). The vented outflow from the vessel 105 is both directed and controlled by valves at connection point 110 which are the top outlet manifold 111 and can optionally direct the vented outflow to the receiver 101 (151, 152), to the compressors 103 inlet, or to the atmosphere (150). Vented outflow which is directed to the compressor's 103 inlet may optionally be compressed back into the receiver 101 (154).

Figure 2A:
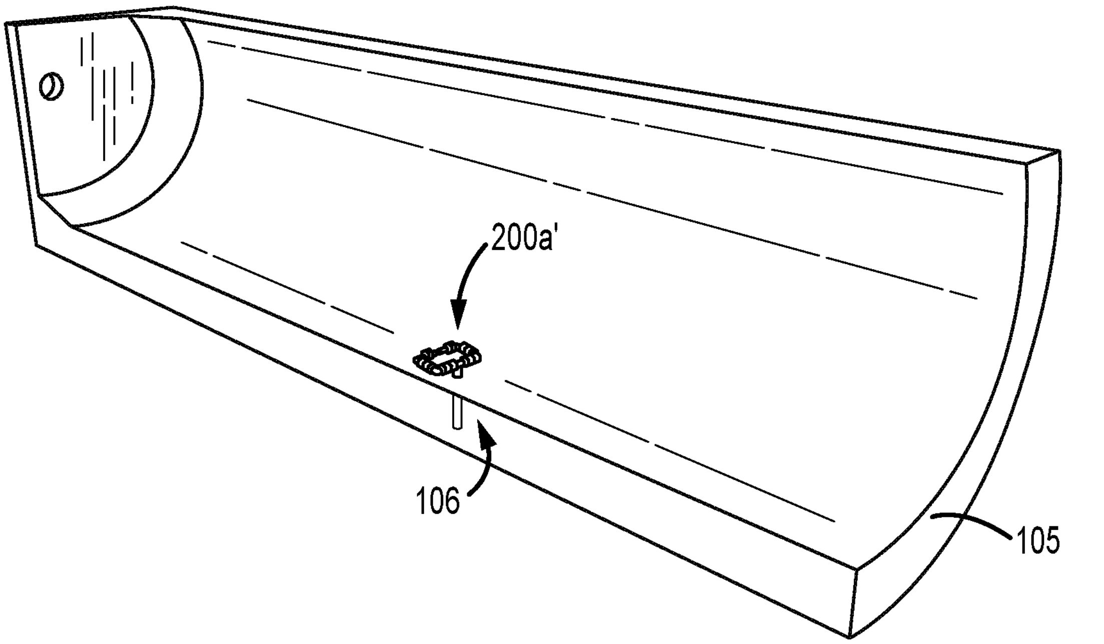
FIG. 2A is a representation of a tee shaped nozzle assembly with a pair of injection orifices connected directly onto a pass through fitting within the larger volume high pressure vessel.
Figure 2B:
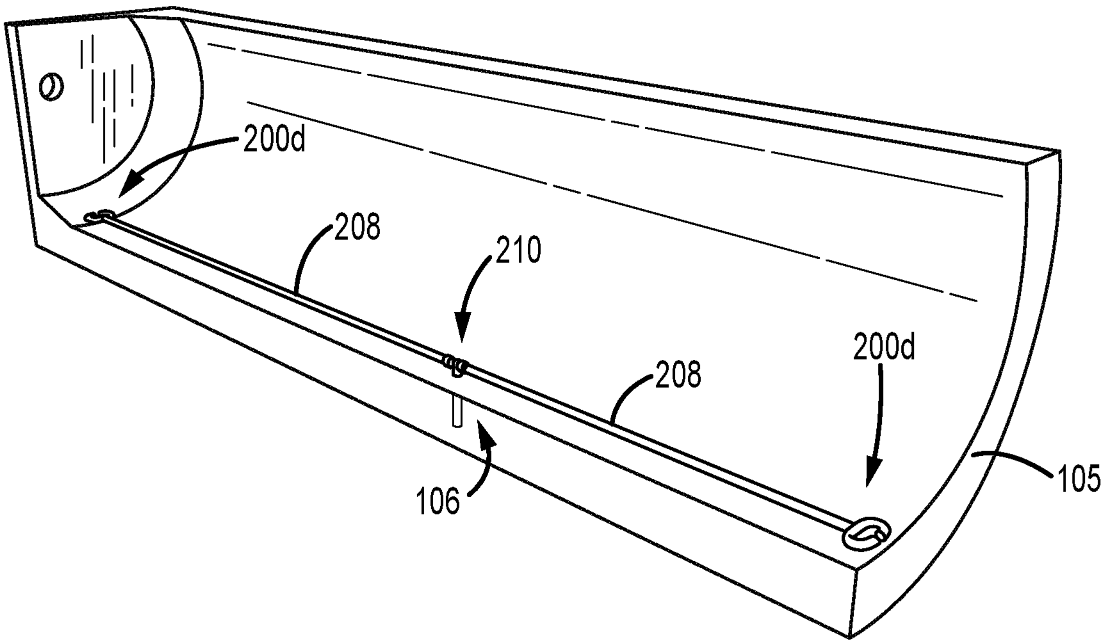
FIG. 2B is a representation of an outward tee involute shaped nozzle assembly and a nozzle assembly arrangement with 2 pairs of injection orifices connected to a pass through fitting and are placed on either side of the pass through fitting within the larger volume high pressure vessel.
Figure 2C:
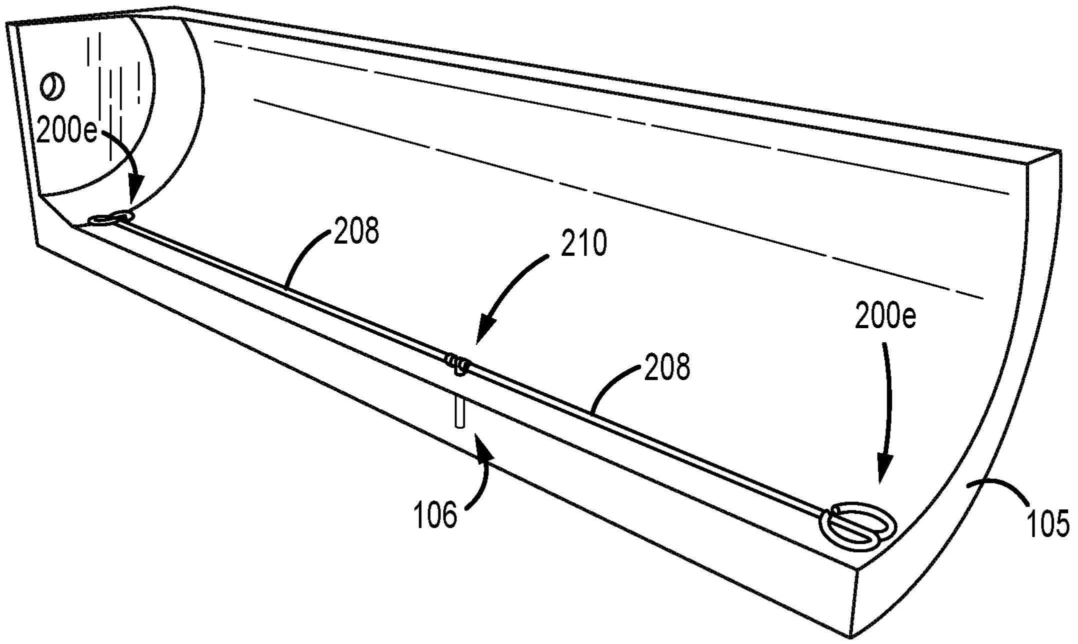
FIG. 2C is a representation of a Y involute shaped nozzle assembly and a nozzle assembly arrangement with 2 pairs of injection orifices connected to the pass through fitting and are placed on either side of the pass through fitting within the larger volume high pressure vessel.
Figure 2D:
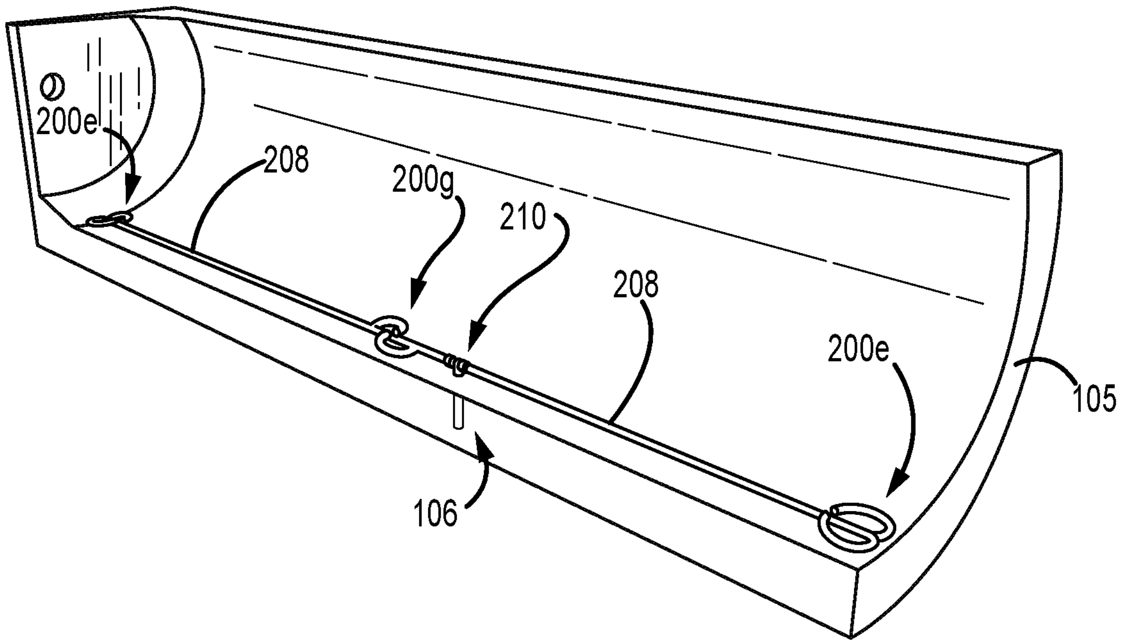
Figure 2E:
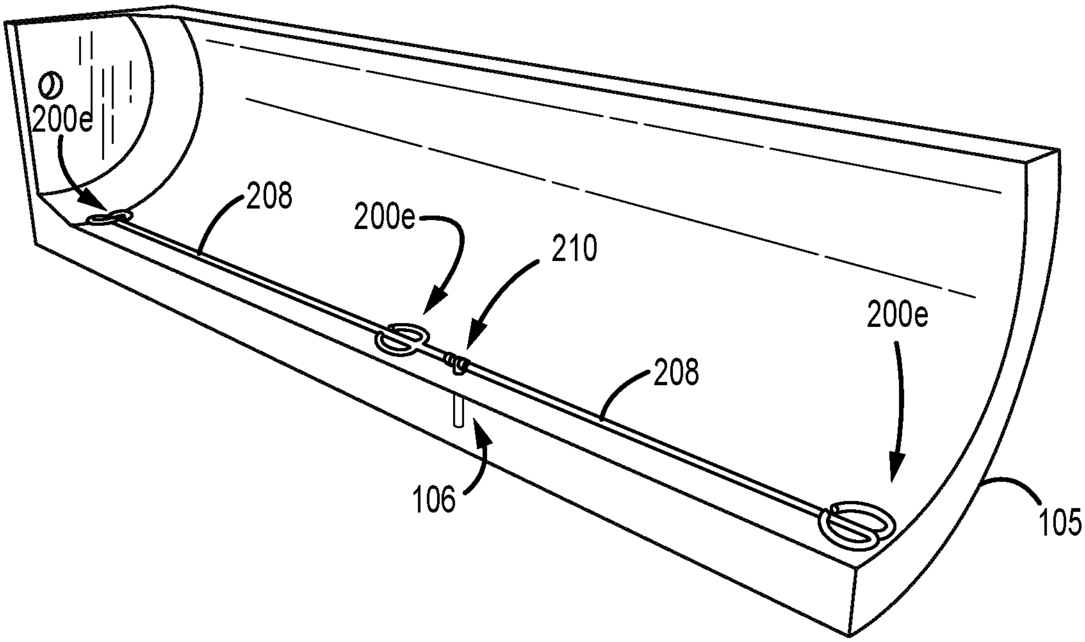
FIG. 2E is a representation of an outward tee shaped nozzle assembly and a nozzle assembly arrangement with 2 pairs of ¼" injection orifices with a 5° tilt from the horizontal connected to the pass through fitting and are placed on either side of the pass through fitting within the larger volume high pressure vessel.
Figure 2E:
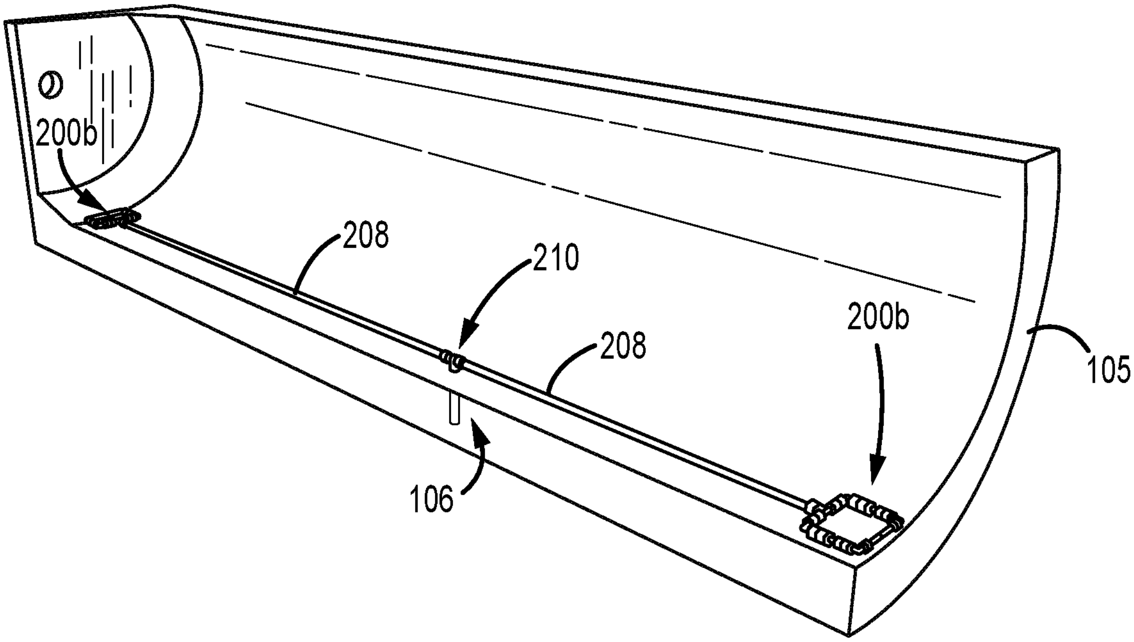
Figure 2F:
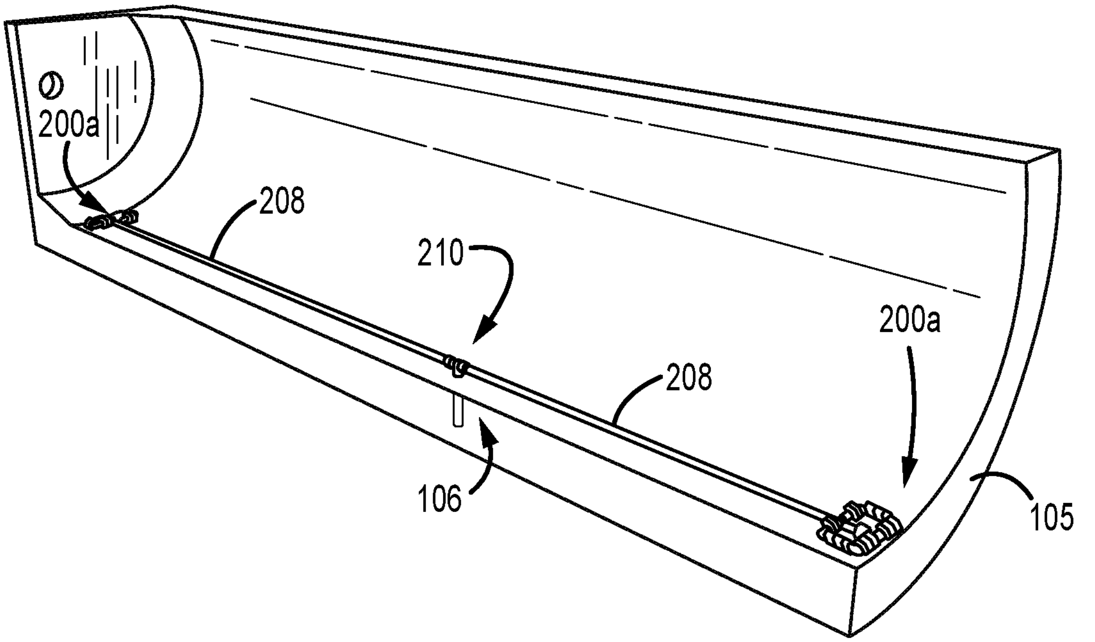
FIG. 2F is a representation of a tee shaped nozzle assembly and a nozzle assembly arrangement with 2 pairs of ½" injection orifices with a 9° tilt from the horizontal connected to the pass through fitting and are placed on either side of the pass through fitting within the larger volume high pressure vessel.
Figure 2G:
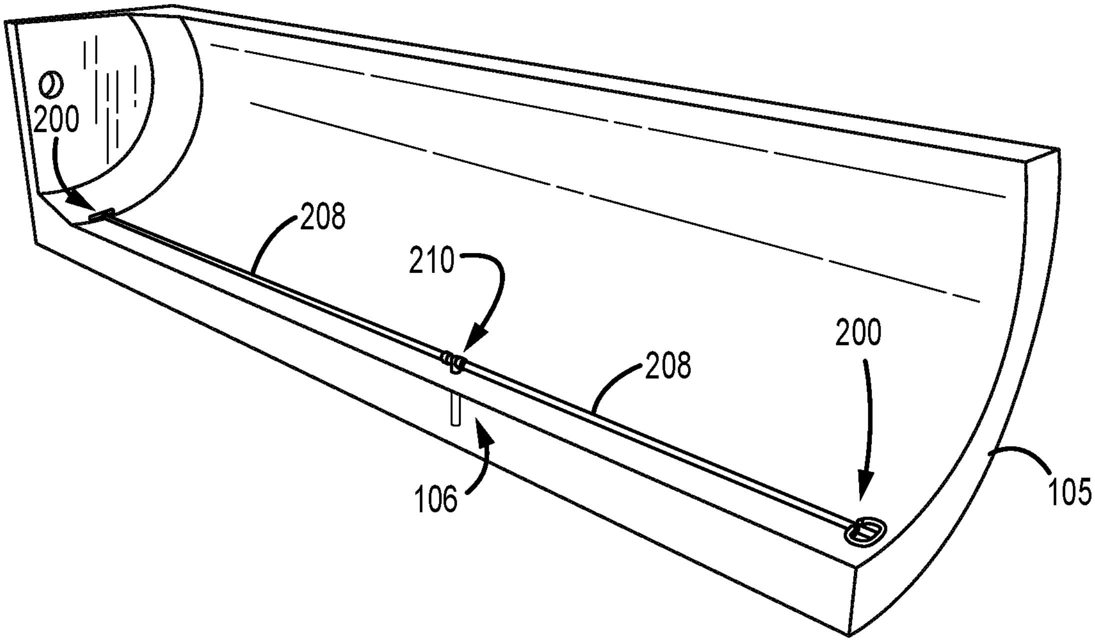
FIG. 2G is a representation of a tee involute shaped nozzle assembly and a nozzle assembly arrangement with 2 pairs of ½" injection orifices with a 17° tilt from the horizontal connected to the pass through fitting and are placed on either side of the pass through fitting within the larger volume high pressure vessel.
Figure 2H:
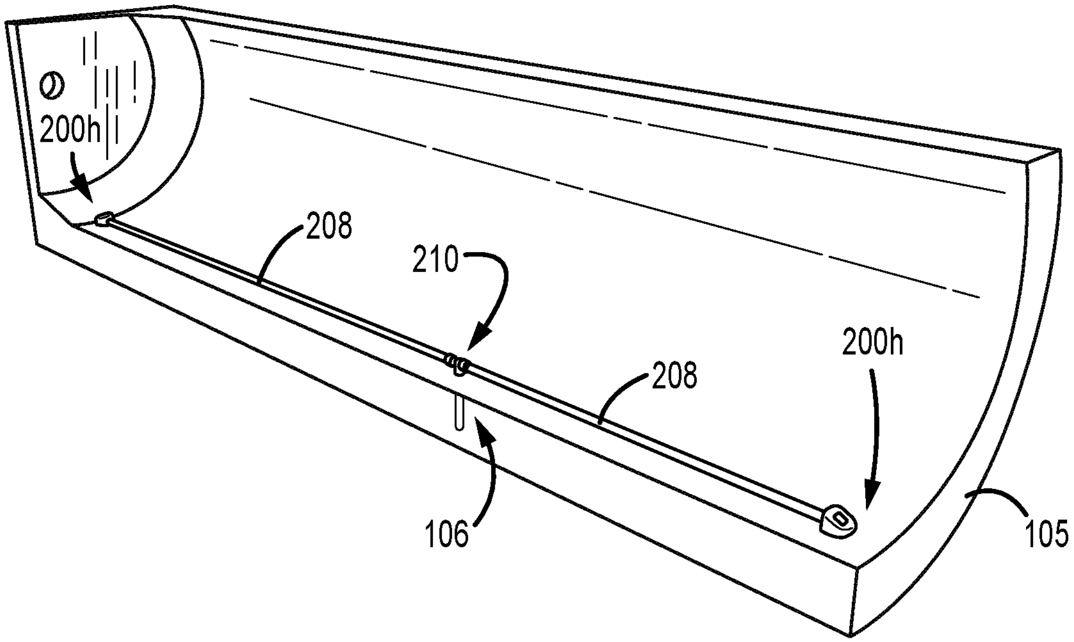
FIG. 2H is a representation of an enclosed tee involute shaped nozzle assembly and a nozzle assembly arrangement with 2 pairs of ½" injection orifices with a 17° tilt from the horizontal connected to the pass through fitting and are placed on either side of the pass through fitting within the larger volume high pressure vessel.
Figure 2I:
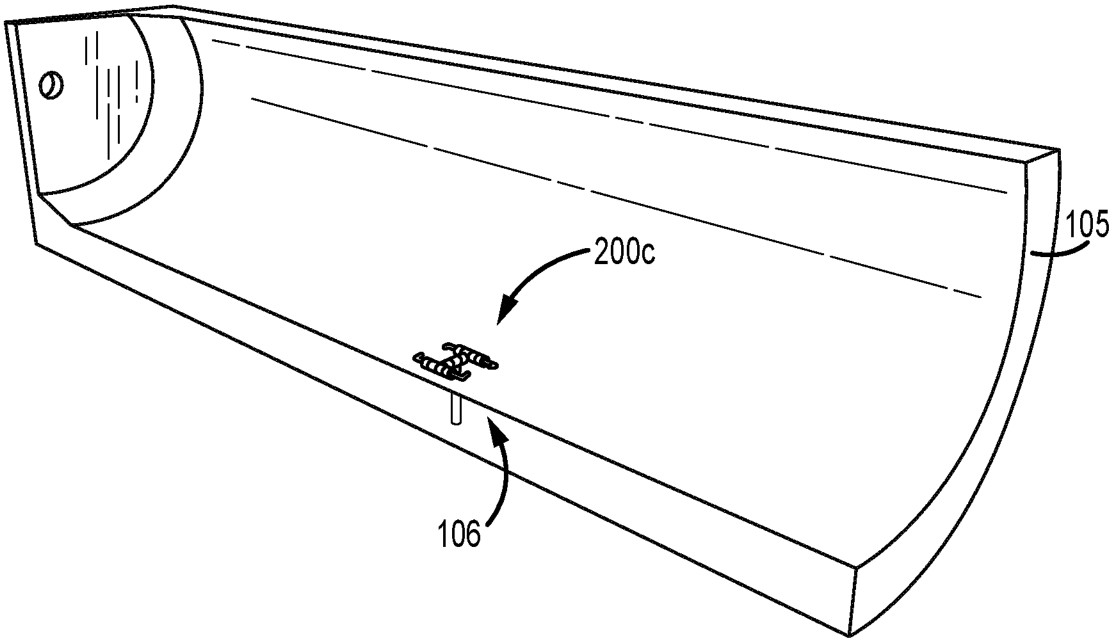
FIG. 2I is a representation of an H shaped nozzle assembly with 2 pairs of ¼" injection orifices with a 17° tilt from the horizontal connected to the pass through fitting.
Figure 2J:
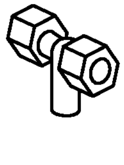
FIG. 2J is a representation of a 3-way Tee-fitting that may be positioned within the pressure vessel and that may be used to fluidly connect with multiple nozzle assemblies.
Figure 3A:
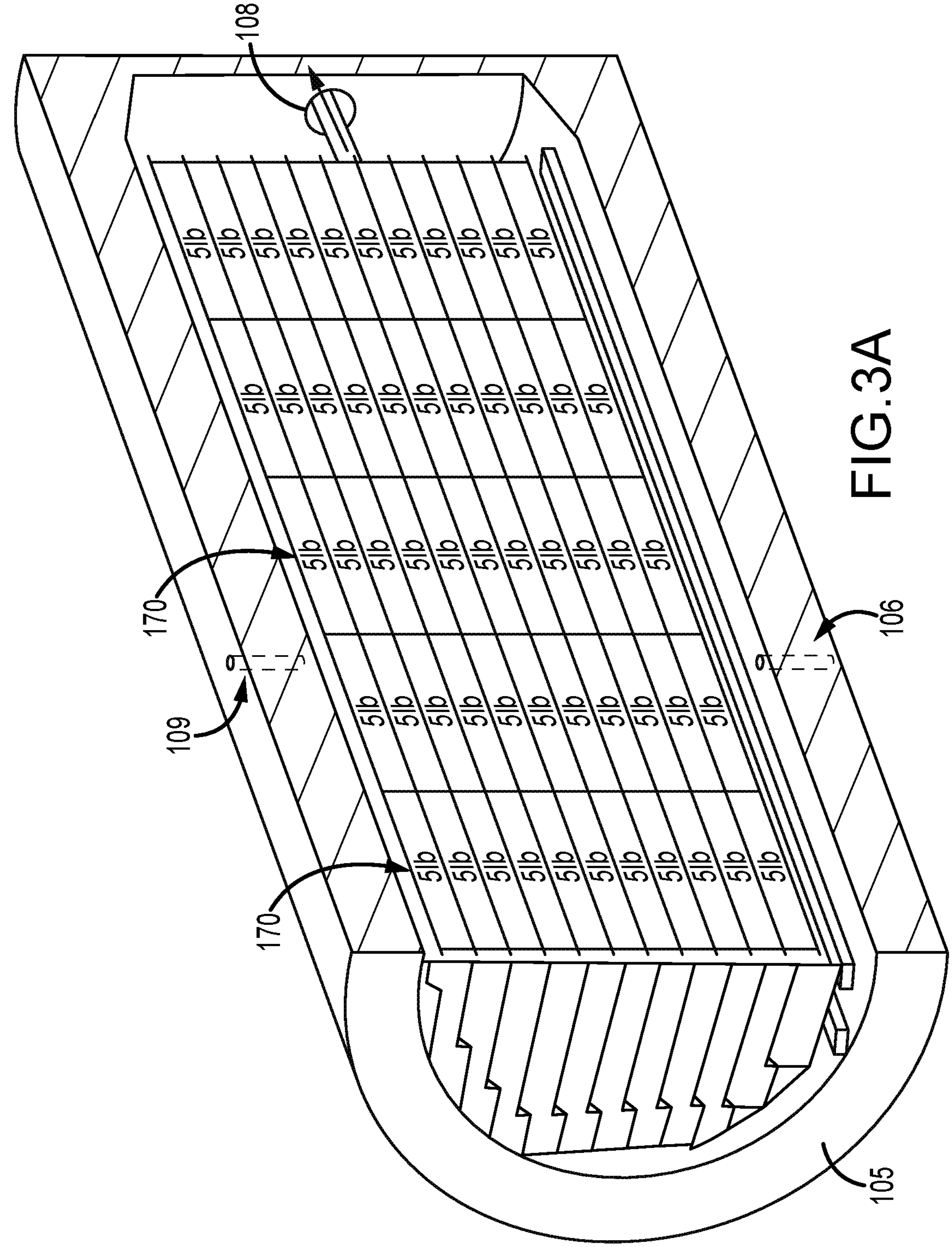
FIG. 3A is a representation of the arrangement in which the 275 pound total product being processed is loaded into the pressure vessel.
Figure 3B:
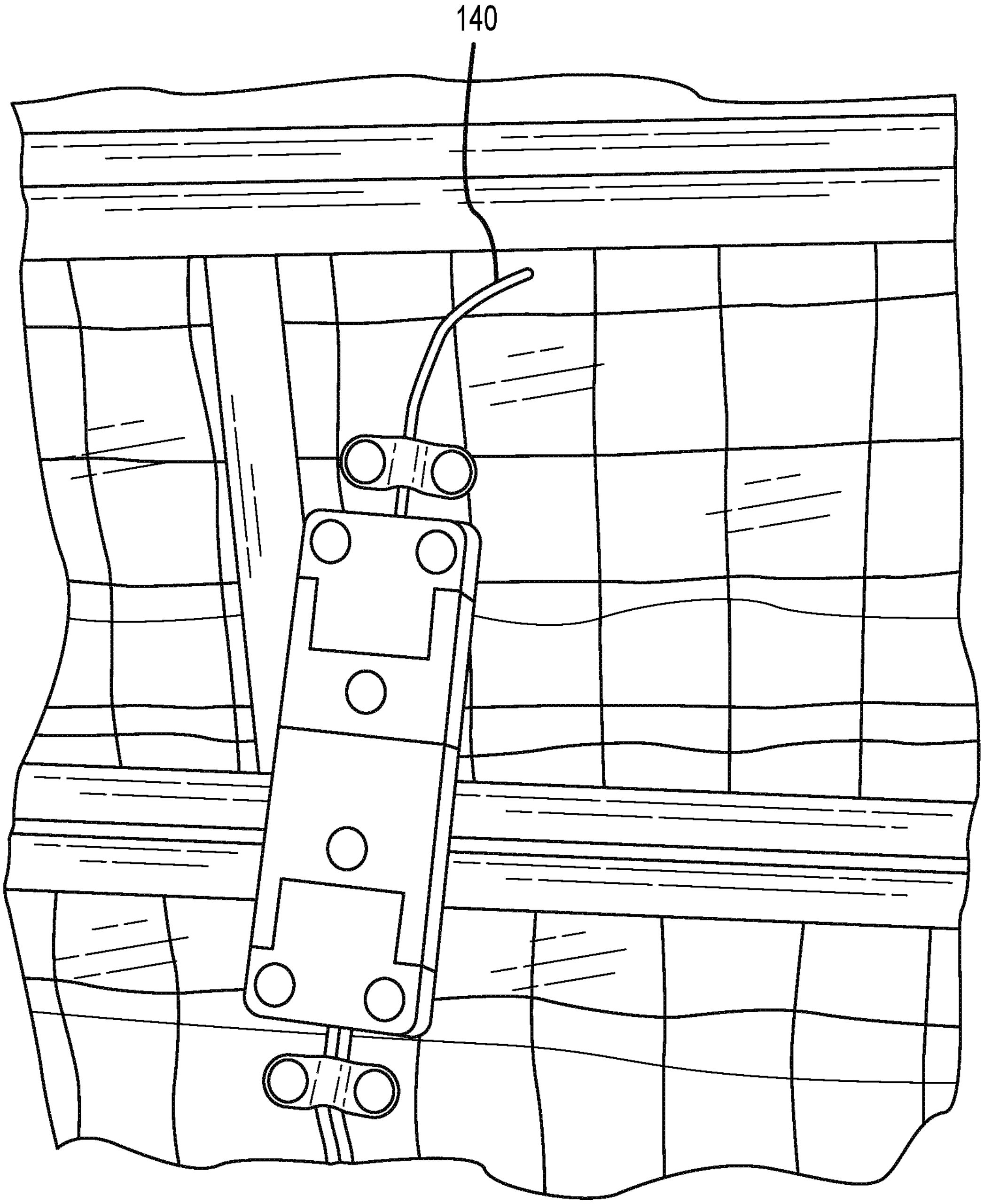
FIG. 3B is a representation of an individual bag of product that is placed within a basket in the stack with a temperature sensor to monitor the real time temperature of the product during the process.

Another aspect of the disclosure relates to the apparatus that includes an injection manifold, injector, or nozzle assembly 200, referenced in FIGS. 2A-2I (also refer to FIGS. 5-5H2) to practice the methodology disclosed herein. As shown in FIGS. 2A-2I, one or more nozzle assemblies may be disposed in the pressure vessel 105, for instance at/toward the bottom thereof. FIG. 2A shows a single nozzle assembly 200*a*' (e.g., similar to FIG. 5A, except that the inlet conduit 203 is rotated 90° in FIG. 2A compared to what is shown in FIG. 5A) at least generally midway between the two ends of the pressure vessel 105 and that is fluidly connected with the pass through fitting 106 (see also FIG. 3C for an additional view of this nozzle assembly arrangement installed within the high pressure vessel 105). FIG. 2B shows a pair of nozzle assemblies 200*d* (e.g., FIG. 5D) that are each fluidly connected with the pass through fitting 106 via a tee-fitting 210, each nozzle assembly 200*d* being disposed toward/at a corresponding end of the pressure vessel 105. FIG. 2C shows a pair of nozzle assemblies 200*e* (e.g., FIG. 5E) that are each fluidly connected with the pass through fitting 106 via a tee-fitting 210, each nozzle assembly 200*e* being disposed toward/at a corresponding end of the pressure vessel 105 (see also FIG. 3E for an additional view of this nozzle assembly arrangement installed within the high pressure vessel 105). FIG. 2D shows three nozzle assemblies that are each fluidly connected with the pass through fitting 106 via a tee-fitting 210, two of the nozzle assemblies 200*e* (e.g., FIG. 5E) being disposed toward/at a corresponding end of the pressure vessel 105, with another nozzle assembly 200*g* (e.g., FIG. 5G1, which presents a view of the nozzle assembly 200*g* that may be used at an intermediate location along an injection pipe) being disposed therebetween (see also FIG. 3F2 for an additional view of this nozzle assembly arrangement installed within the high pressure vessel 105). FIG. 2D1 shows three nozzle assemblies 200*e* (e.g., FIG. 5E) that are each fluidly connected with the pass through fitting 106 via a tee-fitting 210, two of the nozzle assemblies 200*e* being disposed toward/at a corresponding end of the pressure vessel 105, with another nozzle assembly 200*e* being disposed therebetween (see also FIG. 3F1 for an additional view of this nozzle assembly arrangement installed within the high pressure vessel 105). FIG. 2E shows a pair of nozzle assemblies 200*b* (e.g., FIG. 5B) that are each fluidly connected with the pass through fitting 106 via a tee-fitting 210, each nozzle assembly 200*b* being disposed toward/at a corresponding end of the pressure vessel 105 (see also FIG. 3G for an additional view of this nozzle assembly arrangement installed within the high pressure vessel 105). FIG. 2F shows a pair of nozzle assemblies 200*a* (e.g., FIG. 5A) that are each fluidly connected with the pass through fitting 106 via a tee-fitting 210, each nozzle assembly 200*a* being disposed toward/at a corresponding end of the pressure vessel 105 (see also FIG. 3H for an additional view of this nozzle assembly arrangement installed within the high pressure vessel 105). FIG. 2G shows a pair of nozzle assemblies 200 (e.g., FIG. 5) that are each fluidly connected with the pass through fitting 106 via a tee-fitting 210, each nozzle assembly 200 being disposed toward/at a corresponding end of the pressure vessel 105 (see also FIG. 3I for an additional view of this nozzle assembly arrangement installed within the high pressure vessel 105). FIG. 2H shows a pair of nozzle assemblies 200*h* (e.g., FIGS. 5H1 and 5H2), that are each fluidly connected with the pass through fitting 106 via a tee-fitting 210, each nozzle assembly 200*h* being disposed toward/at a corresponding end of the pressure vessel 105. FIG. 2I shows a single nozzle assembly 200*c* (e.g., FIG. 5C) that is fluidly connected with the pass through fitting 106, and that is located at least generally midway between the two ends of the pressure vessel 105 (see also FIG. 3J for an additional view of this nozzle assembly arrangement installed within the high pressure vessel 105). FIG. 2J shows an enlarged view of the above-noted tee-fitting 210 (see also FIG. 3M for an additional view of tee-fitting 210 installed within the high pressure vessel 105).

Figure 5:
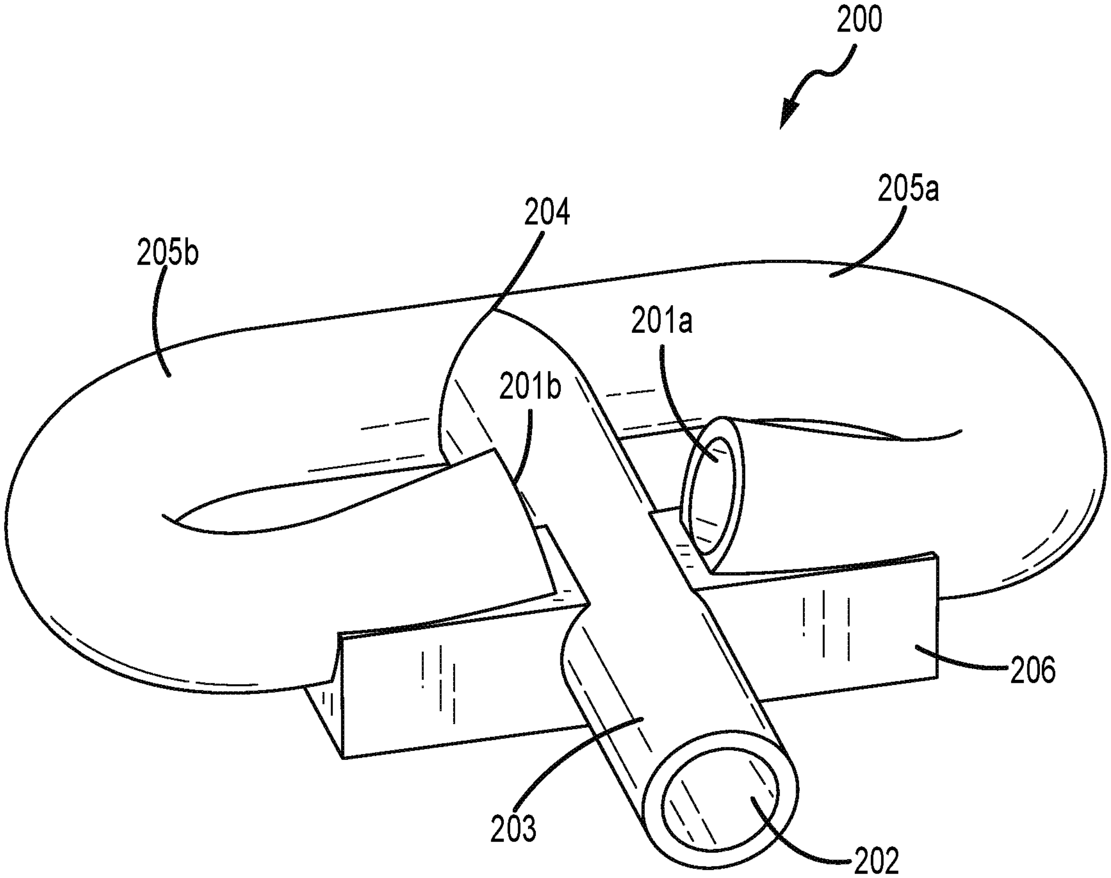
FIG. 5 is a perspective view of a Tee Involute shaped nozzle assembly.
Figure 5A:
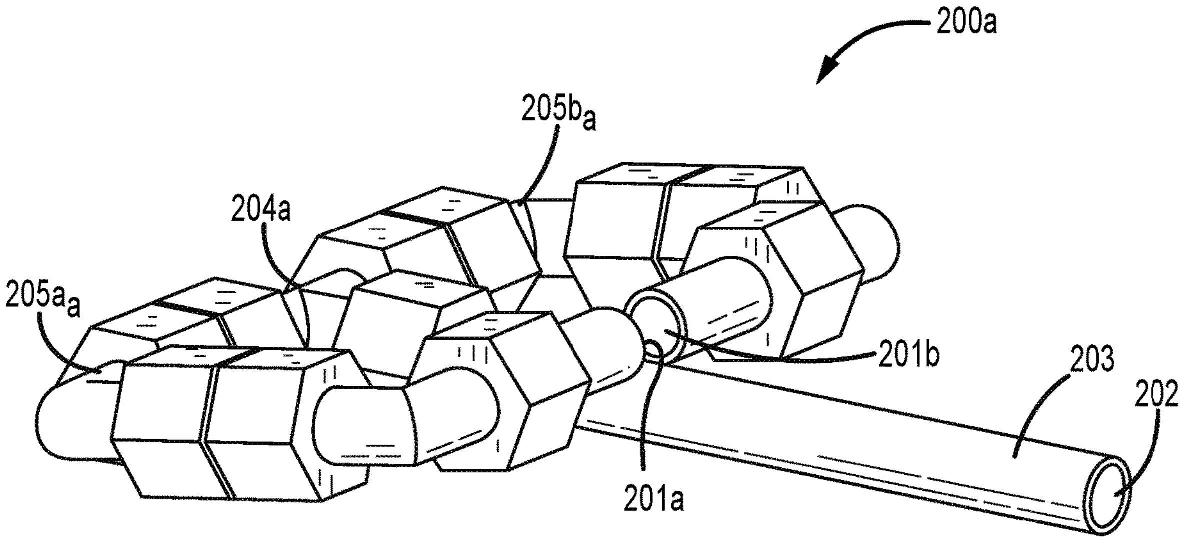
FIG. 5A is a perspective view of a Tee shaped nozzle assembly.

During the beginning of the process cycle and referring again to FIG. 1, as the working fluid is fed to the compressor 103 from the receiver 101 and proceeds to pass through the heat exchanger 104 after being compressed, this heated working fluid that is optionally carbon dioxide above 31.1° C. is injected through the nozzle assembly 200 that is shown in FIG. 2G and FIG. 5. FIG. 2G shows a pair of nozzles assemblies 200 disposed within the interior of pressure vessel 105 (one generally at each end of the pressure vessel 105), and that are fluidly connected by a working fluid supply conduit 208 that is disposed at/toward the bottom of the pressure vessel 105. The nozzle assembly 200 terminates at the pass-through fitting 106 and finally exits into the high pressure vessel 105 through the injection orifices 201*a* and 201*b*. The pass-through fitting 106 may be interconnected to the inlet 202 of the nozzle assembly 200 via one or more quick disconnects and/or one or more threaded fittings. This inlet 202, via a straight connection duct or an inlet conduit 203 (which is fluidly interconnected with/extends from/is colinear with the working fluid supply conduit 208 in the case of the nozzle assembly 200; the inlet conduit 203 of the nozzle assemblies addressed herein may be characterized as an end section of the working fluid conduit 208, but the inlet conduit 203 may also be interconnected with the working fluid conduit 208 in any appropriate manner), leads to a junction or an injection manifold 204, which optionally has a geometry of a "Tee Involute shape". As the working fluid passes through the injection manifold 204, it exerts force on the pipes at the turns which builds backpressure accompanied by adiabatic heating of the fluid and the nozzle assembly 200 as velocity and internal pressure energy are converted to heat. Some of this heat remains in the working fluid and some is lost to the pipe-bends; however, because these pipe-bends are components of 201*a*, 201*b*, 204, 205*a* and 205*b* they are inherently inside the vessel 105 and therefore this heat lost from the working fluid is not lost from the system 100. Finally the injection orifices 201*a* and 201*b* are connected to the injection manifold 204 through the connection ducts 205*a* and 205*b* which are each designed to turn 180°, to thus have the injection orifices 201*a* and 201*b* face each other with a distance of optionally 9 mm or greater between them at an angle of 0° (illustrated) or greater (not shown in FIG. 5, but see, for instance, FIG. 5A) from the horizontal. A horizontal support platform 206 is optionally provided to prevent misalignment between the injection orifices 201*a*, 201*b*, but which may be necessary to create the backpressure immediately after the injection orifices 201*a*, 201*b*. The connection ducts 205*a* and 205*b* are shaped to direct injection orifices 201*a* and 201*b* at each other in opposition. Connection ducts 205*a* and 205*b* may optionally have congruent, reflected, or dissimilar geometries. The time duration required for the thermal processing cycle which employs the nozzle assembly 200 is dependent on the desired pressure and temperature to be maintained within the larger volume high pressure vessel 105. The required duration can also depend on the type of product being processed, dimensions and geometry of the product, mass flow rate of the working fluid and mass load of the product per batch within the high pressure vessel 105. In some implementations, the processing cycle during which a nozzle assembly system or arrangement, in accordance with this disclosure, is utilized for attaining the operating conditions is maintained for about 30 seconds to about 60 minutes. In some implementations, the processing cycle during which a nozzle assembly system or arrangement, in accordance with this disclosure, is utilized for attaining the operating conditions is maintained for about 30 seconds to about 50 minutes. In some implementations, the processing cycle during which a nozzle assembly system or arrangement, in accordance with this disclosure, is utilized for attaining the operating conditions is maintained for about 30 seconds to about 40 minutes. In some implementations, the processing cycle during which a nozzle assembly system or arrangement, in accordance with this disclosure, is utilized for attaining the operating conditions is maintained for about 30 seconds to about 30 minutes. In some implementations, the processing cycle during which a nozzle assembly system or arrangement, in accordance with this disclosure, is utilized for attaining the operating conditions is maintained for about 30 seconds to about 20 minutes. In some implementations, the processing cycle during which a nozzle assembly system or arrangement, in accordance with this disclosure, is utilized for attaining the operating conditions is maintained for about 30 seconds to about 10 minutes. In some implementations, the processing cycle during which a nozzle assembly system or arrangement, in accordance with this disclosure, is utilized for attaining the operating conditions is maintained for about 30 seconds to about 5 minutes. In some implementations, the processing cycle during which a nozzle assembly system or arrangement, in accordance with this disclosure, is utilized for attaining the operating conditions is maintained for about 30 seconds to about 4 minutes. In some implementations, the processing cycle during which a nozzle assembly system or arrangement, in accordance with this disclosure, is utilized for attaining the operating conditions is maintained for about 30 seconds to about 3 minutes. In some implementations, the processing cycle during which a nozzle assembly system or arrangement, in accordance with this disclosure, is utilized for attaining the operating conditions is maintained for about 30 seconds to about 2 minutes. In some implementations, the processing cycle during which a nozzle assembly system or arrangement, in accordance with this disclosure, is utilized for attaining the operating conditions is maintained for about 30 seconds to about 1 minute. In some implementations, the processing cycle during which a nozzle assembly system or arrangement, in accordance with this disclosure, is utilized for attaining the operating conditions is maintained for about 1 minute to about 5 minutes. In some implementations, the processing cycle during which a nozzle assembly system or arrangement, in accordance with this disclosure, is utilized for attaining the operating conditions is maintained for about 5 minutes to about 10 minutes. In some implementations, the processing cycle during which a nozzle assembly system or arrangement, in accordance with this disclosure, is utilized for attaining the operating conditions is maintained for about 8 minutes to about 12 minutes.

With continued reference to FIG. 1, the first phase of the thermal processing cycle is complete once the high pressure vessel 105 containing the product to be thermally processed is brought to the desired operating pressure and temperature conditions by compressing the working fluid and injecting it into the vessel 105 via the piping system. The optional second phase of the thermal processing cycle continues to employ a nozzle assembly system or arrangement, in accordance with this disclosure, to maintain these operating conditions within the high pressure vessel 105 for a desired time period depending on type of product being processed by recirculating the working fluid from the high pressure vessel 105, through the compressor 103, through the heat exchanger 104, and back to the high pressure vessel 105 (159). In some implementations, the processing cycle during which a nozzle assembly system or arrangement, in accordance with this disclosure, is utilized for maintaining the operating conditions is maintained for about 30 seconds to about 60 minutes. In some implementations, the processing cycle during which a nozzle assembly system or arrangement, in accordance with this disclosure, is utilized for maintaining the operating conditions is maintained for about 30 seconds to about 50 minutes. In some implementations, the processing cycle during which a nozzle assembly system or arrangement, in accordance with this disclosure, is utilized for maintaining the operating conditions is maintained for about 30 seconds to about 40 minutes. In some implementations, the processing cycle during which a nozzle assembly system or arrangement, in accordance with this disclosure, is utilized for maintaining the operating conditions is maintained for about 30 seconds to about 30 minutes. In some implementations, the processing cycle during which a nozzle assembly system or arrangement, in accordance with this disclosure, is utilized for maintaining the operating conditions is maintained for about 30 seconds to about 20 minutes. In some implementations, the processing cycle during which a nozzle assembly system or arrangement, in accordance with this disclosure, is utilized for maintaining the operating conditions is maintained for about 30 seconds to about 10 minutes. In some implementations, the processing cycle during which a nozzle assembly system or arrangement, in accordance with this disclosure, is utilized for maintaining the operating conditions is maintained for about 30 seconds to about 5 minutes. In some implementations, the processing cycle during which a nozzle assembly system or arrangement, in accordance with this disclosure, is utilized for maintaining the operating conditions is maintained for about 30 seconds to about 4 minutes. In some implementations, the processing cycle during which a nozzle assembly system or arrangement, in accordance with this disclosure, is utilized for maintaining the operating conditions is maintained for about 30 seconds to about 3 minutes. In some implementations, the processing cycle during which a nozzle assembly system or arrangement, in accordance with this disclosure, is utilized for maintaining the operating conditions is maintained for about 30 seconds to about 2 minutes. In some implementations, the processing cycle during which a nozzle assembly system or arrangement, in accordance with this disclosure, is utilized for maintaining the operating conditions is maintained for about 30 seconds to about 1 minute. In some implementations, the processing cycle during which a nozzle assembly system or arrangement, in accordance with this disclosure, is utilized for maintaining the operating conditions is maintained for about 1 minute to about 5 minutes. In some implementations, the processing cycle during which a nozzle assembly system or arrangement, in accordance with this disclosure, is utilized for maintaining the operating conditions is maintained for about 5 minutes to about 10 minutes. In some implementations, the processing cycle during which a nozzle assembly system or arrangement, in accordance with this disclosure, is utilized for maintaining the operating conditions is maintained for about 8 minutes to about 12 minutes. The working fluid from the high pressure vessel 105 drawn out from the high pressure vessel 105 via the outlet port 108, which is connected to the inlet of the compressor 103 during the recirculation step (159), may maintain the existing operating temperature and pressure within the high pressure vessel 105 during the remainder part of the processing cycle.

After the completion of the recirculation step (e.g., 159) of the processing cycle utilized for maintaining the operating conditions and continuing to refer to FIG. 1, the high pressure vessel 105 may be depressurized in three steps. First, the other outlet port 109 is opened to the receiver 101 until the internal pressure within vessel 105 is optionally nearly equilibrated with receiver 101. Next, the working fluid is pumped from the vessel 105 to the receiver 101 via outlet port 109 and outlet port 108 and the compressor 103 (e.g., 151, 159, 152, 154). Finally, the system 100 is depressurized to zero-gauge pressure by opening the top manifold valve 110 to vent out the remainder of the working fluid into the atmosphere (150). If an incompressible working fluid chosen, such as water is, outlet valve 110 must be at the bottom of the vessel 105.

Figure 1A:
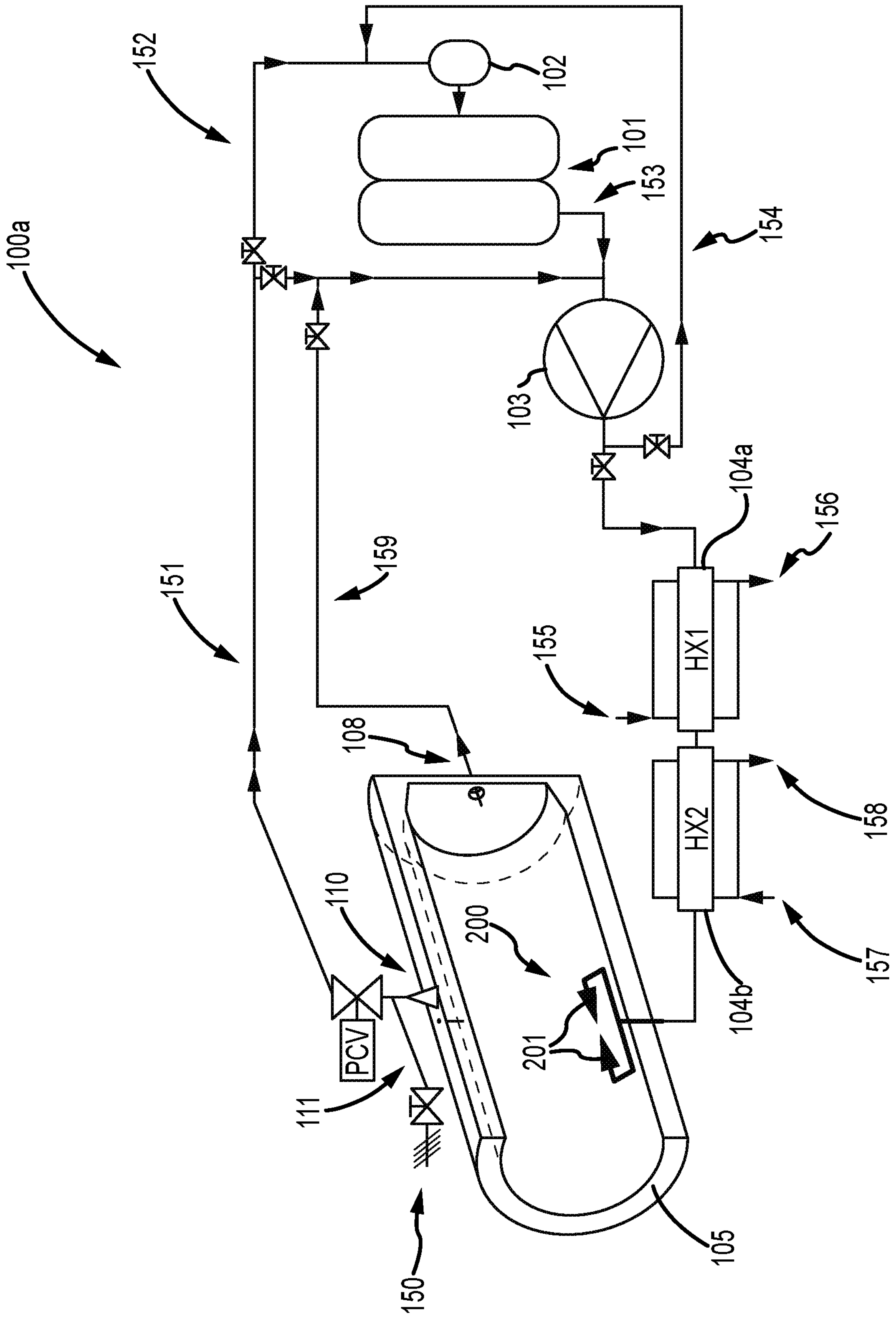
FIG. 1A represents an illustrative process and corresponding component arrangement (e.g., two heat exchangers in series) to provide intersecting flows/streams of a working fluid out of multiple orifices within a pressure vessel.

A variation of the processing system 100 of FIG. 1 is illustrated in FIG. 1A, is identified by reference numeral 100*a*, and where corresponding components are identified by the same reference numerals and with the foregoing discussion remaining applicable unless otherwise noted to the contrary. In the case of the processing system 100*a* of FIG. 1A, two heat exchangers 104*a*, 104*b* in series could be utilized, wherein the first heat exchanger 104*a* is located at or near the outlet of the compressor 103 and whereas the second heat exchanger 104*b* is located at or near the pass through fittings at the larger volume high pressure vessel 105, as shown in FIG. 1A. The heat exchanger 104*a* may be a "preheater (e.g., having a hot water supply (155) and a condensate return (156)), while the heat exchanger 104*b* may be a "superheater" (having a steam supply (157) and a condensate return (158)).

Figure 1B:
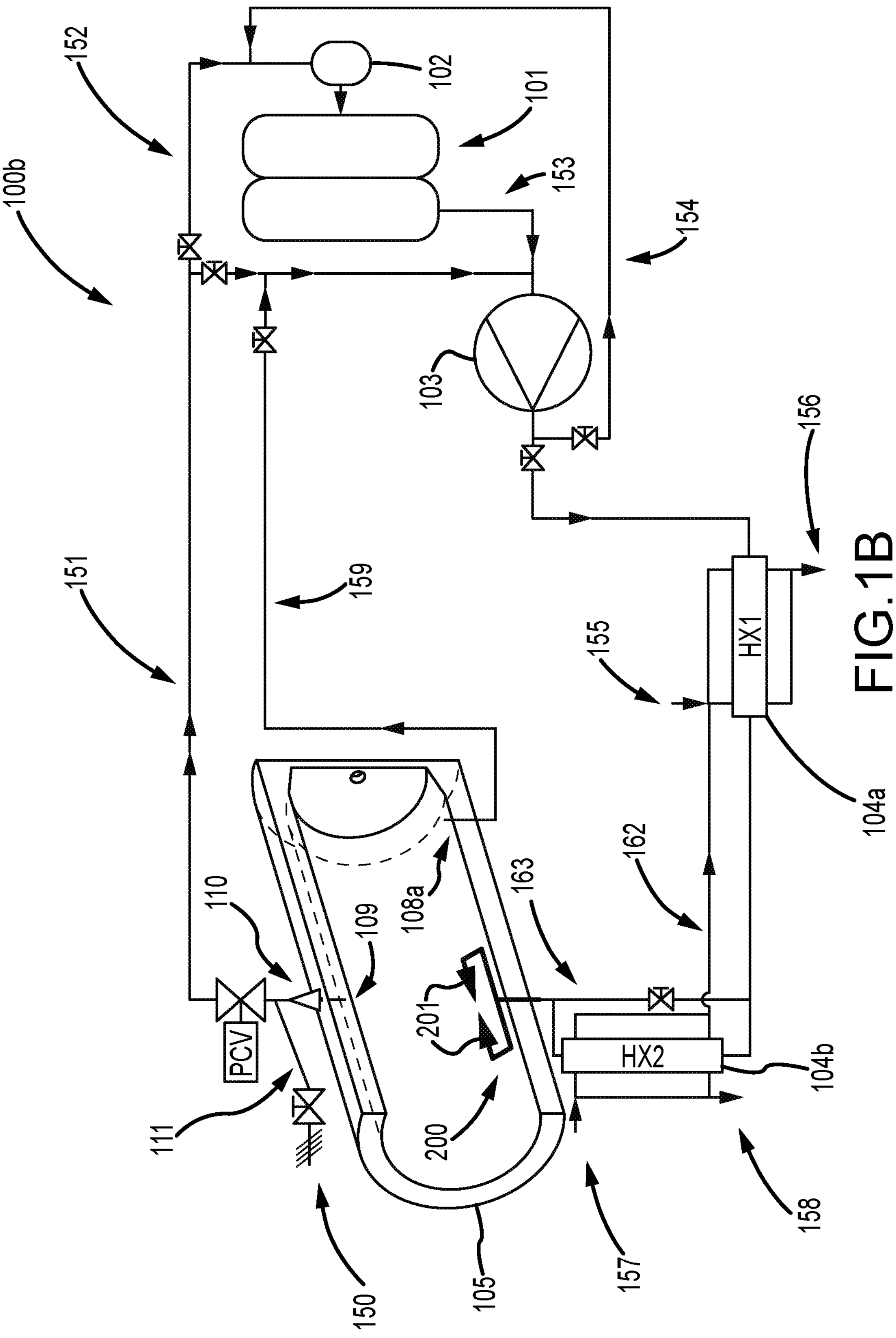
FIGS. 1B-1E each represent an illustrative process and corresponding component arrangements, that utilize different outlet and recirculation ports from what is presented in FIGS. 1 and/or 1A, but that each provide intersecting flows/streams of a working fluid out of multiple orifices within a pressure vessel.
Figure 1C:
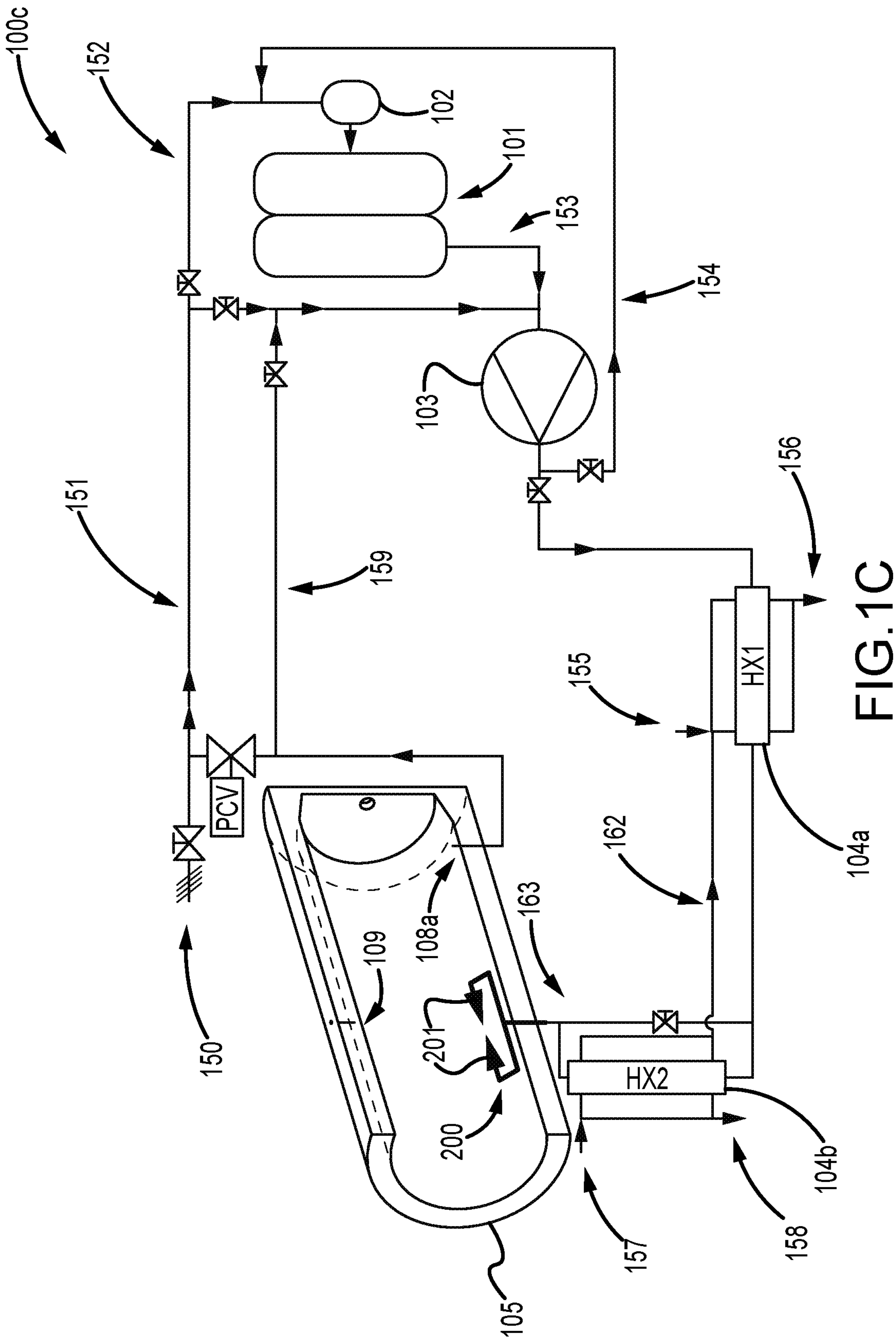

Another variation of the processing system 100 of FIG. 1 and the processing system 100*a* of FIG. 1A is illustrated in FIG. 1B, is identified by reference numeral 100*b*, and where corresponding components are identified by the same reference numerals and with the foregoing discussion remaining applicable unless otherwise noted to the contrary. In the case of the processing system 100*b* of FIG. 1B, the outlet port 108*a* is disposed at the bottom of the pressure vessel 105, and the heat exchangers 104*a*, 104*b* continue to be disposed in series but are disposed in different positions compared to the arrangement shown in FIG. 1A. The outlet port 108*a* of the processing system 100*c* of FIG. 1B could serve as a portal to depressurize the larger volume high pressure vessel 105 into the receiver 101 (e.g., 159, 154 & 151, 152), and the system 100*b* can thereafter be depressurized to zero-gauge pressure by opening the top manifold valve 110 to vent out the remainder of the working fluid into the atmosphere (150). Prior to this depressurization and in accord with the arrangement of FIGS. 1 and 1A, the portal 109 could serve as a portal to send the working fluid back to the compressor 103 during the recirculation step (e.g., 151) for maintaining the existing operating temperature within the high pressure vessel 105 during the processing cycle.

A variation of one or more of the processing system 100 of FIG. 1, the processing system 100*a* of FIG. 1A, and the processing system 100*b* of FIG. 1B is illustrated in FIG. 10, is identified by reference numeral 100*c*, and where corresponding components are identified by the same reference numerals and with the foregoing discussion remaining applicable unless otherwise noted to the contrary. In the case of the processing system 100*c* of FIG. 10, the outlet port 108*a* and the heat exchangers 104*a*, 104*b* remain in accord with the arrangement of FIG. 1B. The outlet port 108*a* of the processing system 100*c* of FIG. 10 could serve as a portal to send the working fluid back to the compressor 103 during the recirculation step (e.g., 159), could serve as a portal to depressurize the larger volume high pressure vessel 105 into the receiver 101 (e.g., 159, 154), and could serve to vent working fluid into the atmosphere in conjunction with the depressurization of the pressure vessel 105 (150).

Figure 1D:
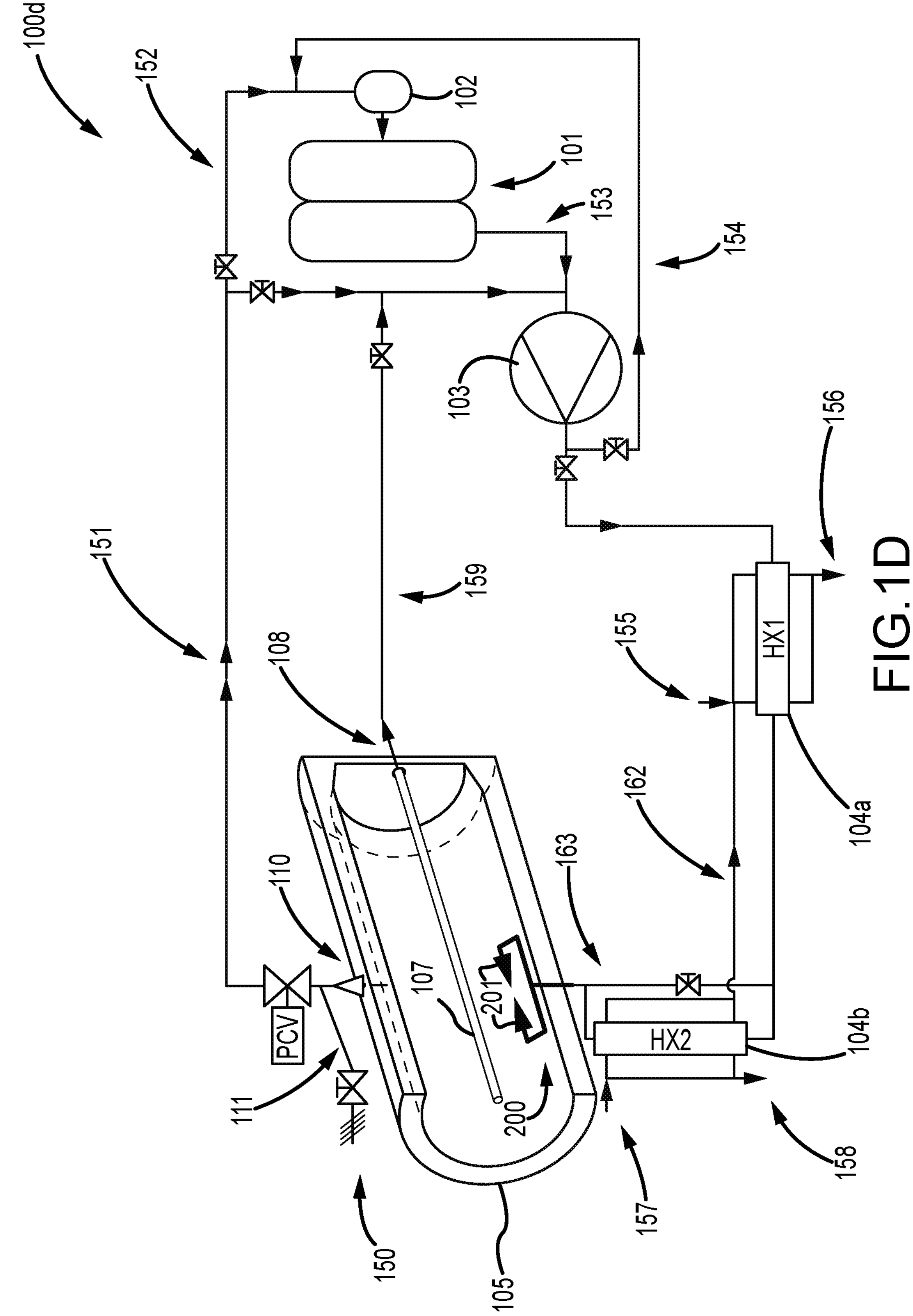

What may be viewed as a combination of the processing system 100 of FIG. 1 and the processing system 100*b* of FIG. 1B is illustrated in FIG. 1D, is identified by reference numeral 100*d*, and where corresponding components are identified by the same reference numerals and with the foregoing discussion remaining applicable unless otherwise noted to the contrary. In the case of the processing system 100*d* of FIG. 1D, the processing system 100*d* of FIG. 1D uses the center tube 107 of the arrangement of FIG. 1 and the heat exchanger arrangement of FIG. 1B.

Figure 1E:
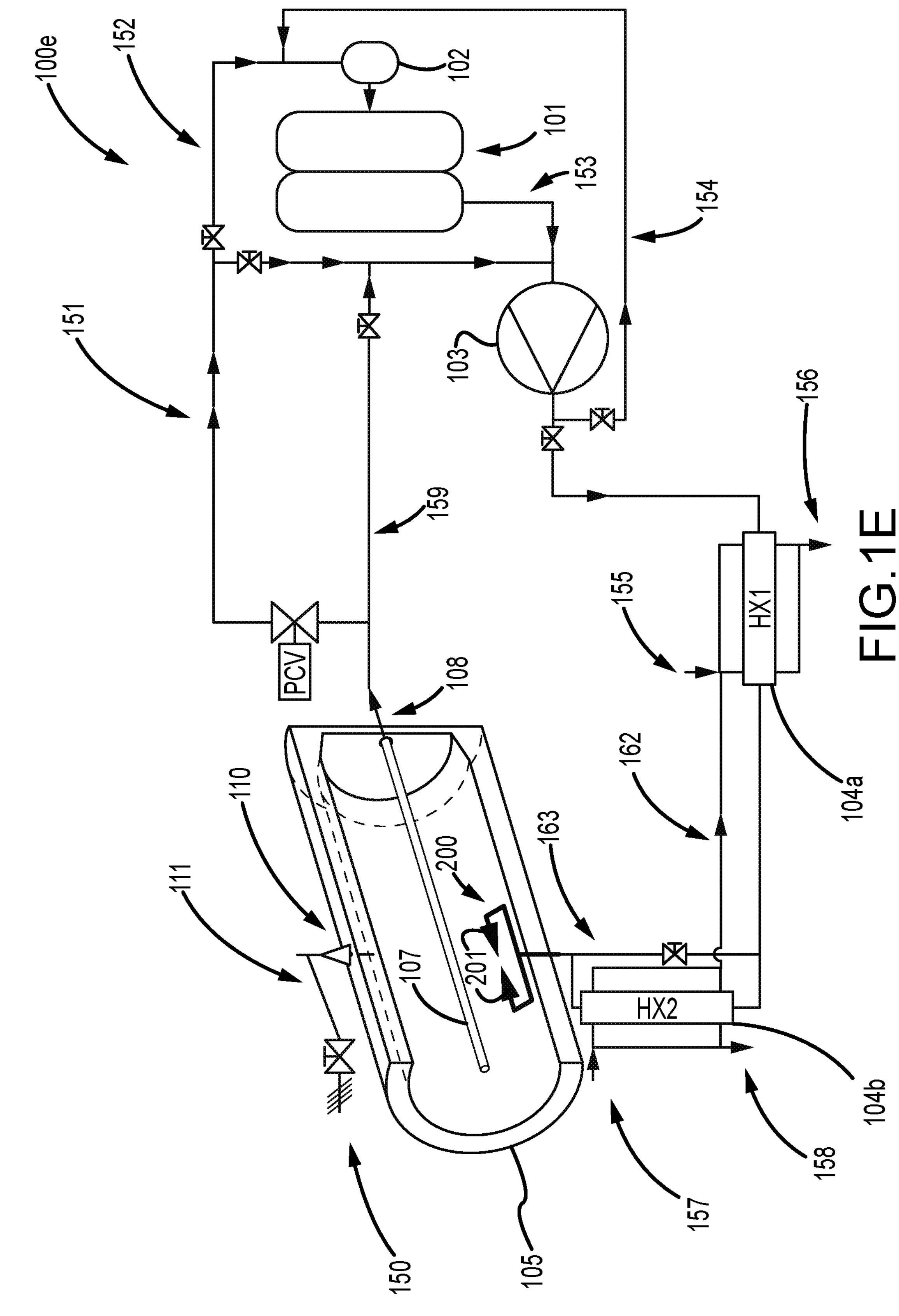

A further variation of one or more of the foregoing processing systems is illustrated in FIG. 1E, is identified by reference numeral 100*e*, and where corresponding components are identified by the same reference numerals and with the foregoing discussion remaining applicable unless otherwise noted to the contrary. In the case of the processing system 100*e* of FIG. 1E, the heat exchangers 104*a*, 104*b* are at least generally in accord with the arrangement of FIG. 1B. The outlet port 108 of the processing system 100*e* of FIG. 1E may be used: 1) to send the working fluid back to the compressor 103 during the recirculation of the fluid for either increasing or maintaining the existing operating temperature within the high pressure vessel 105 during the operation (e.g., 159); and 2) to vent out the working fluid from the pressure vessel 105 to the receiver 101 at the end of the operation cycle (151, 152).

A number of alternative embodiments of nozzle assemblies are illustrated in FIGS. 5A-5H2. Corresponding components between the nozzle assembly 200 of FIG. 5 and these other nozzle assemblies are identified by the same reference numeral, and the foregoing discussion remains applicable unless otherwise noted to the contrary. Each of these nozzle assemblies may be used in place of the nozzle assembly 200 of FIG. 5. Moreover, two or more of any of the nozzle assemblies of FIGS. 5-5H2 may be used in combination within the processing vessel 105.

In another embodiment of such a nozzle assembly 200*a*, reference may be made to FIGS. 5A and 2F. FIG. 2F shows a pair of nozzles assemblies 200*a* disposed within the interior of pressure vessel 105 (one generally at each end of the pressure vessel 105), and that are fluidly connected by the above-noted working fluid supply conduit 208. In the case of the nozzle assembly 200*a*, working fluid is introduced through the pass through fitting 106, which finally exits into the high pressure vessel 105 through the injection orifices 201*a* and 201*b*. The pass-through fitting 106 may be interconnected to the nozzle assembly inlet 202 via one or more quick disconnects and/or one or more threaded fittings. This inlet 202, via a straight connection duct or inlet conduit 203 (which is fluidly interconnected with/extends from/is colinear with the working fluid conduit 208), leads to a junction or an injection manifold 204*a*, which has a geometry of a "Tee shape". As the working fluid passes through the injection manifold 204*a*, it exerts force on the pipes at the turns which builds backpressure accompanied by adiabatic heating of the fluid and the nozzle assembly 200*a*. Finally the injection orifices 201*a* and 201*b* are connected to the injection manifold 204*a* through the connection ducts 205$a_a$ and 205$b_a$ which are each designed to turn a total of 180° in two 90° turns, to thus have the injection orifices 201*a* and 201*b* face each other with a distance of 9 mm or greater between them at an angle of 0° or greater from the horizontal. The design doesn't have a horizontal support platform to prevent misalignment between the injection orifices 201*a*, 201*b*, alignment being necessary to create the backpressure immediately after the injection orifices 201*a*, 201*b*, since various threaded fittings that make up complete nozzle assembly 200*a* can be reoriented as per need. The connection ducts 205$a_a$ and 205$b_a$ each can be designed at different turning angles although are needed to face each other with at least at an angle of 0° or greater from the horizontal.

Figure 5B:
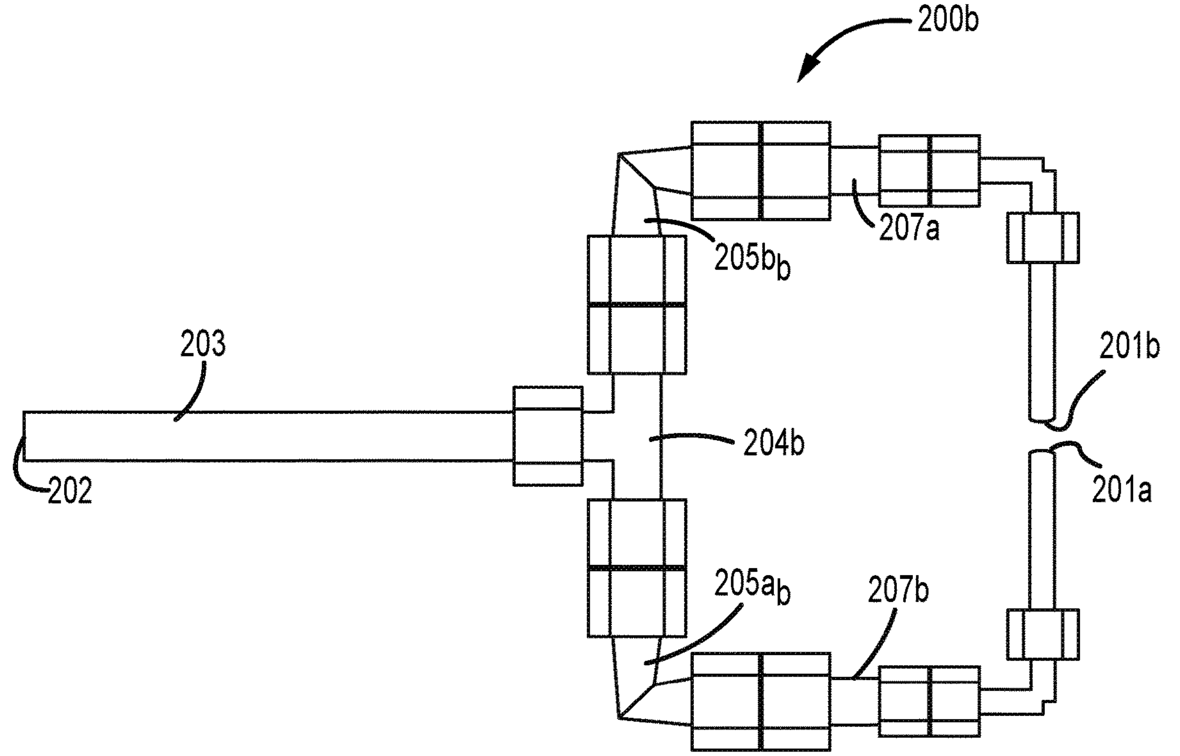
FIG. 5B is a top view of a Tee shaped nozzle assembly with 1 pair of ¼" injection orifices having a 17° tilt from the horizontal.

In another embodiment of such a nozzle assembly system 200*b*, reference may be made to FIGS. 5B and 2E. FIG. 2E shows a pair of nozzles assemblies 200*b* disposed within the interior of pressure vessel 105 (one generally at each end of the pressure vessel 105), and that are fluidly connected by the above-noted working fluid supply conduit 208. In the case of the nozzle assembly 200*b*, working fluid is introduced through the pass-through fitting 106, which finally exits into the high pressure vessel 105 through the injection orifices 201*a* and 201*b*. The pass-through fitting 106 may be interconnected to the nozzle assembly inlet 202 via one or more quick disconnects and/or one or more threaded fittings. This inlet 202, via a straight connection duct or inlet conduit 203 (which is fluidly interconnected with/extends from/is colinear with the working fluid conduit 208), leads to a junction or an injection manifold 204*b*, which has a geometry of a "Y shape". As the working fluid passes through the injection manifold 204*b*, it exerts force on the pipes at the turns which builds backpressure accompanied by adiabatic heating of the fluid and the nozzle assembly 200*b*. Finally the injection orifices 201*a* and 201*b* are connected to the injection manifold 204 through the connection ducts $\mathbf{205}a_b$ and $\mathbf{205}b_b$ which are each designed to turn a total of 180° in two 90° turns, to thus have the injection orifices 201*a* and 201*b* face each other with a distance of 9 mm or greater between them at an angle of 0° or greater from the horizontal. The design doesn't have a horizontal support platform to prevent misalignment between the injection orifices 201*a*, 201*b*, alignment being necessary to create the backpressure immediately after the injection orifices 201*a*, 201*b*, since various threaded fittings make up complete nozzle assembly 200*b* that can be reoriented as per need. The connection ducts $\mathbf{205}a_b$ and $\mathbf{205}b_b$ each can be designed at different turning angles (although are needed to face each other) with at least at an angle of 0° or greater from the horizontal. The nozzle assembly 200*b* could be characterized as the connection ducts $\mathbf{205}a_b$, $\mathbf{205}b_b$ being rotated slightly less than 180° from the nozzle assembly 200*a* of FIG. 5A.

Figure 3C:
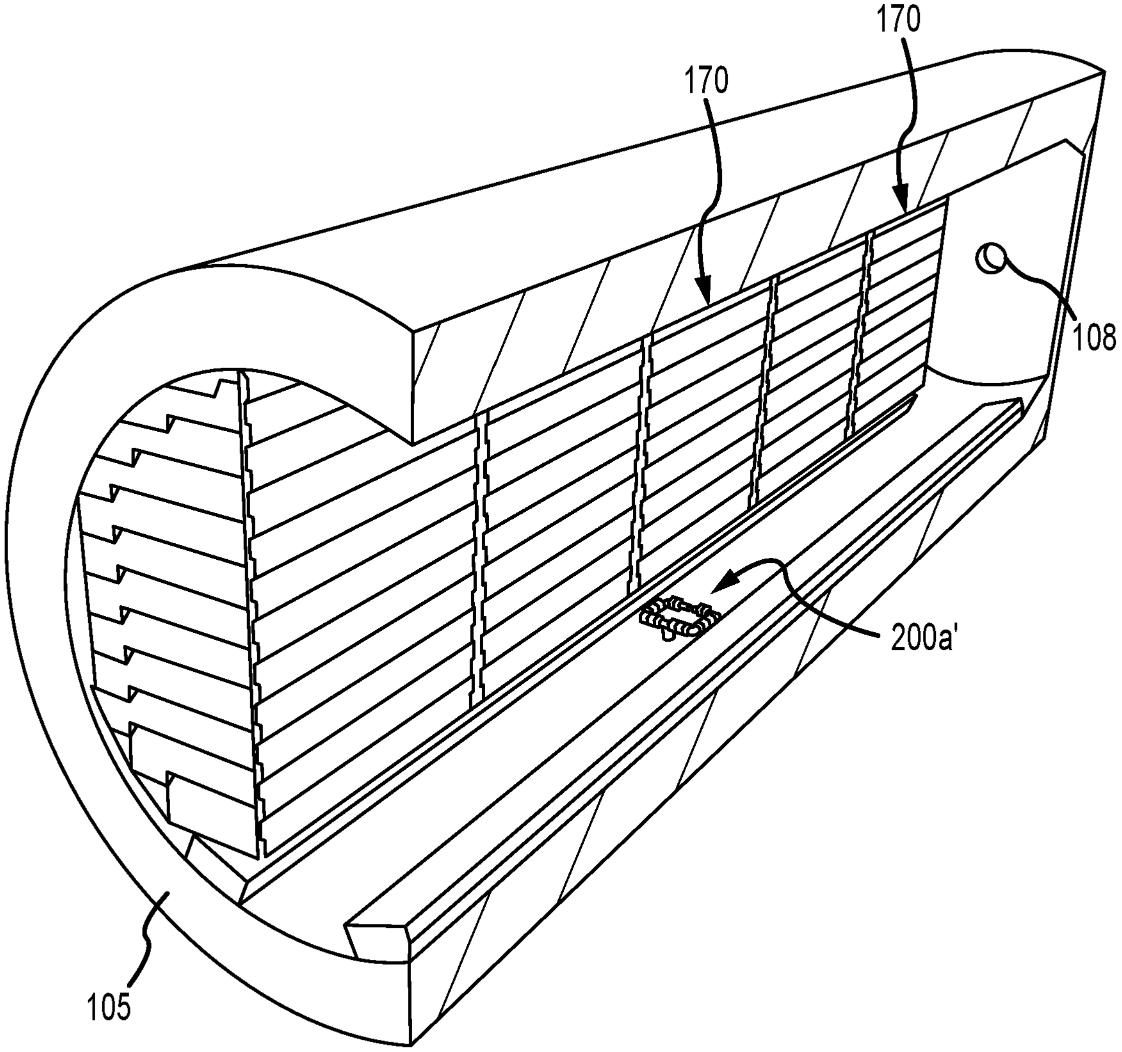
FIG. 3C is a representation of the arrangement of the nozzle assembly (e.g., FIG. 2A) in relation to the rails on which the stack of baskets rests.
Figure 3D:
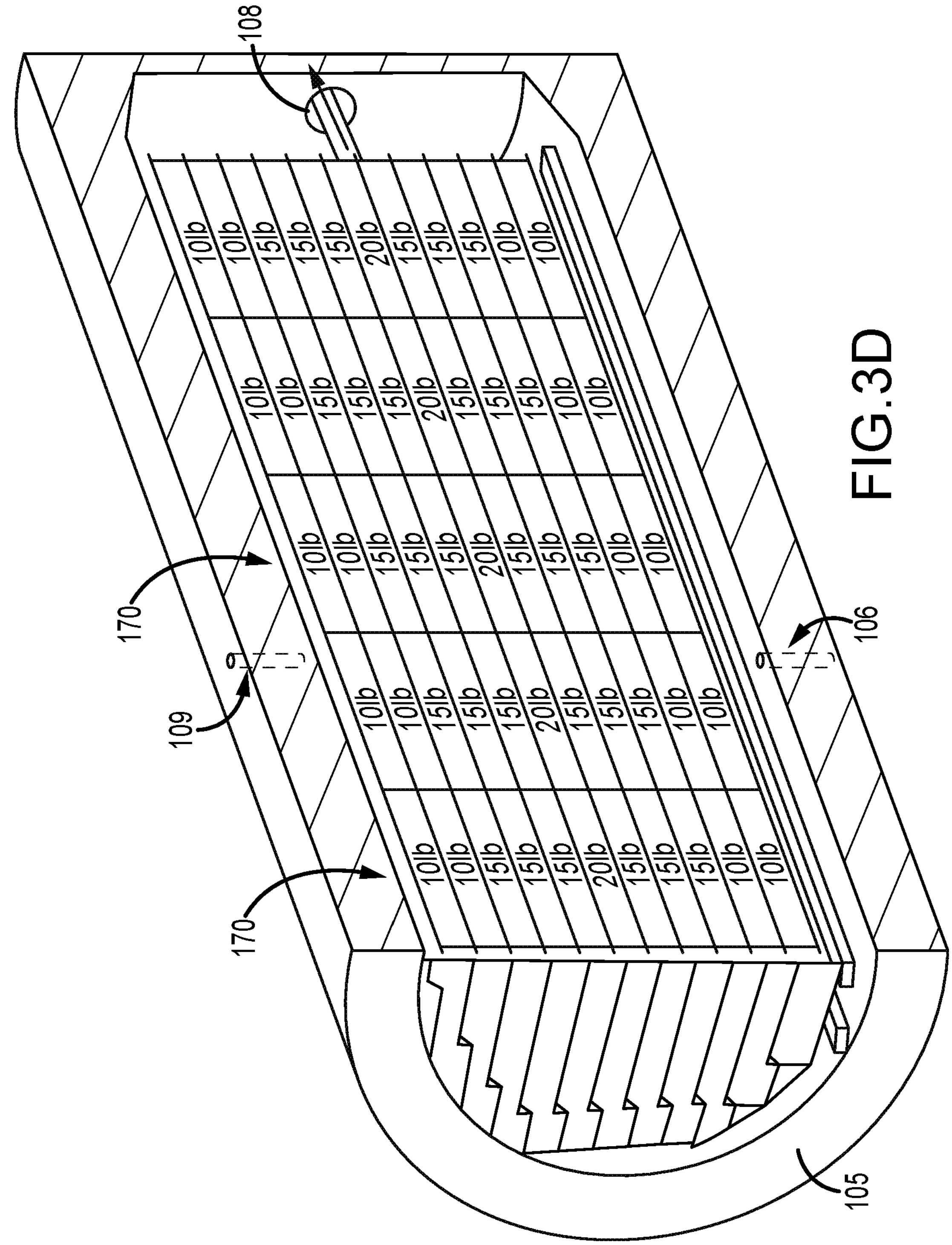
FIG. 3D is a representation of the arrangement in which the 750 pounds of total product being processed is loaded into the pressure vessel.
Figure 3E:
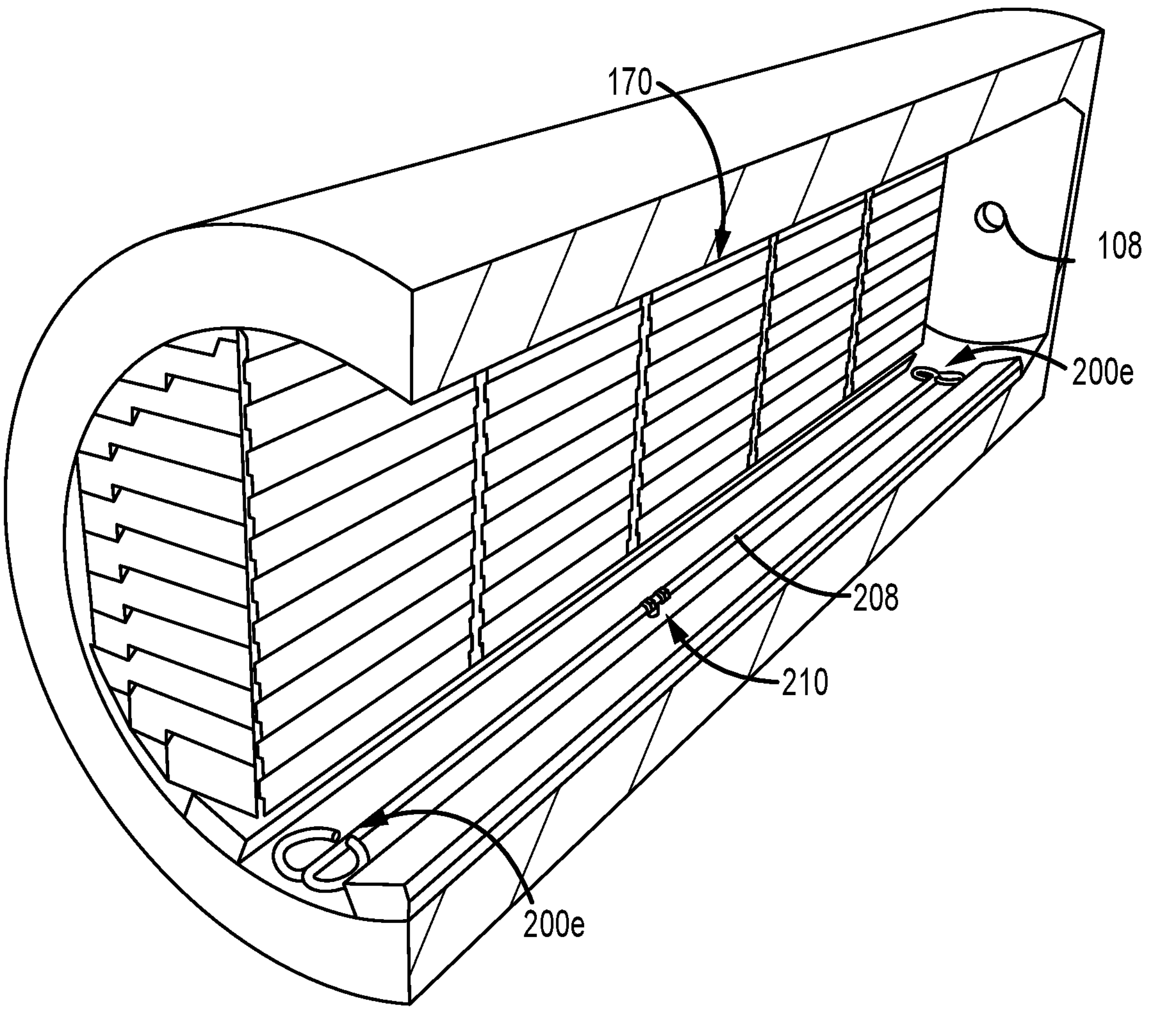
FIG. 3E is a representation of the arrangement of a Y involute shaped nozzle assembly (e.g., FIG. 2C) and a nozzle assembly arrangement with 2 pair of injection orifices in relation to the rails on which the stack of baskets rests.
Figure 3G:
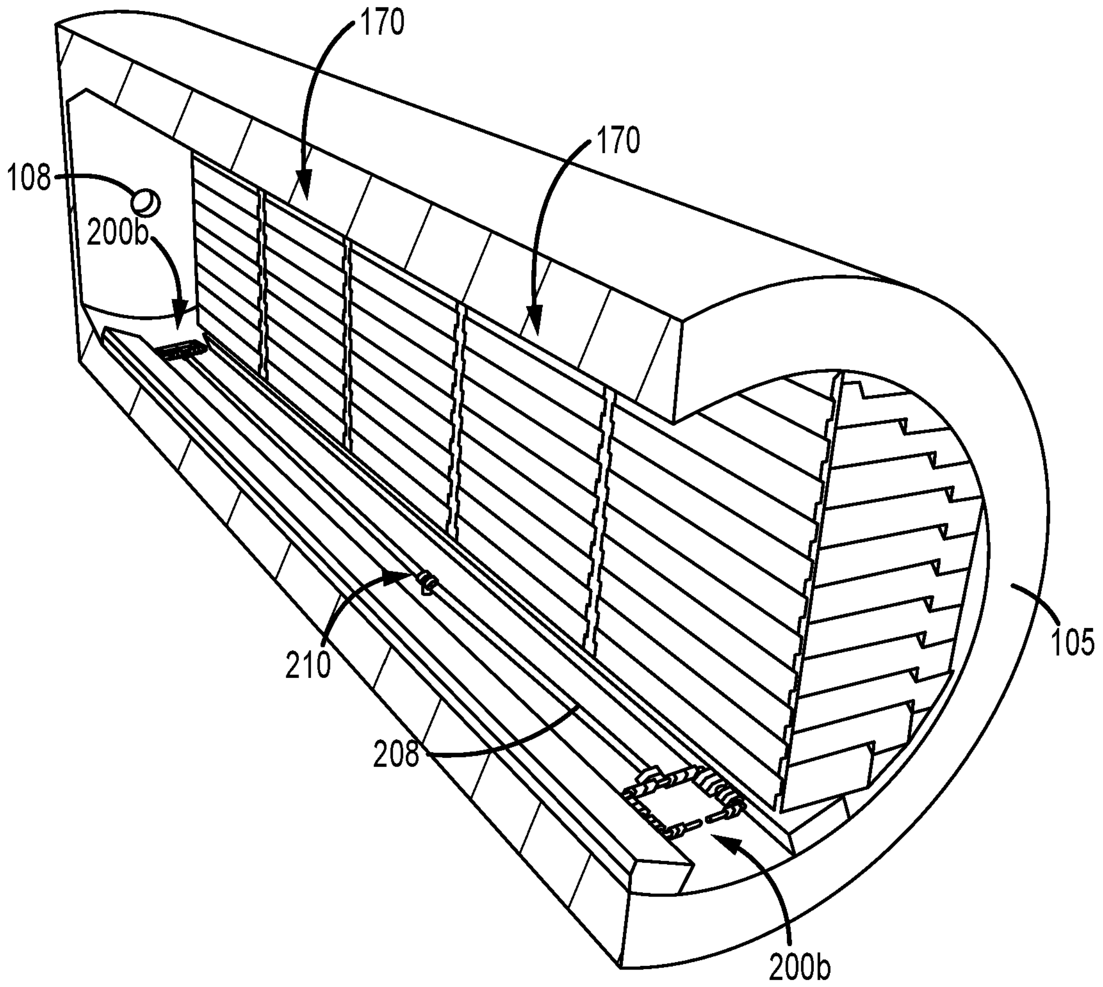
FIG. 3G is a representation of the arrangement of a nozzle assembly (e.g., FIG. 2E) and a nozzle assembly arrangement with 2 pair of ¼" injection orifices with a 5° tilt from the horizontal in relation to the rails on which the stack of baskets rests.
Figure 3H:
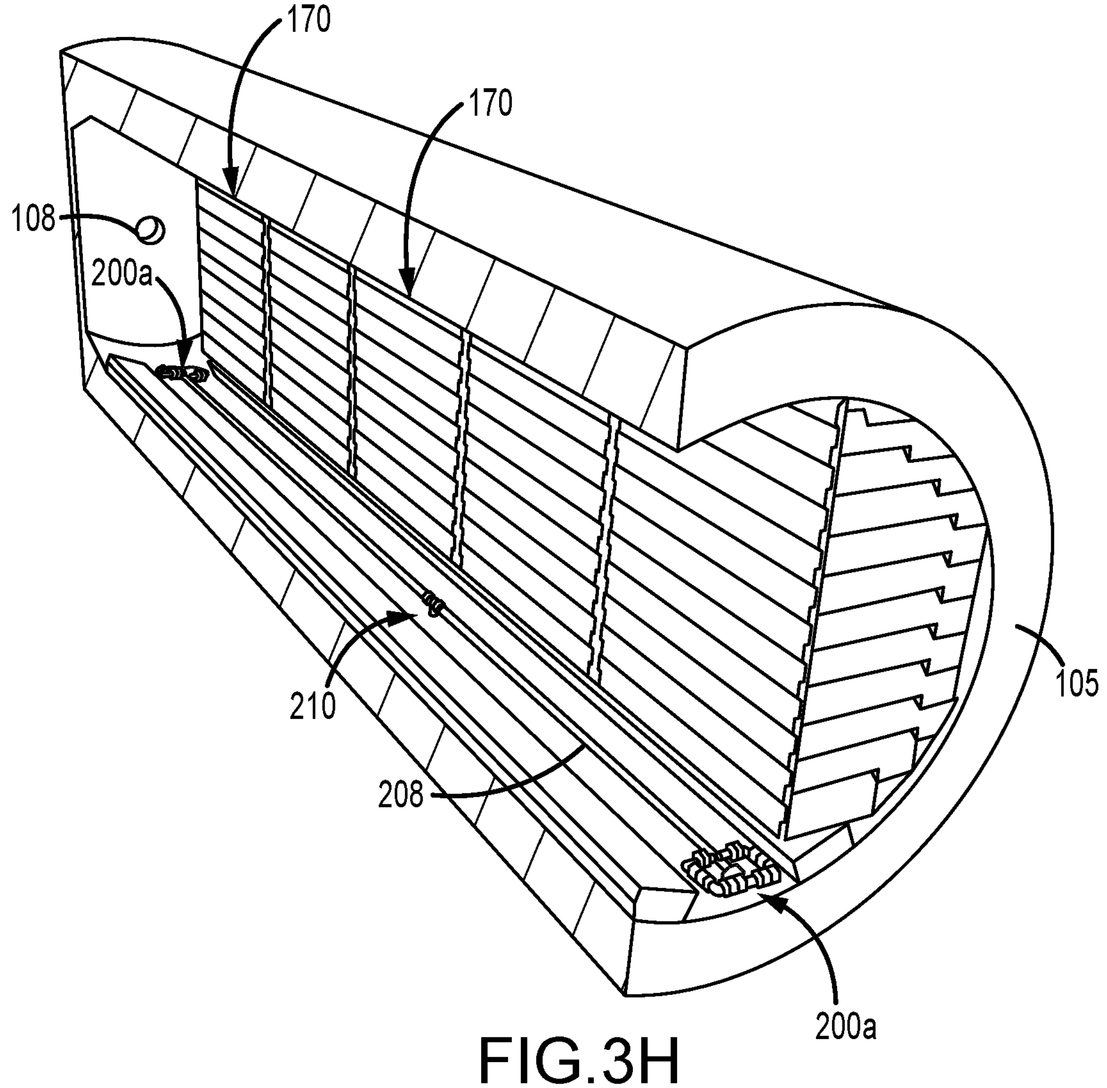
FIG. 3H is a representation of the arrangement of a nozzle assembly (e.g., FIG. 2F) and a nozzle assembly arrangement with 2 pair of ½" injection orifices with a 9° tilt from the horizontal in relation to the rails on which the stack of baskets rests.
Figure 3I:
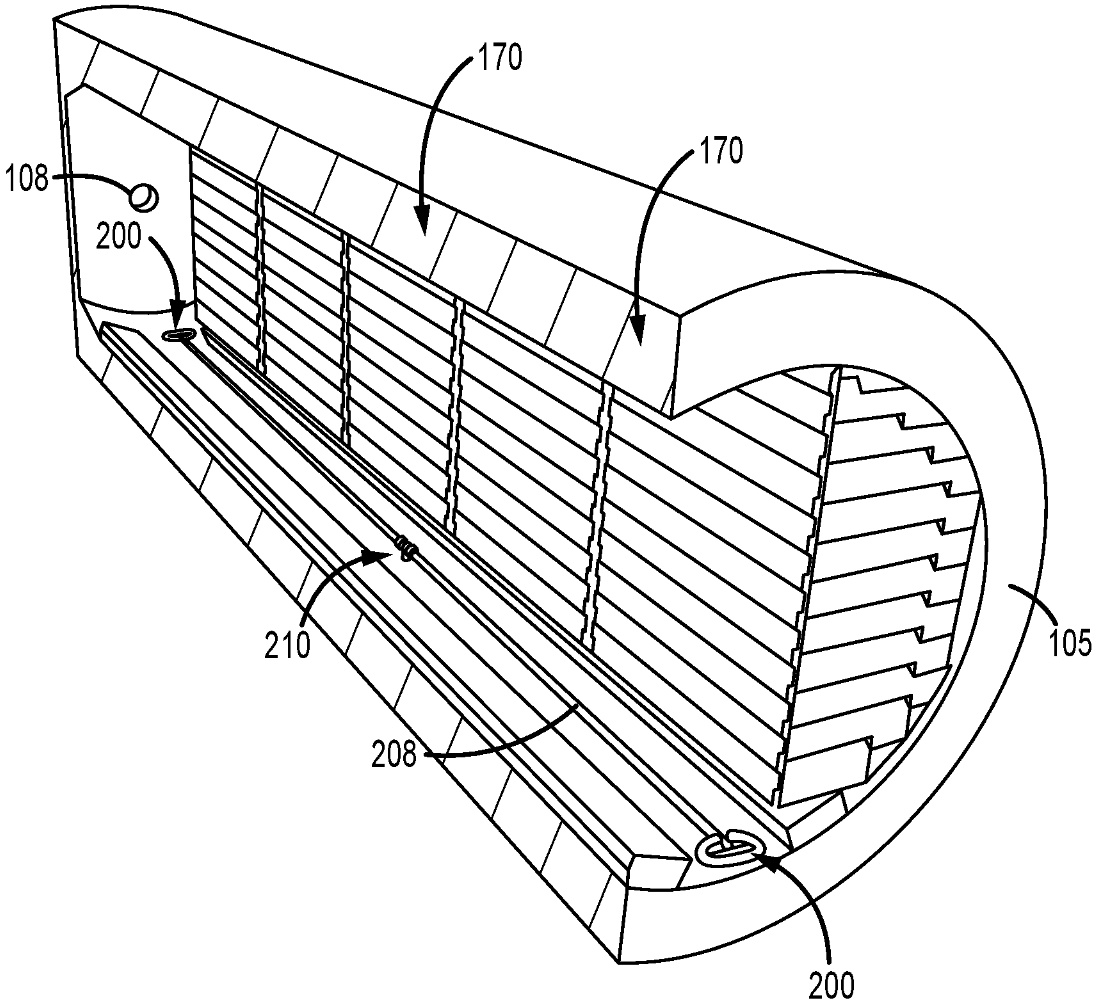
FIG. 3I is a representation of the arrangement of a Tee involute shaped nozzle assembly (e.g., FIG. 2G) and a nozzle assembly arrangement with 2 pair of ½" injection orifices with a 17° tilt from the horizontal in relation to the rails on which the stack of baskets rests.
Figure 3J:
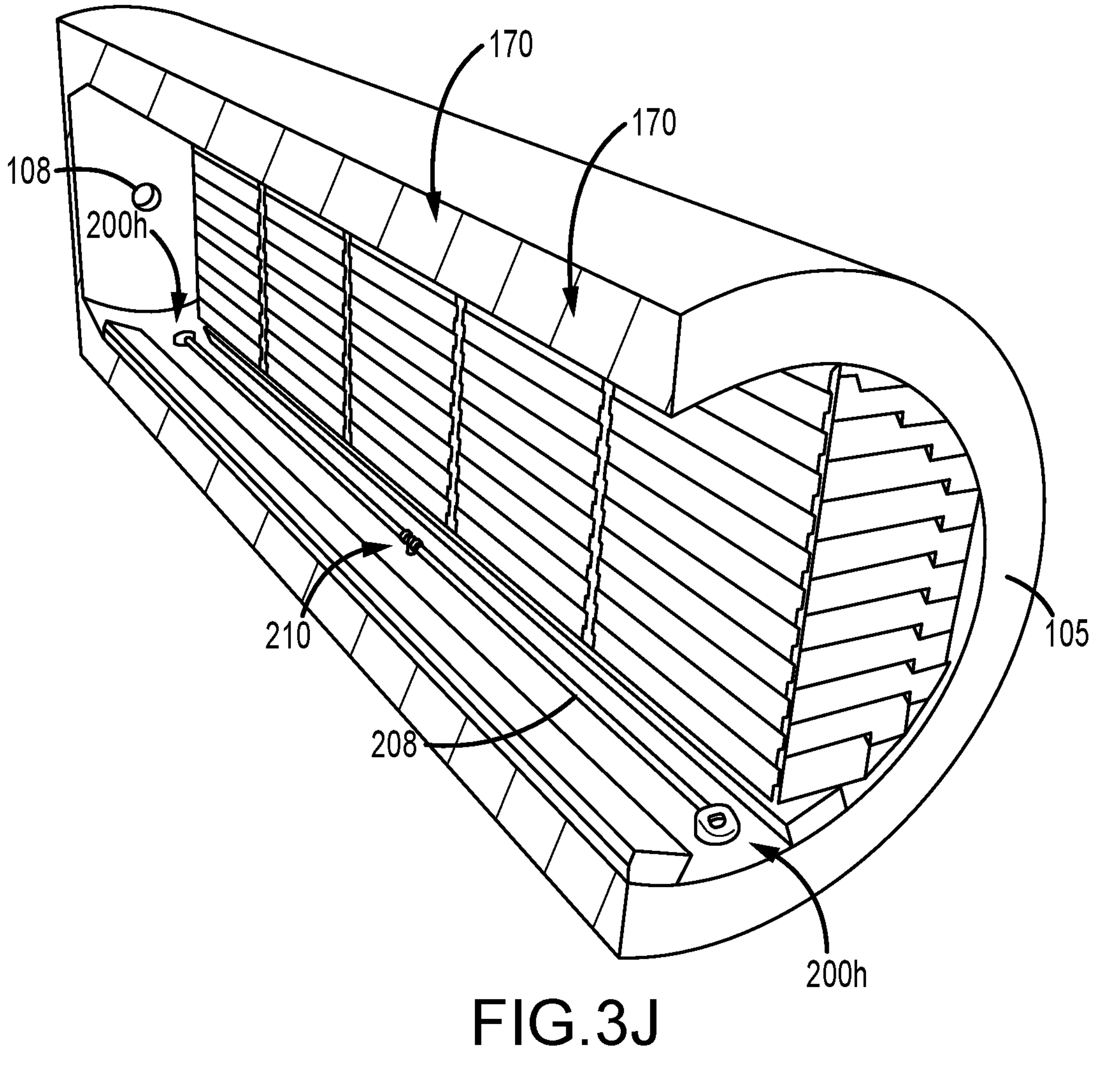
FIG. 3J is a representation of the arrangement of an enclosed Tee involute shaped nozzle assembly (e.g., FIG. 2H) with 2 pair of ½" injection orifices with a 17° tilt from the horizontal in relation to the rails on which the stack of baskets rests.
Figure 3K:
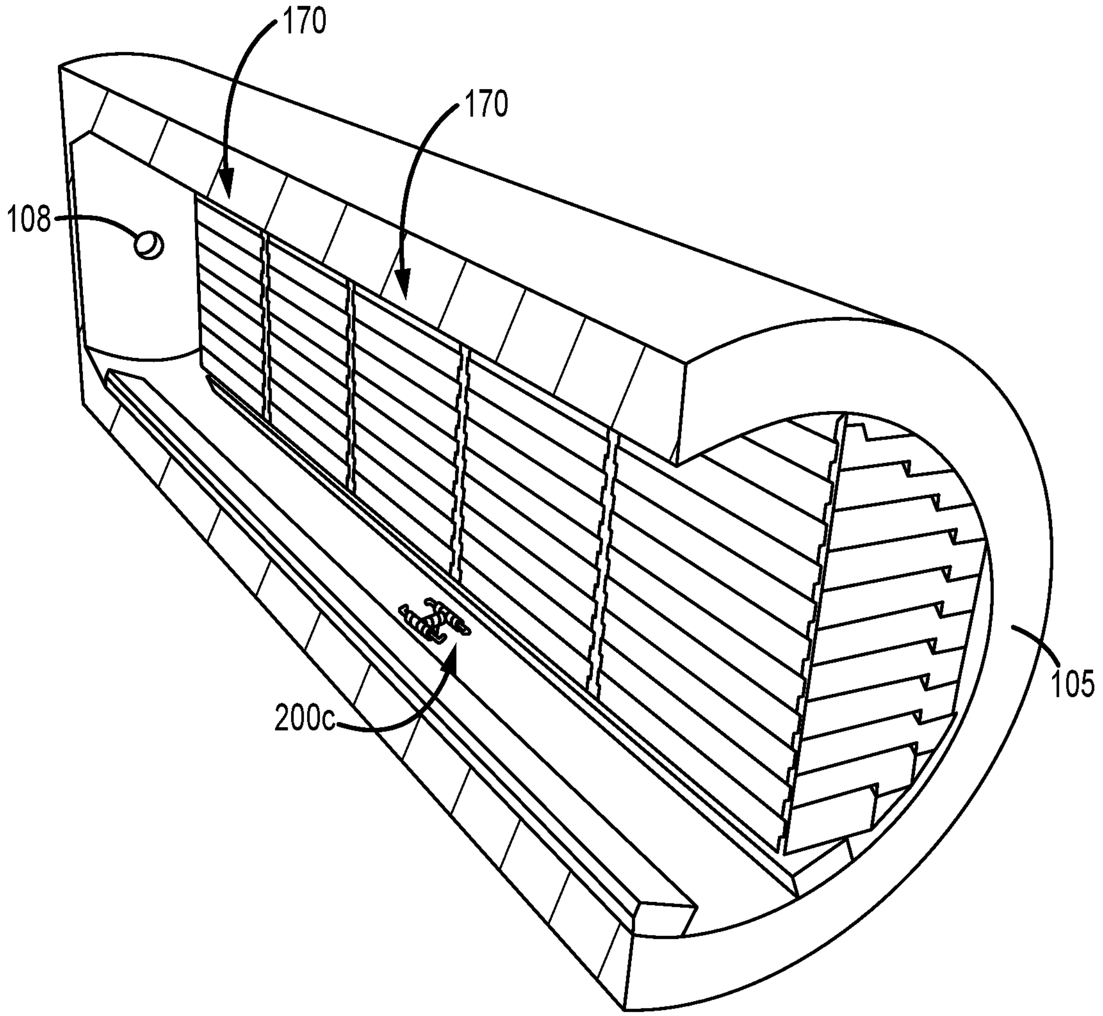
FIG. 3K is a representation of the arrangement of an H shaped nozzle assembly (e.g., FIG. 2I) with 2 pair of ¼" injection orifices with a 17° tilt from the horizontal in relation to the rails on which the stack of baskets rests.
Figure 5C:
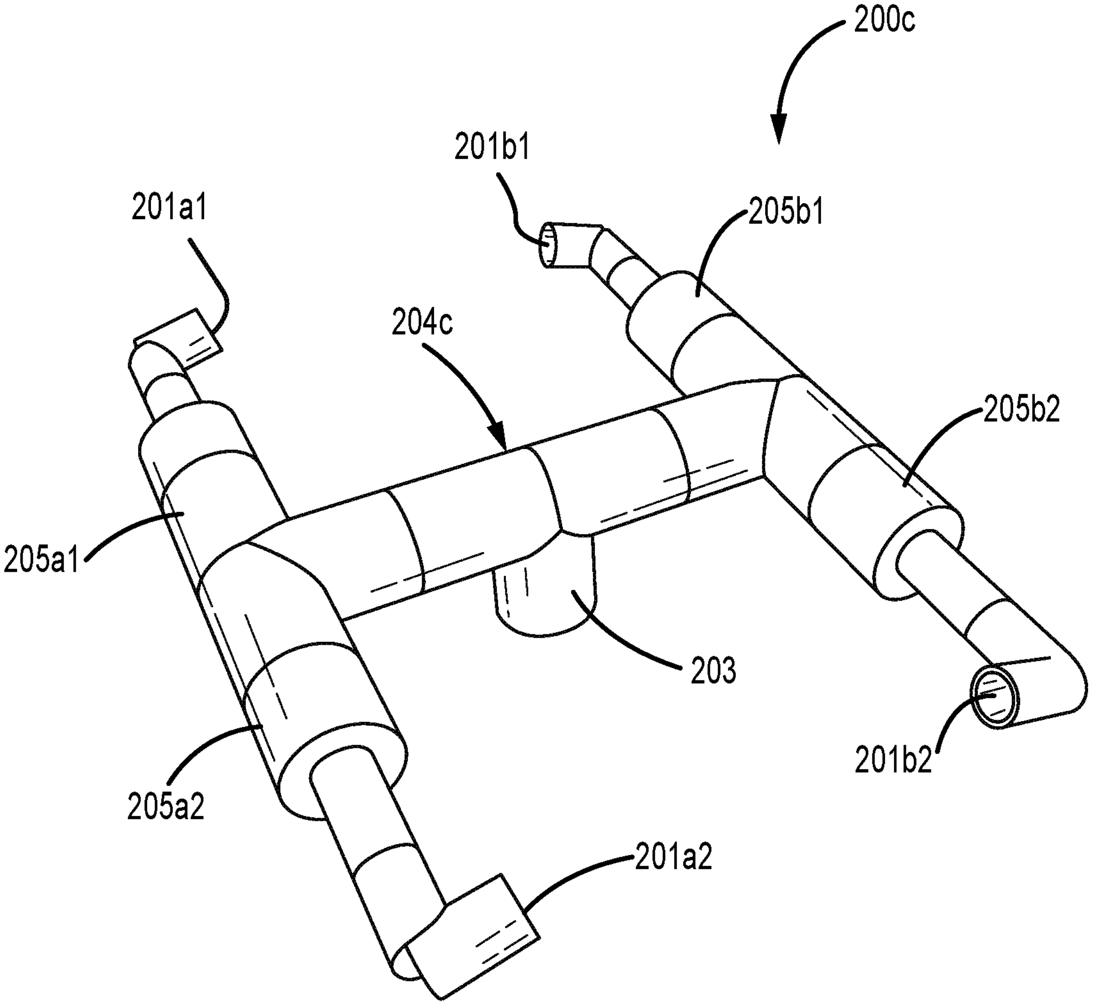
FIG. 5C is a perspective view of an H shaped nozzle assembly.

In another embodiment of such a nozzle assembly system 200*c*, reference may be made to FIGS. 5C and 21 (see also FIG. 3K for an additional view of this nozzle assembly 200*c* installed within the high pressure vessel 105). FIG. 2I shows a single nozzle assembly 200*c* disposed within the interior of pressure vessel 105 (e.g., midway between its two ends). In the case of the nozzle assembly 200*c*, working fluid is introduced through the pass through fitting 106, which finally exits into the high pressure vessel 105 through the injection orifices 201*a*1, 201*a*2, 201*b*1, and 201*b*2. The pass through fitting 106 may be connected to the nozzle assembly inlet 202 either as a quick disconnect or as a threaded fitting. This inlet 202, via a straight connection duct or inlet conduit 203, leads to a junction or an injection manifold 204*c*, which has a geometry of an "H shape" in this configuration. As the working fluid passes through the injection manifold 204*c*, it exerts force on the pipes at the turns which builds backpressure accompanied by adiabatic heating of the fluid and the nozzle assembly. Finally the injection orifices 201*a*1, 201*a*2 and 201*b*1, 201*b*2 are connected to the injection manifold 204*c* through the connection ducts 205*a*1, 205*a*2 and 205*b*1, 205*b*2 which are each designed to turn a total of 180° in two 90° turns, to thus have the injection orifices 201*a*1, 201*b*1 and 201*a*2, 201*b*2 face each other with a distance of 9 mm or greater between them at an angle of 0° or greater from the horizontal. The design doesn't have a horizontal support platform to prevent misalignment between the injection orifices 201*a*, 201*b*, alignment being necessary to create the backpressure immediately after the injection orifices 201*a*1, 201*b*1 and 201*a*2, 201*b*2, since various threaded fittings make up complete nozzle assembly 200*c* that can be reoriented as per need. The connection ducts 205*a*1, 205*b*1 and 205*a*2, 205*b*2 each can be designed at different turning angles although are needed to face each other with at least at an angle of 0° or greater from the horizontal.

Figure 5D:
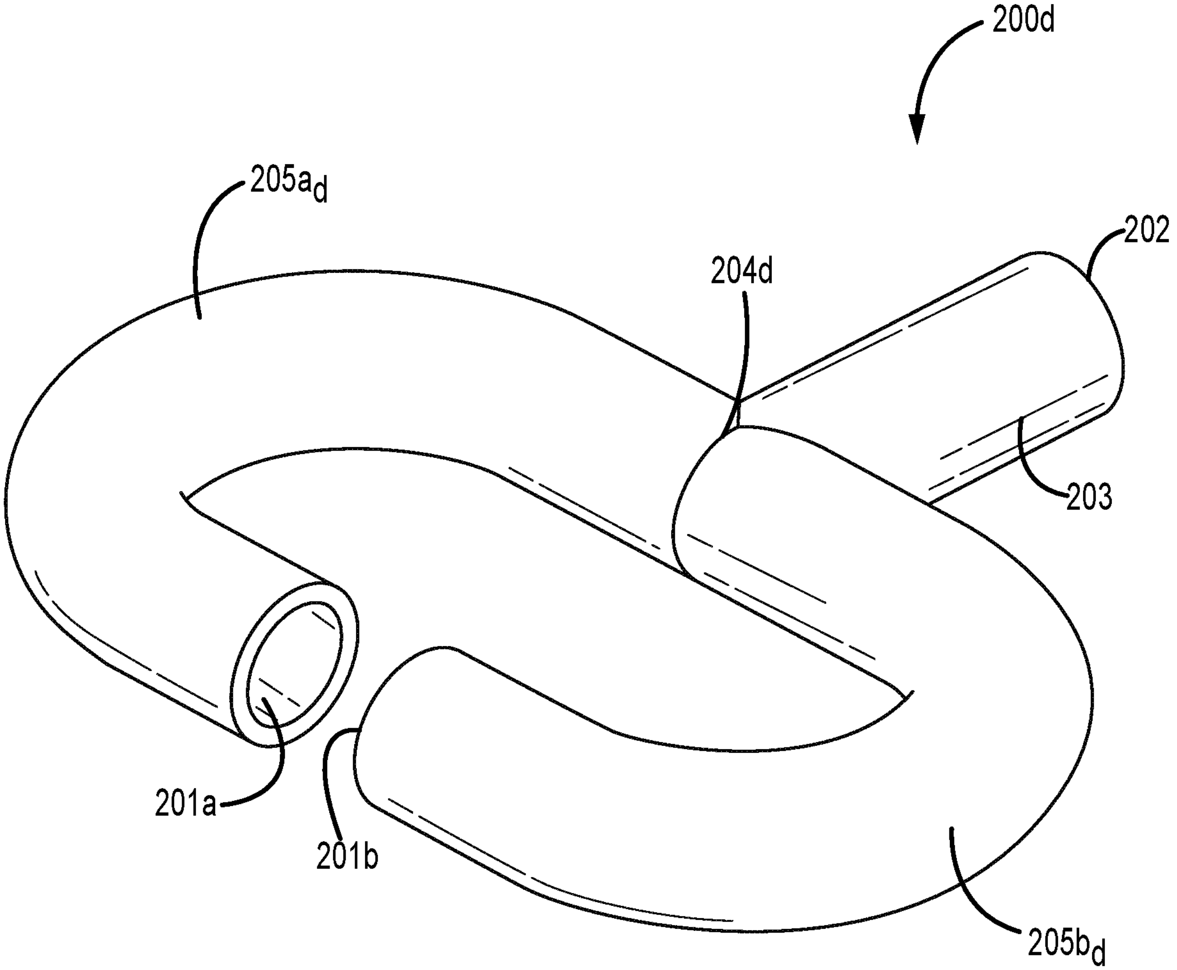
FIG. 5D is a perspective view of an outward Tee Involute shaped nozzle assembly.

In another embodiment of such a nozzle assembly system 200*d*, reference may be made to FIGS. 5D and 2B. FIG. 2B shows a pair of nozzles assemblies 200*d* disposed within the interior of pressure vessel 105 (one generally at each end of the pressure vessel 105), and that are fluidly connected by the above-noted working fluid supply conduit 208. In the case of the nozzle assembly 200*d*, working fluid is introduced through the pass through fitting 106, which finally exits into the high pressure vessel 105 through the injection orifices 201*a* and 201*b*. The pass through fitting 106 may be interconnected to the nozzle assembly inlet 202 via one or more quick disconnects and/or one or more threaded fittings. This inlet 202, via a straight connection duct or inlet conduit 203 (which is fluidly interconnected with/extends from/is colinear with the working fluid conduit 208), leads to a junction or an injection manifold 204*d*, which has a geometry of a "Y Involute shape". As the working fluid passes through the injection manifold 204*d*, it exerts force on the pipes at the turns which builds backpressure accompanied by adiabatic heating of the fluid and the nozzle assembly. Finally the injection orifices 201*a* and 201*b* are connected to the injection manifold 204*d* through the connection ducts $\mathbf{205}a_d$ and $\mathbf{205}b_d$ which are each designed to turn 180°, to thus have the injection orifices 201*a* and 201*b* face each other with a distance of 9 mm or greater between them at an angle of 0° or greater from the horizontal. A horizontal support platform (not shown) may be provided to prevent misalignment between the injection orifices 201*a*, 201*b*, alignment being necessary to create the backpressure immediately after the injection orifices 201*a*, 201*b*. The connection ducts $\mathbf{205}a_d$ and $\mathbf{205}b_d$ each can be designed at different turning angles although are needed to face each other with at least at an angle of 0° or greater from the horizontal. The nozzle assembly 200*a* of FIG. 5 could be characterized as having the end sections of its connection ducts 205*a*, 205*b* being turned slightly upward compared to the end sections connection ducts $\mathbf{205}a_d$, $\mathbf{205}b_d$ for the nozzle assembly 200*d* of FIG. 5D.

Figure 5E:
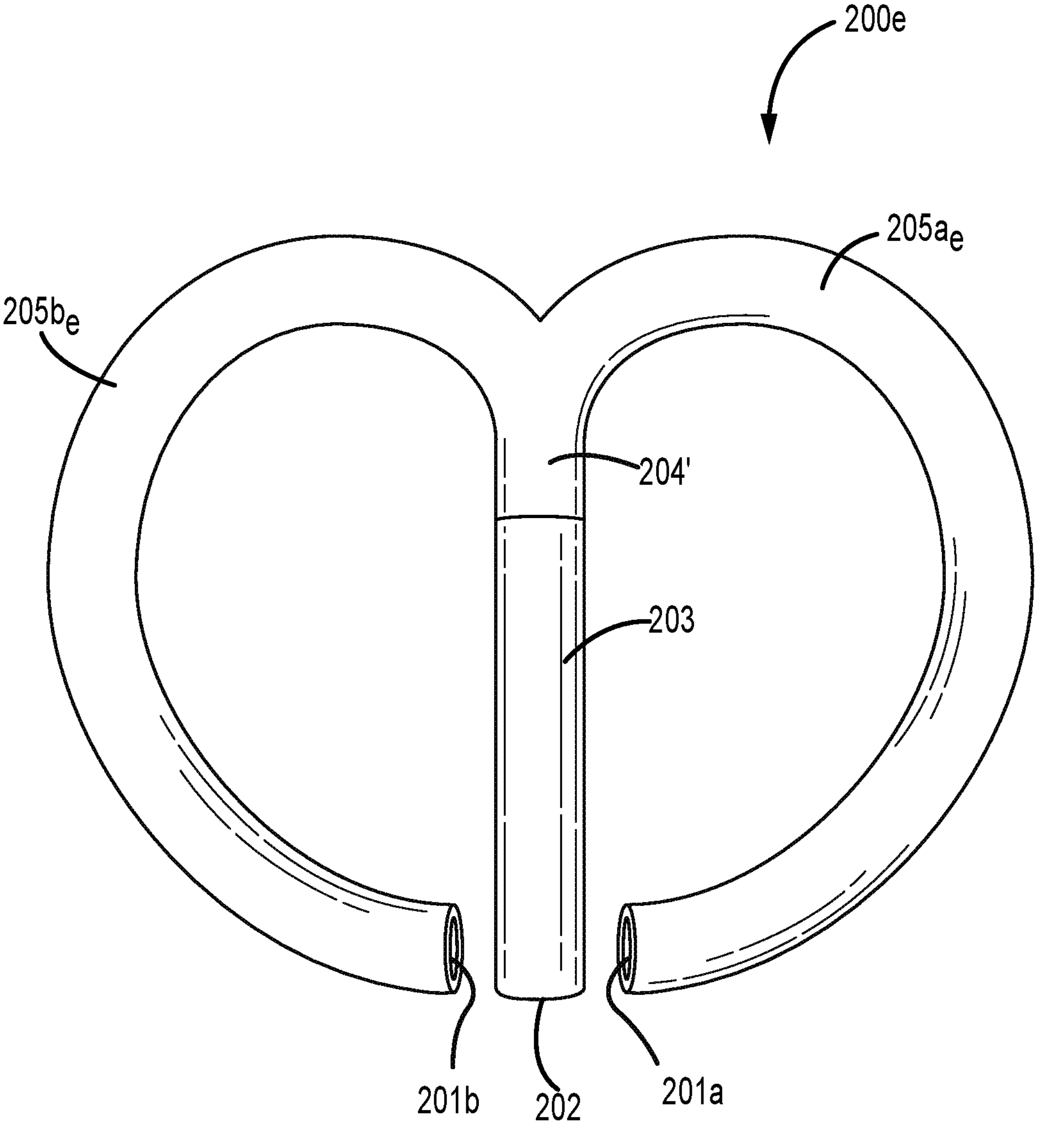
FIG. 5E is a top view of a Y Involute shaped nozzle assembly.

FIG. 5E illustrates a nozzle assembly 200*e* that is a variation of the nozzle assembly 200 of FIG. 5. In the case of the nozzle assembly 200*e*, at least part of the manifold 204' is colinear with the inlet conduit 203 (which is fluidly interconnected with/extends from/is colinear with a working fluid conduit 208, discussed below), and the connection ducts $\mathbf{205}a_e$, $\mathbf{205}b_e$ each proceed along a curved path from the manifold 204' to the injection orifice 201*a*, 201*b*, respectively. FIGS. 2C, 2D, and 2D1 each show a pair of nozzles assemblies 200*e* disposed within the interior of pressure vessel 105 (one generally at each end of the pressure vessel 105), and that are fluidly connected by the above-noted working fluid supply conduit 208. FIG. 2D also shows a nozzle assembly 200*g* that is fluidly interconnected with the working fluid supply conduit 208 at a location that is between the noted pair of nozzle assemblies 200*e*. FIG. 2D1 shows another nozzle assembly 200*e* that is fluidly interconnected with the working fluid supply conduit 208 at a location that is between the noted pair of nozzle assemblies 200*e*.

Figure 3L:
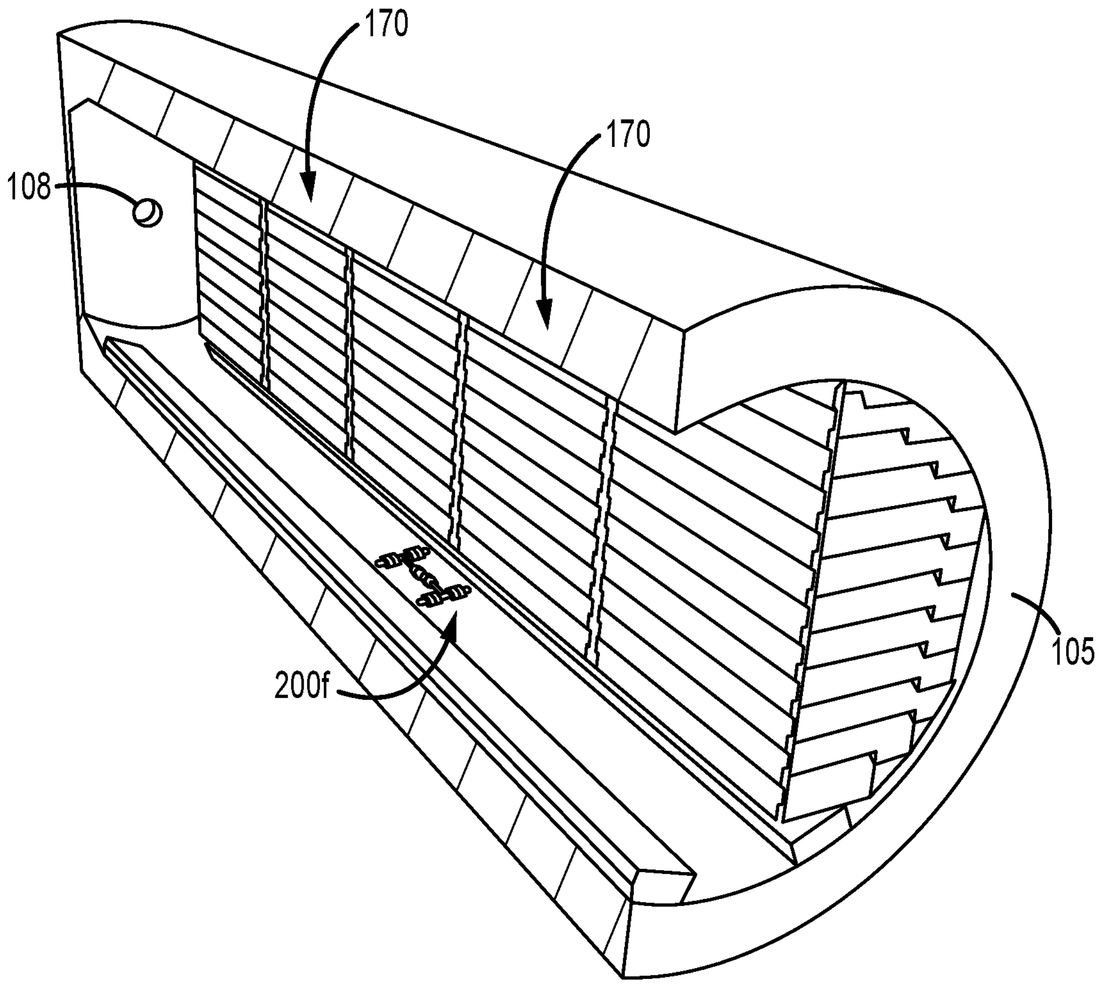
FIG. 3L is a representation of the arrangement of an H shaped nozzle assembly (e.g., FIG. 5F) with 2 pairs of ¼" injection orifices with a 5° tilt from the horizontal in relation to the rails on which the stack of baskets rests.
Figure 5F:
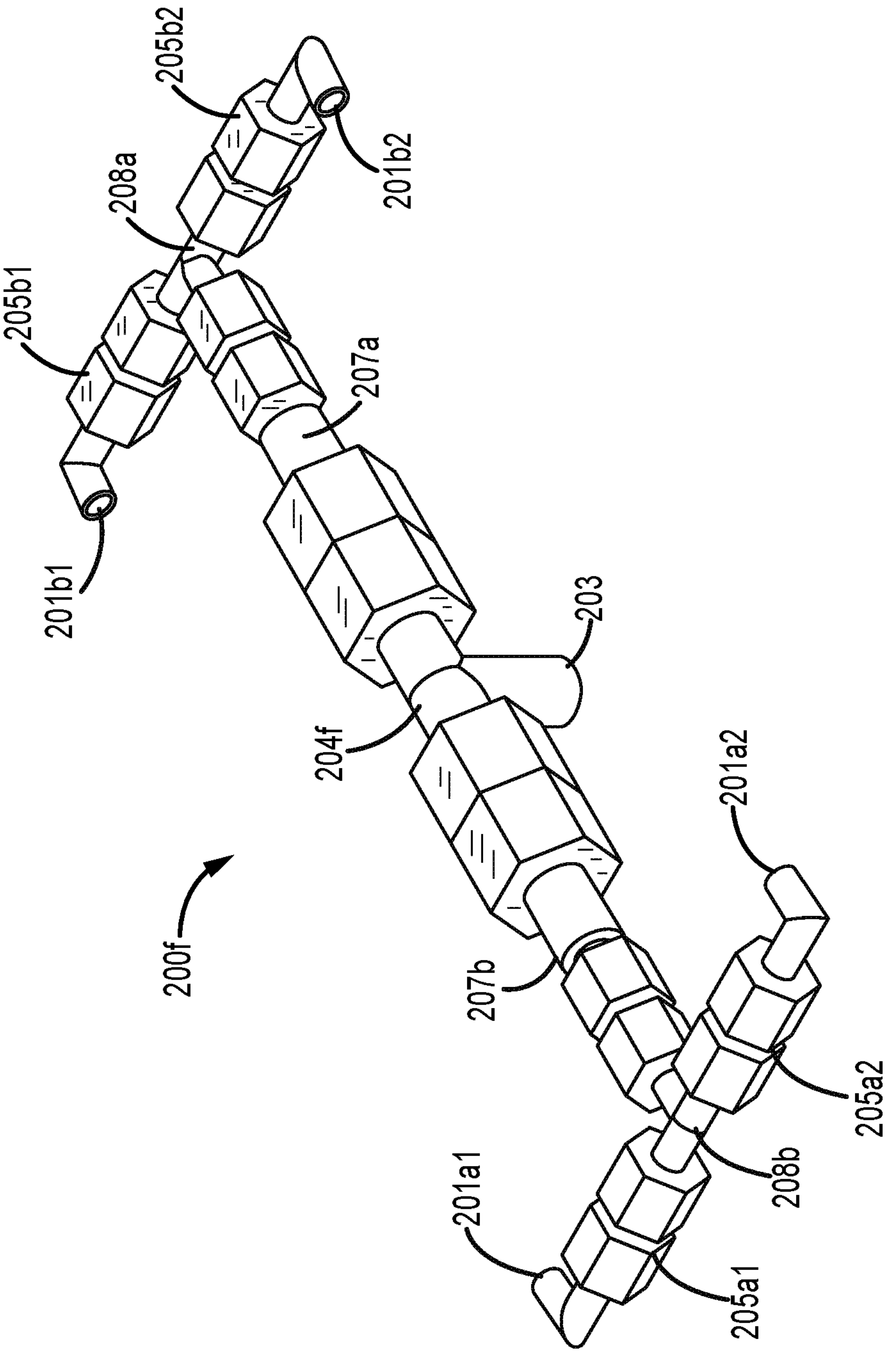
FIG. 5F is a perspective view of an H shaped nozzle assembly having four ¼" injection orifices having a 5° tilt from the horizontal.

FIG. 5F illustrates a nozzle assembly 200*f* that is a variation of the nozzle assembly 200*c* of Figure the differences of which will be discussed below (see also FIG. 3L for an additional view of this nozzle assembly 200*f* installed within the high pressure vessel 105).

FIG. 5G1 presents a view of a nozzle assembly 200*g* that may be used at an intermediate location along the working fluid supply conduit 208 (e.g., FIG. 2D). The manifold 204*g* of the nozzle assembly 200*g* is colinear with the working fluid supply conduit 208, with the connection ducts $\mathbf{205}a_g$, $\mathbf{205}b_g$ of the nozzle assembly 200*g* extending from two different locations along the length of the manifold 204*g*. FIGS. 5G2 and 5G3 present views of an adaptation of the nozzle assembly 200*g* to interconnect with an end of the working fluid supply conduit 208. The nozzle assembly 200*g*' of FIGS. 5G2 and 5G3 includes the inlet conduit 203, the manifold 200*g*, the connection ducts 205*$a_g$*, 205*$b_g$* and the orifices 201*a*, 201*b* positioned to have their respective flows intersect.

FIGS. 5H1 and 5H2 illustrates a nozzle assembly 200*h* that may be viewed as a variation of the nozzle assembly 200 of FIG. 5. The nozzle assembly 200*h* includes a housing 212. Generally, the injection manifold 204*h* and the connection ducts 205*$a_h$*, 205*$b_h$* of the nozzle assembly 200*h* are disposed within the interior of the housing 212 in the case of the nozzle assembly 200*h* of FIGS. 5H1 and 5H2, and terminate in a pair of orifices 201*a*, 201*b* positioned to have their respective flows intersect.

Figure 6A:
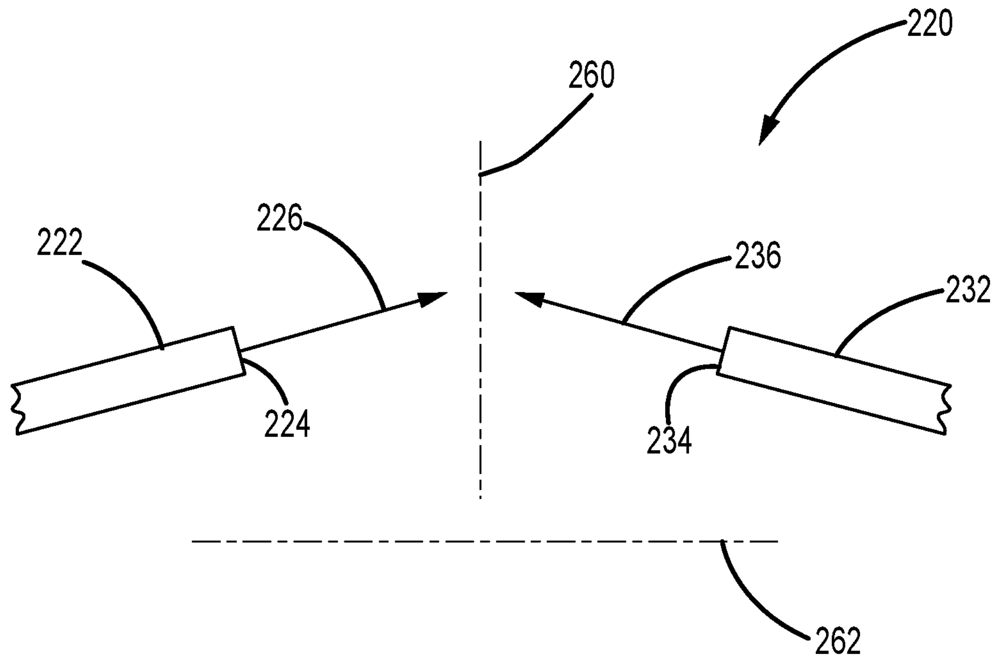
FIG. 6A is a schematic of a pair of injection orifices for a nozzle assembly that are disposed in opposing relation and where their respective flow axes are disposed in intersecting, but non-colinear, relation to one another.

FIG. 6A is a schematic of a nozzle assembly 220. Each of the nozzle assemblies of FIGS. 5-5H2 may be configured in accord with the nozzle assembly 220. The nozzle assembly 220 includes a first conduit section 222 that terminates in a first injection orifice 224, along with a second conduit section 232 that terminates in a second injection orifice 234. The injection orifices 224, 234 are spaced from one another, with a first reference plane 260 (e.g., vertically disposed) being disposed between the injection orifices 224, 234. A second reference plane 262 (e.g., horizontally disposed) is orthogonal to the first reference plane 260. A flow out of the first injection orifice 224 is directed at least generally along a first flow axis 226 and in the direction of one side of the first reference plane 260. Similarly, a flow out of the second injection orifice 234 is directed at least generally along a second flow axis 236 and in the direction of an opposite side of the first reference plane 260. Flow out of the injection orifices 224, 234 intersect (e.g., at least generally at the first reference plane 260). The first flow axis 226 and the second flow axis 236 are not colinear in the case of the nozzle assembly 220. Instead, each of the first flow axis 226 and the second flow axis 236 are disposed at an angle relative to the second reference plane 262 (e.g., the orientation of the first flow axis 226 may be the mirror image of the orientation of the second flow axis 236).

Figure 6B:
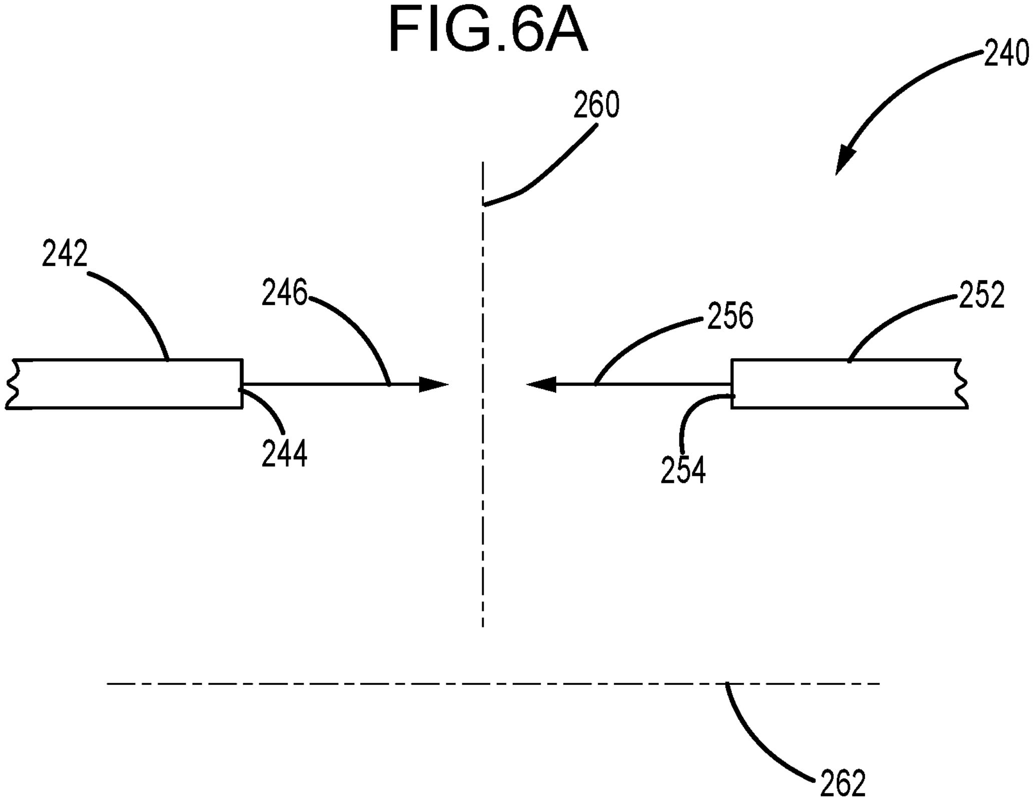
FIG. 6B is a schematic of a pair of injection orifices for a nozzle assembly that are disposed in opposing relation and where their respective flow axes are in colinear relation to one another.

FIG. 6B is a schematic of a nozzle assembly 240. Each of the nozzle assemblies of FIGS. 5-5H2 may be configured in accord with the nozzle assembly 240. The nozzle assembly 240 includes a first conduit section 242 that terminates in a first injection orifice 244, along with a second conduit section 252 that terminates in a second injection orifice 254. The injection orifices 244, 254 are spaced from one another, with a first reference plane 260 (e.g., vertically disposed) being disposed between the injection orifices 244, 254. A second reference plane 262 (e.g., horizontally disposed) is orthogonal to the first reference plane 260. A flow out of the first injection orifice 244 is directed at least generally along a first flow axis 246 and in the direction of one side of the first reference plane 260. Similarly, a flow out of the second injection orifice 254 is directed at least generally along a second flow axis 256 and in the direction of an opposite side of the first reference plane 260. Flow out of the injection orifices 244, 254 intersect (e.g., at least generally at the first reference plane 260). The first flow axis 246 and the second flow axis 256 are colinear in the case of the nozzle assembly 240.

In summary, the various nozzle assemblies each direct a flow out of at least one pair of injection orifices that intersect at a location somewhere between the injection orifices of the pair. Moreover, the flow exiting the inlet conduit 203 of each such nozzle assembly is turned through an angle of at least 180° prior to exiting the injection orifices. Various examples in accordance with the foregoing will now be presented.

EXAMPLES

The following examples are intended to illustrate particular embodiments of the present disclosure but are by no means intended to limit the scope of the present disclosure.

Example 1: 1×OppositionNozzle

The example processes described herein did achieve the necessary back pressure to attain the desirable heating within the working fluid to reduce the time duration required for the compression and the recirculation phases of the total process cycle by maximizing the total heat per unit mass of working fluid even at higher mass flow rates.

The product to be processed was potatoes in multiple 5-pound packages, each package had a section of breathable material which allowed the working fluid to permeate into the package where it did directly interact with the potatoes and transfer heat. A total product mass payload of 275 pounds was distributed within the vessel volume (FIG. 3A; FIG. 3D illustrates a different loading of product for processing). The mass payload comprised of fifty-five 5-pound bags. Each bag was placed in a basket which baskets were then stacked to form 5 columns (e.g., basket stacks 170), each column being 11 baskets high, for a total payload of 55 baskets and 55 5-pound bags. The payload of baskets was stacked on top of a sled designed to secure and move these baskets. The sled design incorporated two PTFE skis upon which the sled rests which provided a low friction sliding surface. The sled and its payload were slid on the sled's skis into the vessel via railing mechanism designed for that purpose. Inside the vessel, the two PTFE skis straddled the nozzle assembly (FIG. 3C). The area between the skis and under the payload of 5-pound bags represented an under-sled plenum.

Temperature data was collected during the thermal processing cycle at multiple locations within the vessel. At each location, a thermocouple sensor 140 was inserted into one of the 5-pound bags of potatoes distributed therein. These temperature reading sensor(s) 140 (FIG. 3B) were connected to a data logger system outside of the high pressure vessel via thermocouple wires and a wire pass-through fitting.

After the stack of baskets were loaded into the high pressure vessel, the vessel was sealed by closing and locking the cap in place. Once the vessel was sealed and all the outlet ports were secured shut, the process cycle was initiated beginning with compression phase. For this example, the nozzle assembly consisted of a pair of ½ " injection orifices pointing at each other in direct opposition with a distance of ½ " between them (e.g., FIG. 3C). Both injection orifices were supplied with the working fluid via a single pass-through pipe leading into the vessel. With reference to FIGS. 2A and 5A, the pass-through pipe terminated in a 3-way union with "T" shaped geometry, which 3-way union acted as a first injection manifold (the intersection of the duct 203 with the manifold 204*a* being shown in FIG. 5A). As shown in FIG. 5A (again, the nozzle assembly 200*a*' of FIG. 2A being a variation of the nozzle assembly 200 of FIG. 5A, with the inlet conduit 203 being rotated 90° in FIG. 2A compared to what is shown in FIG. 5A), two connection ducts 205*$a_a$*, 205*$b_b$* were attached to each of the injection manifolds 204*a*. The connection ducts 205*$a_a$*, 205*$b_b$* transformed the direction of flow by turning 180-degrees via two 90-degree elbows. The connection duct geometry was pivoted at the injection manifold 204*a* (a second injection manifold) such that the outlet end of each of the connection ducts 205*$a_a$*, 205*$b_b$* were lifted to be located above the first injection manifold 204*a* and then pivoted again at either of the two 90-degree elbows such that the outlets 201*a*, 201*b* of the connection ducts $\mathbf{205}a_a$, $\mathbf{205}b_b$ were each oriented horizontally. The geometry of each connection duct $\mathbf{205}a_a$, $\mathbf{205}b_b$ was a reflection of the connection duct $\mathbf{205}a_a$, $\mathbf{205}b_b$ across from it; which is to say, the connection ducts $\mathbf{205}a_a$, $\mathbf{205}b_b$, which are attached to the injection manifold 204*a*, are oriented as the mirror image of one another. The vessel was filled with 470 kgs of the working fluid carbon dioxide such that the payload did reach and exceed the desired operating temperature of 200° F. at a pressure of 140 bar during the compression phase of the thermal processing cycle which lasted approximately 23 minutes. To achieve the same operating temperature of 200° F. in other embodiments, the required time of compression may change to accommodate variation in the nozzle assembly, the product payload mass and/or the type, thickness and width of the product within the payload, and/or the initial temperature of the product payload.

Since the desired operating temperature was attained inside the vessel before the end of the compression phase, the recirculation phase was used only to maintain the payload at the desired operating temperature for the desired processing time. During the recirculation phase, the compressor withdrew carbon dioxide from the vessel via the back-center outlet port, pumped it through the heat exchanger, and returned it to the vessel. The working fluid was continuously recirculated and re-injected at desired inlet temperatures which maintained the payload's internal temperature at or above 200° F. without forming a significant temperature gradient within the vertical cross section of the vessel. The recirculation phase was conducted for 10 minutes.

After the completion of the recirculation phase, the vessel was depressurized in three steps. First, carbon dioxide was blown down from the vessel back to the receiver, driven by the higher pressure within the vessel. This blow down step was accomplished by opening the outlet valve from the vessel to the receiver. Second, working fluid was pumped down from the vessel back to the receiver. This pump down step was accomplished by withdrawing carbon dioxide from the vessel with the compressor and pumping it back to the receiver. Third and finally, the small mass of carbon dioxide remaining in the vessel after the pump down step was vented to the atmosphere.

Figure 4A:
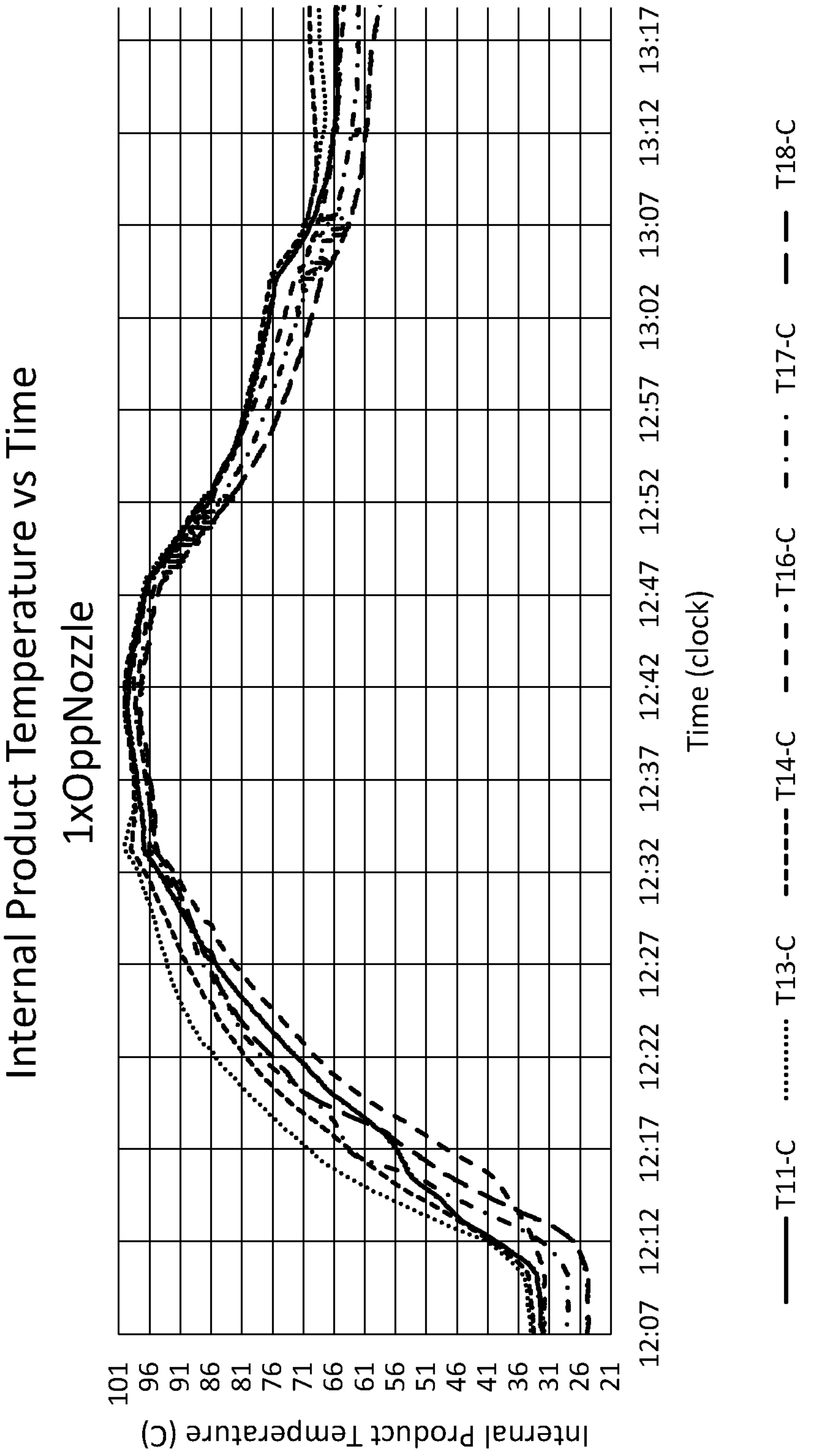
FIG. 4A is a representation of the heating curves of the 275 pound product feed load with the nozzle assembly system including 1 pair of injection orifices in place during the process.
Figure 4B:
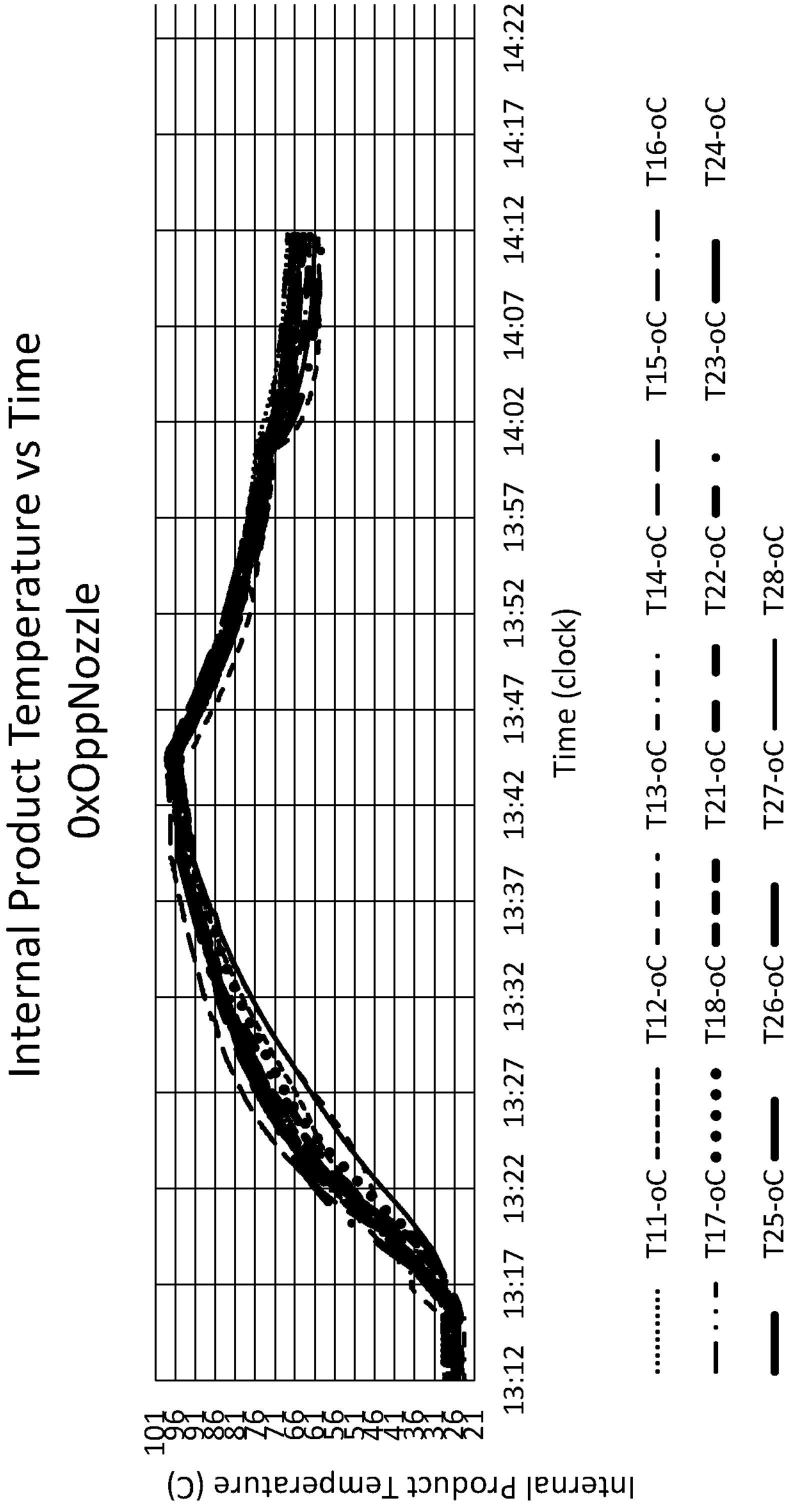
FIG. 4B is a representation of the heating curves of the 275 pound product feed load without the nozzle assembly system including 1 pair of injection orifices in place during the process.

FIG. 4A shows the heating curves for the different locations within the product feed load in the vessel during the complete thermal processing cycle from beginning to end, in accord with this Example 1. FIG. 4B shows the heating curves for the different locations within the product feed load in the vessel during the complete thermal processing cycle from beginning to end without utilizing the nozzle assembly 200*a*'. It can be seen in FIG. 4B, the time required to reach temperatures of 93° C. within the coldest location is 28 minutes while with the presence of the nozzle assembly 200*a*' it is reduced to 22 minutes, as can be seen in FIG. 4A.

Example 2: 2×Opposition Nozzles

Similar to the above, the example processes described herein did achieve the necessary back pressure to attain the desirable heating within the working fluid to reduce the time duration required for the compression and the recirculation phases of the total process cycle by maximizing the total heat per unit mass of working fluid even at higher mass flow rates.

The product to be processed was potatoes in multiple 5-pound packages, each package had a section of breathable material which allowed the working fluid to permeate into the package where it did directly interact with the potatoes and transfer heat. A total product mass payload of 275 pounds was distributed within the vessel volume. The mass payload comprised of fifty-five 5-pound bags. Each bag was placed in a basket which baskets were then stacked to form 5 columns, each column 11 baskets high, for a total payload of 55 baskets and 55 5-pound bags. The payload of baskets was stacked on top of a sled designed to secure and move these baskets. The sled design incorporated two PTFE skis upon which the sled rests which provided a low friction sliding surface. The sled and its payload were slid on the sled's skis into the vessel via a railing mechanism designed for that purpose. Inside the vessel, the two PTFE skis straddled the nozzle assembly used by this example (FIG. 3C illustrating the two PTFE skis). The area between the skis and under the payload of 5-pound bags represented an under-sled plenum.

Temperature data was collected during the thermal processing cycle at multiple locations within the vessel. At each location, a thermocouple sensors was inserted into one of the 5-pound bags of potatoes distributed therein. These temperature reading sensors (FIG. 3B) were connected to a data logger system outside of the high pressure vessel via thermocouple wires and a wire pass-through fitting.

After the stack of baskets were loaded into the high pressure vessel, the vessel was sealed by closing and locking the cap in place. Once the vessel was sealed and all the outlet ports were secured shut, the process cycle was initiated beginning with compression phase. For this example, the nozzle assembly consisted of a pair of ½" injection orifices pointing at each other in direct opposition with a distance of ½" between them. Both injection orifices were supplied with the working fluid via a single pass-through pipe leading into the vessel. As referenced in FIG. 2E, in conjunction with FIG. 5B, the pass-through pipe terminated in a 3-way union with "T" shaped geometry which 3-way union acted as a first injection manifold (the Tee-fitting 210). Outlet positioning pipes 203 for the two nozzle assemblies 200*b* were connected to the first injection manifold, and a corresponding section of the working fluid supply conduit 208 was fluidly connected with each such inlet conduit 203. The injection orifices 201*a*, 201*b* of the two nozzle assemblies 200*b* were symmetrically located along the vessel's bottom axis. Two additional 3-way unions with "T" shaped geometry were connected to the ends of the outlet positioning pipes 203, which additional 3-way unions acted as a second injection manifold 204*b*. Two connection ducts $\mathbf{205}a_b$, $\mathbf{205}b_b$ were connected to the second injection manifolds 204*b* of each nozzle assembly 200*b*. The connection ducts $\mathbf{205}a_b$, $\mathbf{205}b_b$ transformed the direction of flow by turning 180-degrees via two 90-degree elbows. The connection duct geometry was pivoted at the injection manifold 204*b* of each nozzle assembly 200*b* such that the outlet end of the connection ducts $\mathbf{205}a_b$, $\mathbf{205}b_b$ of each nozzle assembly 200*b* were lifted to be located above the corresponding injection manifold 204*b* and then pivoted again at either of the two 90-degree elbows such that the outlets 201*a*, 201*b* of the connection duct $\mathbf{205}a_b$, $\mathbf{205}b_b$ for each nozzle assembly 200*b* were oriented horizontally. The geometry of each connection duct $\mathbf{205}a_b$, $\mathbf{205}b_b$ was a reflection of the connection duct $\mathbf{205}a_b$, $\mathbf{205}b_b$ across from it; which is to say, the connection ducts $\mathbf{205}a_b$, $\mathbf{205}b_b$ of each nozzle assembly 200*b*, which are attached to the injection manifold 204*b*, are oriented as the mirror image of each other.

The vessel was filled with 475 kgs of the working fluid carbon dioxide such that the payload did reach and exceed to the desired operating temperature of 200° F. at a pressure of 140 bar during the compression phase of the thermal processing cycle which lasted approximately 22.5 minutes. To achieve the same operating temperature of 200° F., in other embodiments, the required time of compression may change to accommodate variation in the piping assembly, the product payload mass and/or the type, thickness and width of the product within the payload, and/or the initial temperature of the product payload.

Since the desired operating temperature was attained inside the vessel before the end of the compression phase, the recirculation phase was used only to maintain the payload at the desired operating temperature for the desired processing time. During the recirculation phase, the compressor withdrew carbon dioxide from the vessel via the back-center outlet port, pumped it through the heat exchanger, and returned it to the vessel. The working fluid was continuously recirculated and re-injected at desired inlet temperatures which maintained the payload's internal temperature at or above 200° F. without forming a significant temperature gradient within the vertical cross section of the vessel. The recirculation phase was conducted for 10 minutes.

After the completion of the recirculation phase, the vessel was depressurized in three steps. First, carbon dioxide was blown down from the vessel back to the receiver, driven by the higher pressure within the vessel. This blow down step was accomplished by opening the outlet valve from the vessel to the receiver. Second, working fluid was pumped down from the vessel back to the receiver. This pump down step was accomplished by withdrawing carbon dioxide from the vessel with the compressor and pumping it back to the receiver. Third and finally, the small mass of carbon dioxide remaining in the vessel after the pump down step was vented to the atmosphere.

Figure 4C:
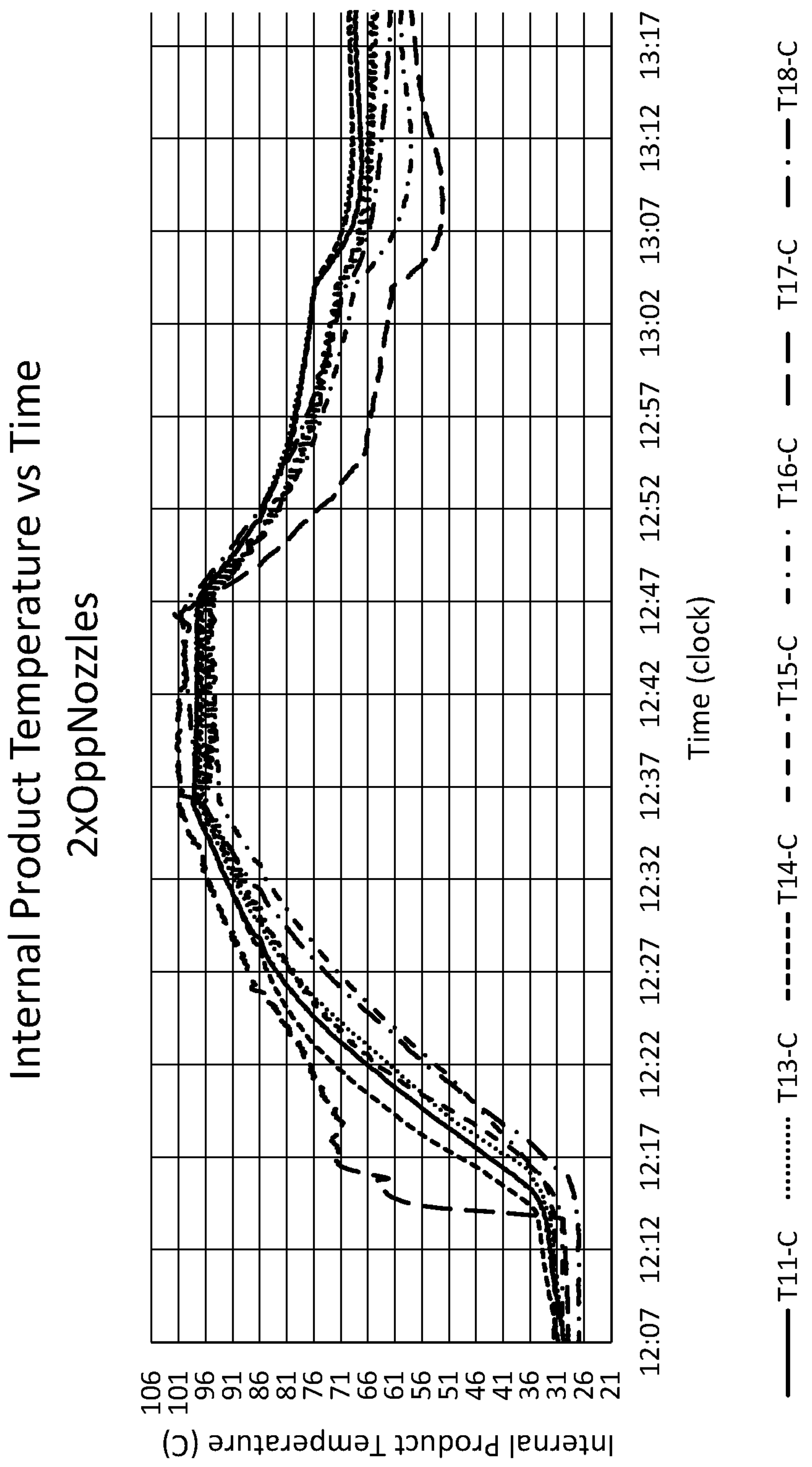
FIG. 4C is a representation of the heating curves of the 275 pound product feed load with the nozzle assembly system including 2 pairs of injection orifices in place during the process.

FIG. 4C shows the heating curves for the different locations within 275 lbs of product payload in the vessel during the complete process from beginning to end with the nozzle assembly in place, and in accord with this Example 2. It can be seen in FIG. 4C, that is the rate of heating is further improved, as the time required to reach temperatures of 93° C. within the coldest location is 20 minutes. In addition it can be seen that the vertical temperature gradient within the system is reduced as the temperature difference between T13 and T18 ranges within 2-4° C. during the recirculation hold period.

Example 3: 750 lbs, 0×OppositionNozzle

Figure 3M:
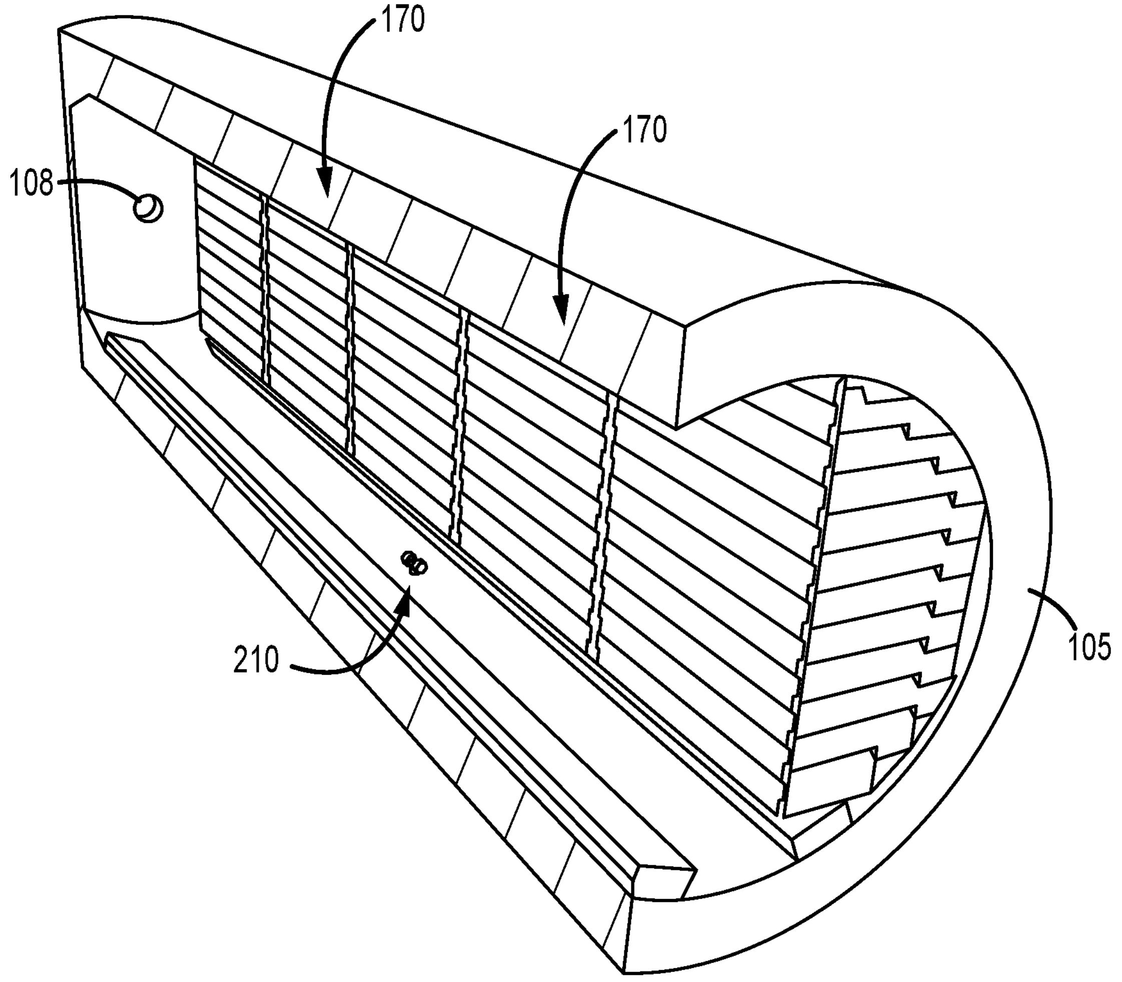
FIG. 3M is a representation of the arrangement of the vessel with only a 3-way Tee-fitting, no nozzle assembly, in relation to the rails on which the stack of baskets rests.

The product to be processed was potatoes in multiple packages in accordance with the payload distribution shown in FIG. 3D, where each package had a section of breathable material which allowed the working fluid to permeate into the package where it did directly interact with the potatoes and transfer heat. A total product mass payload of 750 pounds was distributed within the vessel volume in the manner shown in FIG. 3D. The various bags shown in FIG. 3D were placed in baskets which were then stacked to form 5 columns, each column 11 baskets high, for a total payload of 750 pounds. The payload of baskets was stacked on top of a sled designed to secure and move these baskets. The sled design incorporated two PTFE skis upon which the sled rests which provided a low friction sliding surface. The sled—and its payload—were slid on the sled's skis into the vessel via railing mechanism designed for that purpose. Inside the vessel, the two PTFE skis straddled the pass through pipe as shown in FIG. 3M.

Temperature data was collected during the thermal processing cycle at multiple locations within the vessel. At each location, a thermocouple sensors was inserted into one of the bags of potatoes distributed therein. These temperature reading sensors (e.g., FIG. 3B) were connected to a data logger system outside of the high pressure vessel via thermocouple wires and a wire pass-through fitting.

After the stack of baskets were loaded into the high pressure vessel, the vessel was sealed by closing and locking the cap in place. Once the vessel was sealed and all the outlet ports were secured shut, the process cycle was initiated beginning with compression phase. For this example, the nozzle assembly was not used. The working fluid was introduced into the vessel by pumping it through the pass through pipe which terminated at a 3-way Tee-fitting. The working fluid entered the vessel as it was injected from 2 ports in the Tee-fitting. The 2 injection ports were parallel to the vessel's axis (one injection port being directed toward one end of the vessel, with the other injection portion being directed toward the opposite end of the pressure vessel—see FIG. 3M).

The vessel was filled with the working fluid carbon dioxide such that the payload did reach and exceed to the desired operating temperature of 200° F. at a pressure of 140 bar during the compression phase of the thermal processing cycle which lasted approximately 40 minutes. To achieve the same operating temperature of 200° F. in other embodiments, the required pressure, mass of working fluid, and/or time of compression may change to accommodate variation in the piping assembly, the product payload mass and/or the type, thickness and width of the product within the payload, and/or the initial temperature of the product payload.

Since the desired operating temperature was attained inside the vessel before the end of the compression phase, the recirculation phase was used only to maintain the payload at the desired operating temperature for the desired processing time. During the recirculation phase, the compressor withdrew Carbon Dioxide from the vessel via the back-center outlet port, pumped it through the heat exchanger, and returned it to the vessel. The working fluid was continuously recirculated and re-injected at desired inlet temperatures which maintained the payload's internal temperature at or above 200° F. without forming a significant temperature gradient within the vertical cross section of the vessel. The recirculation phase was conducted for 10 minutes.

After the completion of the recirculation phase, the vessel was depressurized in three steps. First, carbon dioxide was blown down from the vessel back to the receiver, driven by the higher pressure within the vessel. This blow down step was accomplished by opening the outlet valve from the vessel to the receiver. Second, working fluid was pumped down from the vessel back to the receiver. This pump down step was accomplished by withdrawing carbon dioxide from the vessel with the compressor and pumping it back to the receiver. Third and finally, the small mass of carbon dioxide remaining in the vessel after the pump down step was vented to the atmosphere.

Figure 4D:
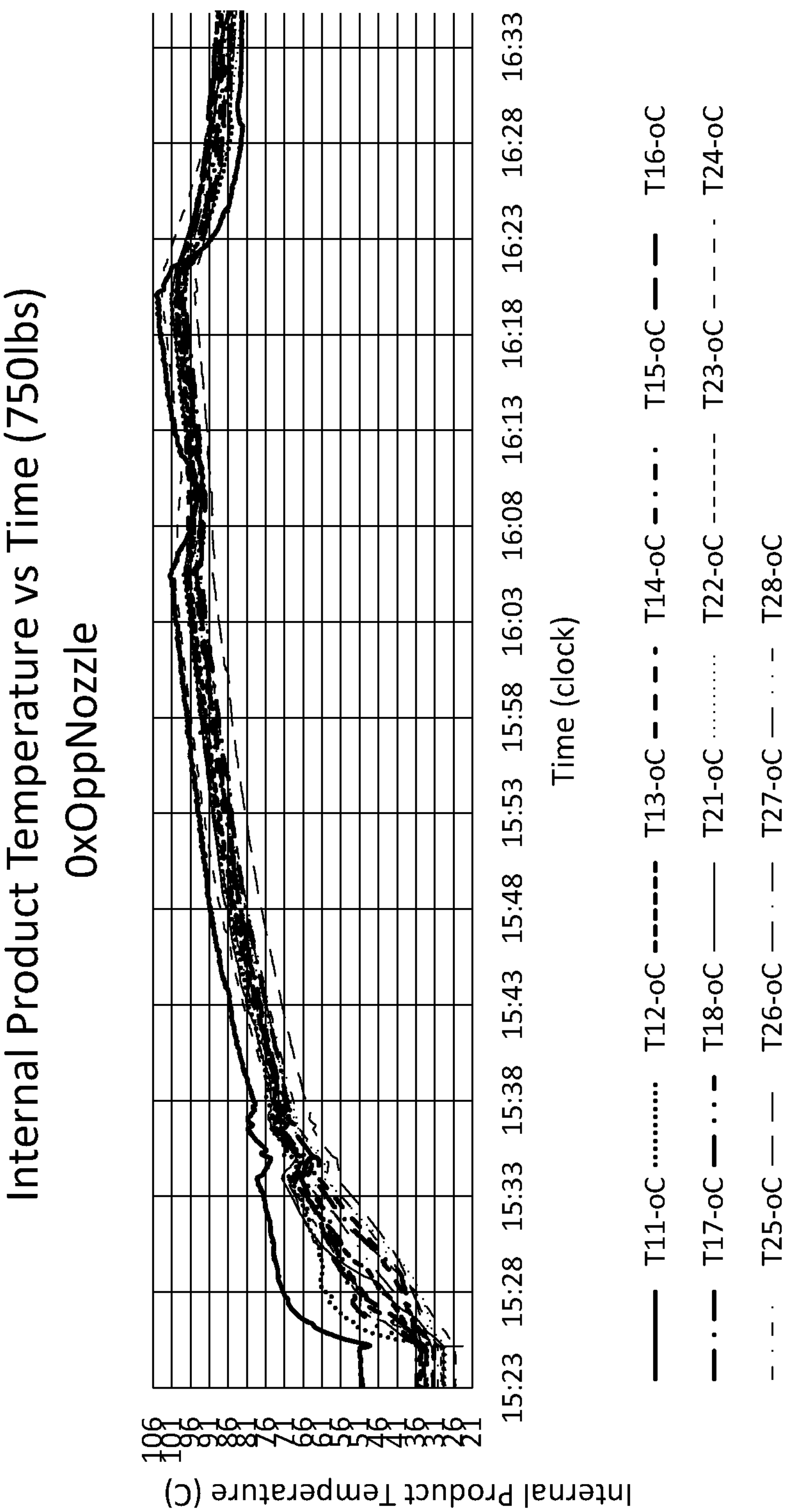
FIG. 4D is a representation of the heating curves of the 750 pound product feed load without the nozzle assembly system including 2 pair of injection orifices in place during the process.

FIG. 4D shows the resulting heating curves in accord with this Example 3. It can be seen in FIG. 4D, the rate of heating is significantly slower with the increase in the payload size from that shown in FIG. 3A (Example 1) to in accord with this Example 4 (750 pounds). The time required to reach temperatures of 93° C. within the coldest location is 55 minutes. Additionally, the vertical temperature gradient was greater 10° C. between T11 and T26.

Example 4: "4-Way Injection Manifold" (4×¼" Injection Orifices)

Similar to the above, the following illustrative example of the processes described herein did achieve the necessary back pressure to attain the desirable heating within the working fluid to reduce the time duration required for the compression and the recirculation phases of the total process cycle by maximizing the total heat per unit mass of working fluid even at higher mass flow rates.

The product to be processed was potatoes in multiple 5-pound packages, each package had a section of breathable material which allowed the working fluid to permeate into the package where it did directly interact with the potatoes and transfer heat. A total product mass payload of 265 pounds was distributed within the vessel volume. The mass payload comprised of fifty-three 5-pound bags. Each bag was placed in a basket which baskets were then stacked to form 5 columns, each column 11 baskets high, for a total payload of 55 baskets and 53 5-pound bags. The payload of baskets was stacked on top of a sled designed to secure and move these baskets. The sled design incorporated two PTFE skis upon which the sled rests which provided a low friction sliding surface. The sled and its payload were slid on the sled's skis into the vessel via railing mechanism designed for that purpose. Inside the vessel, the two PTFE skis straddled the nozzle assembly used by this example and as shown in FIG. 3L. The area between the skis and under the payload of 5-pound bags represented an under-sled plenum (FIG. 3L also illustrating the two PTFE skis).

Temperature data was collected during the thermal processing cycle at multiple locations within the vessel. At each location, a thermocouple sensor was inserted into one of the 5-pound bags of potatoes distributed therein. These temperature reading sensors (FIG. 3B) were connected to a data logger system outside of the high pressure vessel via thermocouple wires and a wire pass-through fitting.

After the stack of baskets was loaded into the high pressure vessel, the vessel was sealed by closing and locking the cap in place. Once the vessel was sealed and all the outlet ports were secured shut, the process cycle was initiated, beginning with compression phase. For this example the nozzle assembly consisted of two pair of ¼" injection orifices, reduced from ½ ", with each pair pointing each other in direct opposition with a distance of approximately 8" between them and angled 5-degrees upwards from horizontal and from the "tee" shaped geometry of the injection manifold. All injection orifices were supplied with the working fluid via a single pass-through pipe leading into the vessel. As illustrated in the FIG. 5F and FIG. 3L, the pass-through pipe terminated in a ½" 3-way union with "T" shaped geometry (injection manifold 204*f*) which 3-way union acted as a first injection manifold. Symmetrical reducing adapters (207*a* & 207*b*) were connected to the first injection manifold 204*f* which resulted in the outlets being located asymmetrically across the vessel's bottom axis. Two additional ¼" 3-way unions with "T" shaped geometry were connected to the ends of the reducing adapters. These ¼" 3-way unions acted as a second injection manifold (208*a* & 208*b*). Two connection ducts were connected to the each of the second injection manifolds for a total of four connection ducts (205*a*1, 205*b*1, 205*a*2, 205*b*2). Each connection duct (205*a*1, 205*b*1, 205*a*2, 205*b*2) transformed the direction of flow by turning 90-degrees via one 90-degree elbow. The connection duct geometry was pivoted at the second injection manifold (208*a* & 208*b*) such that the outlets (201*a*1, 201*b*1, 201*a*2, 201*b*2) of the connection ducts (205*a*1, 205*b*1, 205*a*2, 205*b*2) was oriented 5-degrees above horizontal. The geometry of each connection duct was a reflection of the connection duct across from it, which is to say, each pair of connection ducts which attached to a single second injection manifold was comprised of a pair of mirror-image copies.

The vessel was filled with 445 kg of the working fluid carbon dioxide such that the payload did reach and exceed to the desired operating temperature of 200° F. at a pressure of 140 bar during the compression phase of the thermal processing cycle which lasted approximately 23.5 minutes. To achieve the same operating temperature of 200° F. in other embodiments, the required pressure, mass of working fluid, and/or time of compression may change to accommodate variation in the piping assembly, the product payload mass and/or the type, thickness and width of the product within the payload, and/or the initial temperature of the product payload.

Since the desired operating temperature was attained inside the vessel before the end of the compression phase, the recirculation phase was used only to maintain the payload at the desired operating temperature for the desired processing time. During the recirculation phase, the compressor withdrew Carbon Dioxide from the vessel via the back-center outlet port, pumped it through the heat exchanger, and returned it to the vessel. The working fluid was continuously recirculated and re-injected at desired inlet temperatures which maintained the payload's internal temperature at or above 200° F. without forming a significant temperature gradient within the vertical cross section of the vessel. The recirculation phase was conducted for 10 minutes.

After the completion of the recirculation phase, the vessel was depressurized in three steps. First, carbon dioxide was blown down from the vessel back to the receiver, driven by the higher pressure within the vessel. This blow down step was accomplished by opening the outlet valve from the vessel to the receiver. Second, working fluid was pumped down from the vessel back to the receiver. This pump down step was accomplished by withdrawing carbon dioxide from the vessel with the compressor and pumping it back to the receiver. Third and finally, the small mass of carbon dioxide remaining in the vessel after the pump down step was vented to the atmosphere.

Figure 4E:
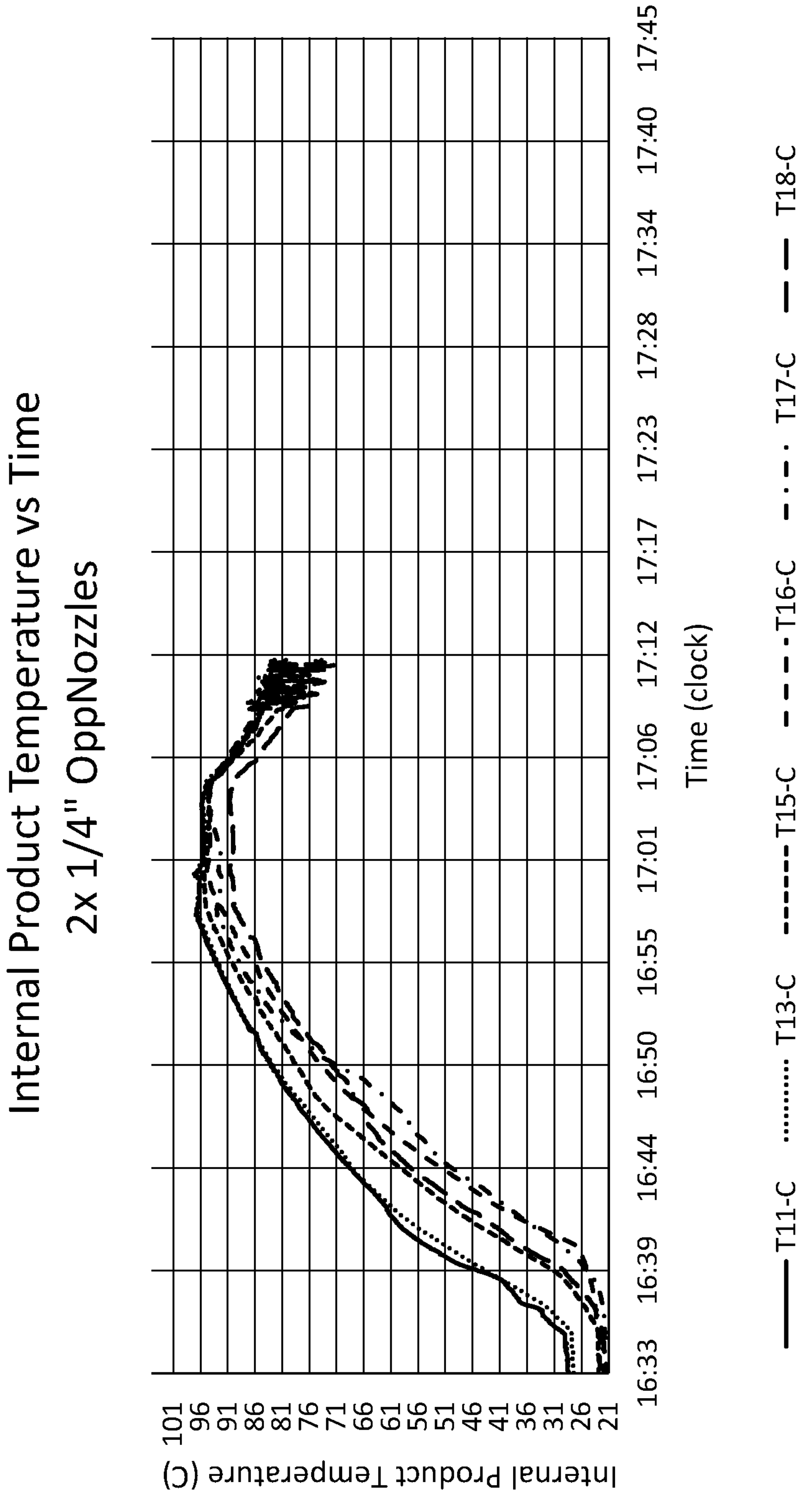
FIG. 4E is a representation of the heating curves of the 275 pound product feed load with the nozzle assembly system including 2 pair of ¼" injection orifices with a 5° tilt from the horizontal injection orifices in place during the process.
Figure 4F:
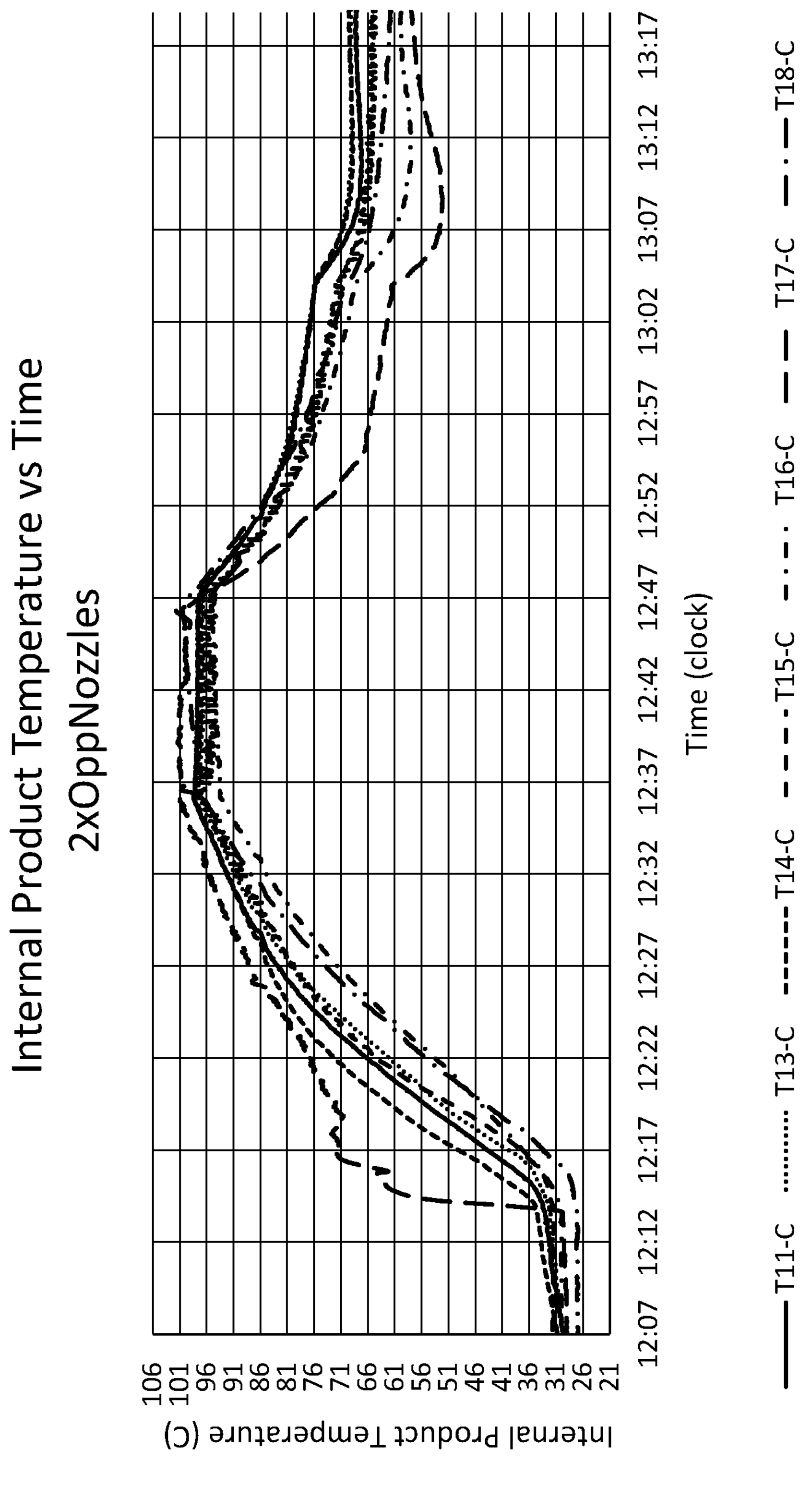
FIG. 4F is a representation of the heating curves of the 275 pound product feed load with the nozzle assembly system including of 2 pair of ½" injection orifices with a 9° tilt from the horizontal injection orifices in place during the process.
Figure 4G:
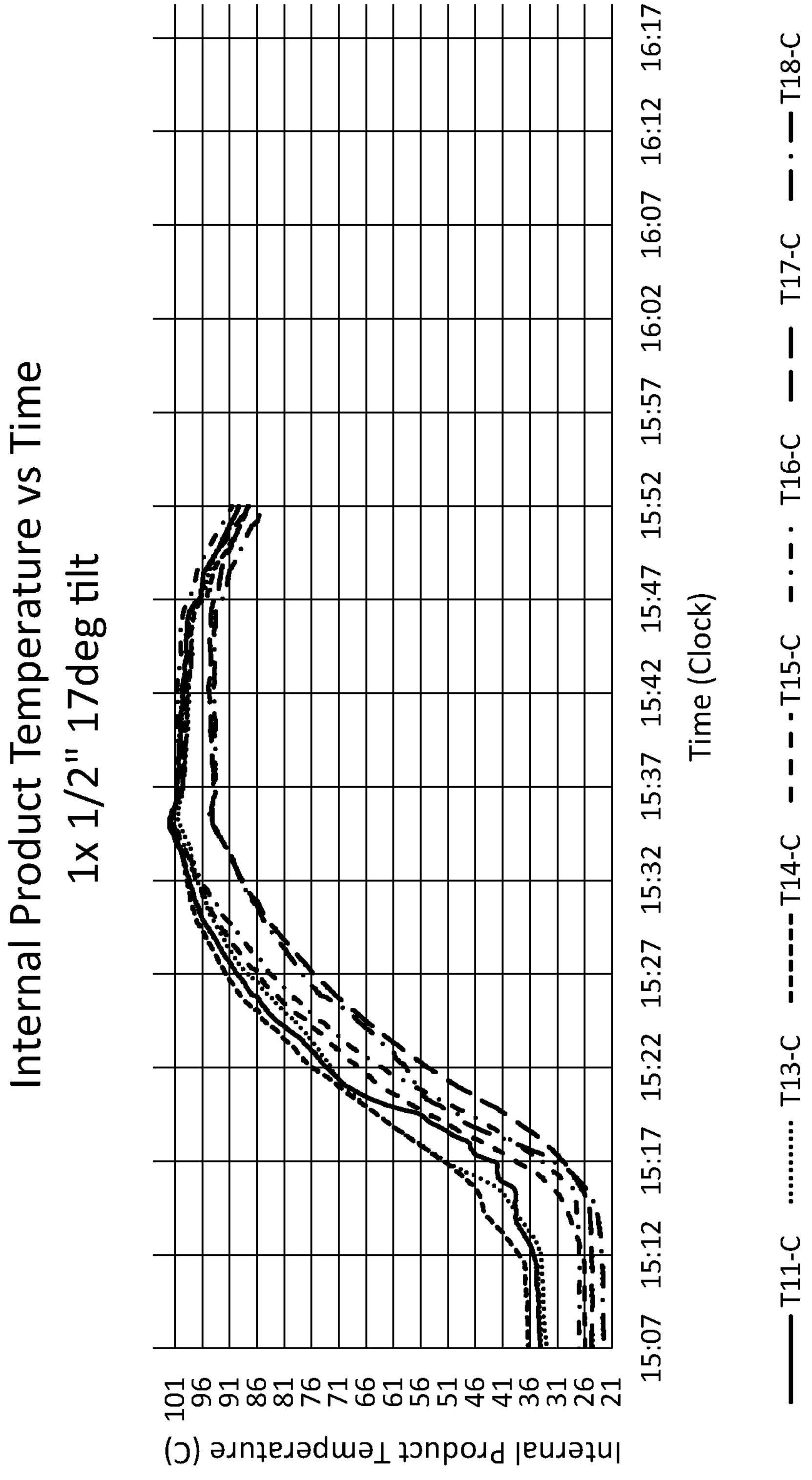
FIG. 4G is a representation of the heating curves of the 275 pound product feed load with the Tee involute shaped nozzle assembly system including 2 pair of ½" injection orifices with a 17° tilt from the horizontal injection orifices in place during the process.
Figure 4H:
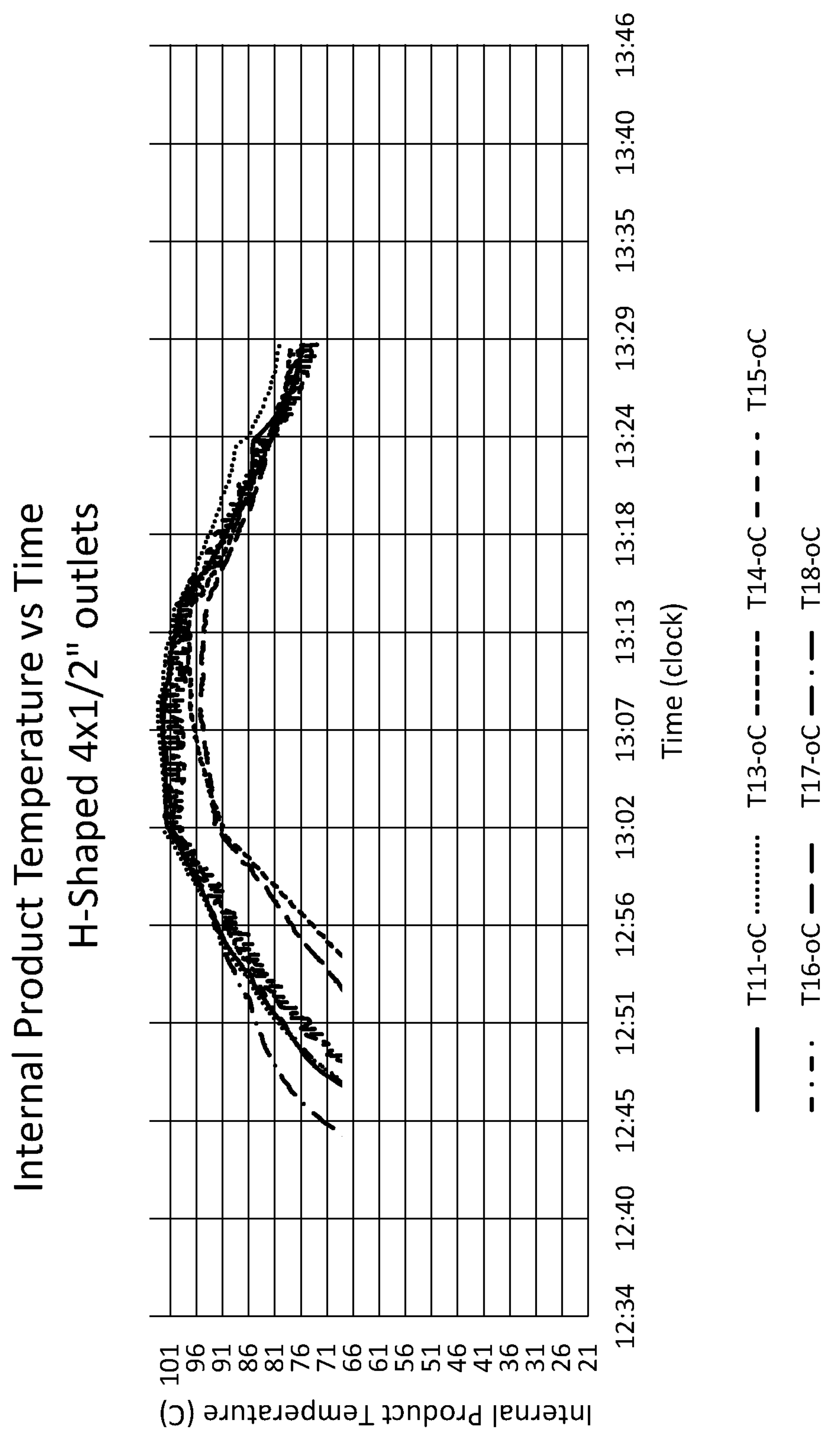
FIG. 4H is a representation of the heating curves of the 265 pound product feed load with the H shaped nozzle assembly system including 2 pair of ¼" injection orifices with a 17° tilt from the horizontal injection orifices in place during the process.

FIG. 4H shows the heating curves for the different locations within the product payload in the vessel during the complete process from beginning to end with the nozzle assembly in place, and in accord with this Example 4. With the reduction of diameter of the outlet orifice (201*a*1, 201*a*2, 2021*b*1 and 201*b*2), the velocity of the fluid at the outlet can be increased due to the higher backpressure. To compensate for the increased velocity the design allows to ensure appropriate spacing between the opposing nozzles (201*a*2, 201*b*2 & 201*a*1, 201*b*1). The higher velocity, combined with the enhanced ability to more backpressure, results in a better rate of heating and lesser vertical temperature gradient. As can be seen in FIG. 4H, the time required to reach 91° C. was 17 minutes with only a 4-5° C. temperature vertical gradient.

FIGS. 4E-4G present heating curves for nozzle assembly configurations other than as set forth in Examples 1, 2 and 4. FIG. 4E is a representation of the heating curves of the 275 product feed load with the nozzle assembly 200*f* including 2 pair of ¼" injection orifices with a 5° tilt from the horizontal injection orifices in place during the process. FIG.

4F is a representation of the heating curves of the 275 product feed load with the nozzle assembly 200*a* including 2 pair of ½" injection orifices with a 9° tilt from the horizontal injection orifices in place during the process. FIG. 4G is a representation of the heating curves of the 275 product feed load with the Tee involute shaped nozzle assembly 200 including 2 pair of ½" injection orifices with a 17° tilt from the horizontal injection orifices in place during the process.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

Any feature of any other various aspects addressed in this disclosure that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular. Moreover, any failure to use phrases such as "at least one" also does not limit the corresponding feature to the singular. Use of the phrase "at least substantially," "at least generally," or the like in relation to a particular feature encompasses the corresponding characteristic and insubstantial variations thereof (e.g., indicating that a surface is at least substantially or at least generally flat encompasses the surface actually being flat and insubstantial variations thereof). Finally, a reference of a feature in conjunction with the phrase "in one embodiment" does not limit the use of the feature to a single embodiment.

What is claimed is:

1. A processing system, comprising:

a working fluid supply, configured to provide working fluid;

a compressor comprising a compressor inlet and a compressor outlet, wherein said compressor inlet is fluidly connected with said working fluid supply;

a heat exchanger comprising a heat exchanger inlet and a heat exchanger outlet, wherein said heat exchanger inlet is fluidly connected with said compressor outlet;

a pressure vessel; and an injection manifold disposed in said pressure vessel and fluidly connected with said heat exchanger outlet, wherein said injection manifold comprises a first conduit section that terminates at a first orifice and a second conduit section that terminates at a second orifice, wherein said first orifice and said second orifice face each other at least so that a first flow of said working fluid exiting said first orifice and a second flow of said working fluid exiting said second orifice collide and create backpressure in said first conduit section and said second conduit section immediately after said first orifice and said second orifice.

2. The processing system of claim 1, further comprising a payload in said pressure vessel.

3. The processing system of claim 1, wherein said first conduit section extends from a first location to said first orifice and comprises at least one turn from between said first location and said first orifice; and wherein said second conduit section extends from said first location to said second orifice and comprises at least one turn between said first location and said second orifice.

4. The processing system of claim 1:

wherein said first conduit section extends from a first location to said first orifice and said second conduit section extends from said first location to said second orifice;

wherein said first conduit section comprises a first section and a second section, wherein said second section is disposed between said first orifice and said first section;

wherein said second conduit section comprises a third section and a fourth section, wherein said fourth section is disposed between said second orifice and said third section;

wherein said first section and said third section are oriented so that a flow through said first section and a flow through said third section proceed away from a reference plane in opposite directions, and wherein a flow through said second section and a flow through said fourth section proceed back toward said reference plane;

wherein a free end of said second section comprises said first orifice, a free end of said fourth section comprises said second orifice, and said first orifice and said second orifice are disposed on opposite sides of said reference plane and in spaced relation to one another.

5. The processing system of claim 1:

wherein said injection manifold comprises a first conduit section extending from a first location to said first orifice and a second conduit section extending from said first location to said second orifice;

wherein said first conduit section turns through an angle of at least 180° proceeding from said first location to said first orifice;

wherein said second conduit section turns through an angle of at least 180° proceeding from said first location and said second orifice.

* * * * *